(12) United States Patent
Morgan et al.

(10) Patent No.: US 11,365,488 B2
(45) Date of Patent: Jun. 21, 2022

(54) PROCESSES FOR PROVIDING LAMINATED COATINGS ON WORKPIECES, AND ARTICLES MADE THEREFROM

(71) Applicant: Modumetal, Inc., Seattle, WA (US)

(72) Inventors: Richard James Morgan, Bothell, WA (US); Guohua Li, Bothell, WA (US); Christina Ann Lomasney, Seattle, WA (US)

(73) Assignee: MODUMETAL, INC., Snohomish, WA (US)

( * ) Notice: Subject to any disclaimer, the term of this patent is extended or adjusted under 35 U.S.C. 154(b) by 9 days.

(21) Appl. No.: 15/698,513

(22) Filed: Sep. 7, 2017

(65) Prior Publication Data
US 2018/0066375 A1     Mar. 8, 2018

Related U.S. Application Data

(60) Provisional application No. 62/385,071, filed on Sep. 8, 2016.

(51) Int. Cl.
*C25D 5/00*     (2006.01)
*C25D 17/16*     (2006.01)
(Continued)

(52) U.S. Cl.
CPC ............. *C25D 5/627* (2020.08); *B32B 15/01* (2013.01); *B32B 15/18* (2013.01); *C22C 18/00* (2013.01);
(Continued)

(58) Field of Classification Search
CPC ...... C25D 3/58; C25D 3/60; C25D 17/16–20; C25D 5/10–14
(Continued)

(56) References Cited

U.S. PATENT DOCUMENTS

| | | | |
|---|---|---|---|
| 2,428,033 A | | 9/1947 | Nachtman |
| 2,436,316 A | * | 2/1948 | Lum ........................ C25D 3/58 |
| | | | 205/239 |

(Continued)

FOREIGN PATENT DOCUMENTS

| | | |
|---|---|---|
| CN | 1236024 A | 11/1999 |
| CN | 1380446 A | 11/2002 |

(Continued)

OTHER PUBLICATIONS

"Appendix 1: Literature review (Task 1): Literature review concerning the improvement of galvanneal (GA) coating adherence during shear test of adhesively bonded GA steel sheets," 70 pages, Progress Report No. 1 to Galvanized Autobody Partnership Program of International Zinc Association, Brussels, Belgium, Jun. 2008-Jul. 2009, Issued: Sep. 2009.

(Continued)

*Primary Examiner* — Brian W Cohen
(74) *Attorney, Agent, or Firm* — Seed IP Law Group LLP

(57) ABSTRACT

Methods for providing laminated coatings on metal articles using electroplating methods such as barrel plating, vibratory plating, rocker plating or other non-rack methods that involve movement of articles to be plated in a containment apparatus, as well as articles made from such processes. Embodiments of such processes involve mass-transfer modulation to provide compositionally modulated coatings.

19 Claims, 10 Drawing Sheets

(51) Int. Cl.

| | |
|---|---|
| *C25D 5/14* | (2006.01) |
| *C25D 17/26* | (2006.01) |
| *C25D 17/20* | (2006.01) |
| *C25D 5/18* | (2006.01) |
| *C22C 18/00* | (2006.01) |
| *C25D 3/56* | (2006.01) |
| *C25D 5/10* | (2006.01) |
| *C25D 7/00* | (2006.01) |
| *C25D 17/18* | (2006.01) |
| *C25D 3/66* | (2006.01) |
| *B32B 15/01* | (2006.01) |
| *B32B 15/18* | (2006.01) |

(52) U.S. Cl.
CPC .............. *C25D 3/565* (2013.01); *C25D 5/10* (2013.01); *C25D 5/14* (2013.01); *C25D 5/18* (2013.01); *C25D 5/617* (2020.08); *C25D 7/003* (2013.01); *C25D 17/16* (2013.01); *C25D 17/18* (2013.01); *C25D 17/20* (2013.01); *C25D 17/26* (2013.01); *C25D 3/665* (2013.01)

(58) Field of Classification Search
USPC ........................................................ 205/143
See application file for complete search history.

(56) References Cited

U.S. PATENT DOCUMENTS

| | | |
|---|---|---|
| 2,470,775 A | 5/1949 | Jernstedt et al. |
| 2,558,090 A | 6/1951 | Jernstedt |
| 2,642,654 A | 6/1953 | Ahrens |
| 2,678,909 A | 5/1954 | Jernstedt et al. |
| 2,694,743 A | 11/1954 | Ruskin et al. |
| 2,706,170 A | 4/1955 | Marchese |
| 2,891,309 A | 6/1959 | Fenster |
| 3,090,733 A | 5/1963 | Brown |
| 3,255,781 A | 6/1966 | Gillespie, Jr. |
| 3,282,810 A | 11/1966 | Odekerken |
| 3,359,469 A | 12/1967 | Levy et al. |
| 3,362,851 A | 1/1968 | Dunster |
| 3,483,113 A | 12/1969 | Carter |
| 3,549,505 A | 12/1970 | Hanusa |
| 3,616,286 A | 10/1971 | Aylward et al. |
| 3,633,520 A | 1/1972 | Stiglich, Jr. |
| 3,716,464 A | 2/1973 | Kovac et al. |
| 3,753,664 A | 8/1973 | Klingenmaier et al. |
| 3,759,799 A | 9/1973 | Reinke |
| 3,787,244 A | 1/1974 | Schulmeister et al. |
| 3,866,289 A | 2/1975 | Brown et al. |
| 3,941,674 A | 5/1976 | Vanmunster |
| 3,994,694 A | 11/1976 | Clauss et al. |
| 3,996,114 A | 12/1976 | Ehrsam |
| 4,053,371 A | 10/1977 | Towsley |
| 4,105,526 A | 8/1978 | Lewellen, Jr. et al. |
| 4,107,003 A | 8/1978 | Anselrode |
| 4,191,617 A | 3/1980 | Hurley et al. |
| 4,204,918 A | 5/1980 | McIntyre et al. |
| 4,216,272 A | 8/1980 | Clauss |
| 4,246,057 A | 1/1981 | Janowski et al. |
| 4,284,688 A | 8/1981 | Stücheli et al. |
| 4,314,893 A | 2/1982 | Clauss |
| 4,405,427 A | 9/1983 | Byrd |
| 4,422,907 A | 12/1983 | Birkmaier et al. |
| 4,461,680 A | 7/1984 | Lashmore |
| 4,464,232 A | 8/1984 | Wakano et al. |
| 4,510,209 A | 4/1985 | Hada et al. |
| 4,519,878 A | 5/1985 | Hara et al. |
| 4,540,472 A | 9/1985 | Johnson et al. |
| 4,543,300 A | 9/1985 | Hara et al. |
| 4,543,803 A | 10/1985 | Keyasko |
| 4,591,418 A | 5/1986 | Snyder |
| 4,592,808 A | 6/1986 | Doubt |
| 4,597,836 A | 7/1986 | Schaer et al. |
| 4,613,388 A | 9/1986 | Walter et al. |
| 4,620,661 A | 11/1986 | Slatterly |
| 4,652,348 A | 3/1987 | Yahalom et al. |
| 4,666,567 A | 5/1987 | Loch |
| 4,670,356 A | 6/1987 | Sato et al. |
| 4,678,552 A | 7/1987 | Chen |
| 4,678,721 A | 7/1987 | den Broeder et al. |
| 4,702,802 A | 10/1987 | Umino et al. |
| H543 H | 11/1988 | Chen et al. |
| 4,795,735 A | 1/1989 | Liu et al. |
| 4,834,845 A | 5/1989 | Muko et al. |
| 4,839,214 A | 6/1989 | Oda et al. |
| 4,869,971 A | 9/1989 | Nee et al. |
| 4,885,215 A | 12/1989 | Yoshioka et al. |
| 4,904,542 A | 2/1990 | Mroczkowski |
| 4,904,543 A | 2/1990 | Sakakima et al. |
| 4,923,574 A | 5/1990 | Cohen |
| 4,975,337 A | 12/1990 | Hyner et al. |
| 5,043,230 A | 8/1991 | Jagannathan et al. |
| 5,045,356 A | 9/1991 | Uemura et al. |
| 5,056,936 A | 10/1991 | Mahrus et al. |
| 5,059,493 A | 10/1991 | Takahata |
| 5,073,237 A | 12/1991 | Bacher et al. |
| 5,079,039 A | 1/1992 | Heraud et al. |
| 5,156,729 A | 10/1992 | Mahrus et al. |
| 5,156,899 A | 10/1992 | Kistrup et al. |
| 5,158,653 A | 10/1992 | Lashmore et al. |
| 5,190,637 A | 3/1993 | Guckel |
| 5,228,967 A | 7/1993 | Crites et al. |
| 5,268,235 A | 12/1993 | Lashmore et al. |
| 5,300,165 A | 4/1994 | Sugikawa |
| 5,320,719 A | 6/1994 | Lasbmore et al. |
| 5,326,454 A | 7/1994 | Engelhaupt |
| 5,352,266 A | 10/1994 | Erb et al. |
| 5,378,583 A | 1/1995 | Guckel et al. |
| 5,413,874 A | 5/1995 | Moysan, III et al. |
| 5,431,800 A | 7/1995 | Kirchhoff et al. |
| 5,461,769 A | 10/1995 | McGregor |
| 5,472,795 A | 12/1995 | Atita |
| 5,489,488 A | 2/1996 | Asai et al. |
| 5,500,600 A | 3/1996 | Moyes |
| 5,547,096 A | 4/1996 | Kleyn |
| 5,527,445 A | 6/1996 | Palumbo |
| 5,545,435 A | 8/1996 | Steffier |
| 5,620,800 A | 4/1997 | De Leeuw et al. |
| 5,660,704 A | 8/1997 | Murase |
| 5,679,232 A | 10/1997 | Fedor et al. |
| 5,738,951 A | 4/1998 | Goujard et al. |
| 5,742,471 A | 4/1998 | Barbee, Jr. et al. |
| 5,775,402 A | 7/1998 | Sachs et al. |
| 5,783,259 A | 7/1998 | McDonald |
| 5,798,033 A | 8/1998 | Uemiya et al. |
| 5,800,930 A | 9/1998 | Chen et al. |
| 5,828,526 A | 10/1998 | Kagawa et al. |
| 5,912,069 A | 6/1999 | Yializis et al. |
| 5,930,085 A | 7/1999 | Kitade et al. |
| 5,942,096 A | 8/1999 | Ruzicka et al. |
| 5,952,111 A | 9/1999 | Sugg et al. |
| 5,958,604 A | 9/1999 | Riabkov et al. |
| 6,036,832 A | 3/2000 | Knol et al. |
| 6,036,833 A | 3/2000 | Tang et al. |
| 6,071,398 A | 6/2000 | Martin et al. |
| 6,143,424 A | 11/2000 | Jonte et al. |
| 6,143,430 A | 11/2000 | Miyasaka et al. |
| 6,193,858 B1 * | 2/2001 | Hradil ........................ B01J 2/16 |
| | | 118/303 |
| 6,200,452 B1 | 3/2001 | Angelini |
| 6,203,936 B1 | 3/2001 | Cisar et al. |
| 6,212,078 B1 | 4/2001 | Hunt et al. |
| 6,214,473 B1 | 4/2001 | Hunt et al. |
| 6,284,357 B1 | 9/2001 | Lackey et al. |
| 6,312,579 B1 | 11/2001 | Bank et al. |
| 6,344,123 B1 | 2/2002 | Bhatnagar |
| 6,355,153 B1 | 3/2002 | Uzoh et al. |
| 6,398,937 B1 | 6/2002 | Menini et al. |
| 6,409,907 B1 | 6/2002 | Braun et al. |
| 6,415,942 B1 | 7/2002 | Fenton et al. |
| 6,461,678 B1 | 10/2002 | Chen et al. |

(56) References Cited

U.S. PATENT DOCUMENTS

| | | |
|---|---|---|
| 6,466,417 B1 | 10/2002 | Gill |
| 6,468,672 B1 | 10/2002 | Donovan, III et al. |
| 6,482,298 B1 | 11/2002 | Bhatnagar |
| 6,537,683 B1 | 3/2003 | Staschko et al. |
| 6,547,944 B2 | 4/2003 | Schreiber et al. |
| 6,592,739 B1 | 7/2003 | Sonoda et al. |
| 6,725,916 B2 | 4/2004 | Gray et al. |
| 6,739,028 B2 | 5/2004 | Sievenpiper et al. |
| 6,777,831 B2 | 8/2004 | Gutiérrez, Jr. et al. |
| 6,800,121 B2 | 10/2004 | Shahin |
| 6,884,499 B2 | 4/2005 | Penich et al. |
| 6,902,827 B2 | 6/2005 | Kelly et al. |
| 6,908,667 B2 | 6/2005 | Christ et al. |
| 6,923,898 B2 | 8/2005 | Yoshimura et al. |
| 6,979,490 B2 | 12/2005 | Steffier |
| 7,581,933 B2 | 9/2009 | Bruce et al. |
| 7,632,590 B2 | 12/2009 | Punsalan et al. |
| 7,736,753 B2 | 6/2010 | Deligianni et al. |
| 8,084,564 B2 | 12/2011 | Kano et al. |
| 8,152,985 B2 | 4/2012 | Macary |
| 8,177,945 B2 | 5/2012 | Arvin et al. |
| 8,192,608 B2 | 6/2012 | Matthews |
| 8,253,035 B2 | 8/2012 | Matsumoto |
| 8,585,875 B2 | 11/2013 | Cummings et al. |
| 8,814,437 B2 | 8/2014 | Braun |
| 8,916,001 B2 | 12/2014 | Pryce Lewis et al. |
| 9,005,420 B2 | 4/2015 | Tomantschger et al. |
| 9,056,405 B2 | 6/2015 | Sato et al. |
| 9,080,692 B2 | 7/2015 | Tomomori et al. |
| 9,108,506 B2 | 8/2015 | Whitaker et al. |
| 9,115,439 B2 | 8/2015 | Whitaker |
| 9,234,294 B2 | 1/2016 | Whitaker et al. |
| 9,273,932 B2 | 3/2016 | Whitaker et al. |
| 9,732,433 B2 | 8/2017 | Caldwell et al. |
| 9,758,891 B2 | 9/2017 | Bao |
| 9,783,907 B2 | 10/2017 | Cai et al. |
| 9,938,629 B2 | 4/2018 | Whitaker et al. |
| 10,041,185 B2 | 8/2018 | Sukenari |
| 10,253,419 B2 | 4/2019 | Lomasney |
| 10,266,957 B2 | 4/2019 | Sugawara et al. |
| 10,472,727 B2 | 11/2019 | Lomasney |
| 10,513,791 B2 | 12/2019 | Lomasney et al. |
| 10,544,510 B2 | 1/2020 | Lomasney |
| 10,662,542 B2 | 5/2020 | Caldwell et al. |
| 10,689,773 B2 | 6/2020 | Whitaker et al. |
| 10,781,524 B2 | 9/2020 | Whitaker et al. |
| 10,808,322 B2 | 10/2020 | Whitaker et al. |
| 10,844,504 B2 | 11/2020 | Sklar |
| 10,851,464 B1 | 12/2020 | Kobayashi et al. |
| 10,961,635 B2 | 3/2021 | Whitaker |
| 11,118,280 B2 | 9/2021 | Lomasney et al. |
| 11,168,408 B2 | 11/2021 | Sklar |
| 11,180,864 B2 | 11/2021 | Lomasney |
| 2001/0037944 A1* | 11/2001 | Sanada .............. C25D 17/20 205/143 |
| 2002/0011419 A1 | 1/2002 | Arao et al. |
| 2002/0100858 A1 | 8/2002 | Weber |
| 2002/0179449 A1 | 12/2002 | Domeier et al. |
| 2003/0134142 A1 | 7/2003 | Ivey et al. |
| 2003/0234181 A1 | 12/2003 | Palumbo |
| 2003/0236163 A1 | 12/2003 | Chaturvedi et al. |
| 2004/0027715 A1 | 2/2004 | Hixson-Goldsmith et al. |
| 2004/0031691 A1 | 2/2004 | Kelly et al. |
| 2004/0067314 A1 | 4/2004 | Joshi et al. |
| 2004/0154925 A1 | 8/2004 | Podlaha et al. |
| 2004/0178076 A1 | 9/2004 | Stonas et al. |
| 2004/0211672 A1 | 10/2004 | Ishigami et al. |
| 2004/0232005 A1 | 11/2004 | Hubel |
| 2004/0234683 A1* | 11/2004 | Tanaka .................. C25D 5/20 427/212 |
| 2004/0239836 A1 | 12/2004 | Chase |
| 2005/0002228 A1 | 1/2005 | Dieny et al. |
| 2005/0109433 A1 | 5/2005 | Danger et al. |
| 2005/0205425 A1 | 9/2005 | Palumbo et al. |
| 2005/0221100 A1 | 10/2005 | Kirihara et al. |
| 2005/0279640 A1 | 12/2005 | Shimoyama et al. |
| 2006/0065533 A1 | 3/2006 | Inoue et al. |
| 2006/0135281 A1 | 6/2006 | Palumbo et al. |
| 2006/0135282 A1 | 6/2006 | Palumbo et al. |
| 2006/0201817 A1 | 9/2006 | Guggemos et al. |
| 2006/0243597 A1 | 11/2006 | Matefi-Tempfli et al. |
| 2006/0269770 A1 | 11/2006 | Cox et al. |
| 2006/0272949 A1 | 12/2006 | Detor et al. |
| 2006/0286348 A1 | 12/2006 | Sauer |
| 2007/0158204 A1 | 7/2007 | Taylor et al. |
| 2007/0269648 A1 | 11/2007 | Schuh et al. |
| 2007/0278105 A1 | 12/2007 | Ettel |
| 2008/0063866 A1 | 3/2008 | Allen et al. |
| 2008/0093221 A1 | 4/2008 | Basol |
| 2008/0102360 A1 | 5/2008 | Stimits et al. |
| 2008/0226976 A1 | 9/2008 | Stimits |
| 2008/0245669 A1 | 10/2008 | Yoshioka et al. |
| 2008/0271995 A1 | 11/2008 | Savastiouk et al. |
| 2008/0283236 A1 | 11/2008 | Akers et al. |
| 2009/0004465 A1 | 1/2009 | Kano et al. |
| 2009/0101511 A1 | 4/2009 | Lochtman et al. |
| 2009/0114530 A1 | 5/2009 | Noda et al. |
| 2009/0130424 A1 | 5/2009 | Tholen et al. |
| 2009/0130425 A1 | 5/2009 | Whitaker |
| 2009/0130479 A1 | 5/2009 | Detor et al. |
| 2009/0155617 A1 | 6/2009 | Kim et al. |
| 2009/0283410 A1 | 11/2009 | Sklar et al. |
| 2010/0078330 A1 | 4/2010 | Hyodo |
| 2010/0116675 A1 | 5/2010 | Sklar et al. |
| 2010/0187117 A1 | 7/2010 | Lingenfelter et al. |
| 2010/0304063 A1 | 12/2010 | McCrea et al. |
| 2010/0304179 A1 | 12/2010 | Facchini et al. |
| 2010/0319757 A1 | 12/2010 | Oetting |
| 2011/0111296 A1 | 5/2011 | Berdichevsky et al. |
| 2011/0162970 A1 | 7/2011 | Sato |
| 2011/0180413 A1 | 7/2011 | Whitaker et al. |
| 2011/0186582 A1 | 8/2011 | Whitaker et al. |
| 2011/0256356 A1* | 10/2011 | Tomantschger ..... C25D 17/008 428/172 |
| 2011/0277313 A1 | 11/2011 | Soracco et al. |
| 2012/0118745 A1 | 5/2012 | Bao |
| 2012/0135270 A1 | 5/2012 | Wilbuer et al. |
| 2012/0231574 A1 | 9/2012 | Wang |
| 2012/0282417 A1 | 11/2012 | Garcia et al. |
| 2013/0052343 A1 | 2/2013 | Dieny et al. |
| 2013/0071755 A1 | 3/2013 | Oguro |
| 2013/0075264 A1 | 3/2013 | Cummings et al. |
| 2013/0130057 A1 | 5/2013 | Caldwell et al. |
| 2013/0186852 A1 | 7/2013 | Dietrich et al. |
| 2013/0220831 A1 | 8/2013 | Vidaurre Heiremans et al. |
| 2013/0224008 A1 | 8/2013 | Cheung et al. |
| 2013/0323473 A1 | 12/2013 | Dietsch et al. |
| 2014/0163717 A1 | 6/2014 | Das et al. |
| 2014/0178637 A1 | 6/2014 | Rajagopalan et al. |
| 2014/0231266 A1 | 8/2014 | Sherrer et al. |
| 2015/0315716 A1 | 11/2015 | Whitaker |
| 2015/0322588 A1 | 11/2015 | Uomasney et al. |
| 2016/0002790 A1 | 1/2016 | Whitaker et al. |
| 2016/0002803 A1 | 1/2016 | Sklar |
| 2016/0002806 A1 | 1/2016 | Lomasney |
| 2016/0002813 A1 | 1/2016 | Lomasney |
| 2016/0024663 A1 | 1/2016 | Lomasney |
| 2016/0047980 A1 | 2/2016 | Page et al. |
| 2016/0145850 A1 | 5/2016 | Cook et al. |
| 2016/0159488 A1 | 6/2016 | Roach et al. |
| 2016/0160863 A1 | 6/2016 | Roach et al. |
| 2016/0214283 A1 | 7/2016 | Schick et al. |
| 2017/0016130 A1 | 1/2017 | Testoni et al. |
| 2017/0191177 A1 | 7/2017 | Whitaker et al. |
| 2017/0191179 A1 | 7/2017 | Sklar |
| 2017/0275775 A1 | 9/2017 | Guadarrama Calderon et al. |
| 2018/0016692 A1 | 1/2018 | Caldwell et al. |
| 2018/0016694 A1 | 1/2018 | Bao |
| 2018/0066375 A1 | 3/2018 | Morgan et al. |
| 2018/0071980 A1 | 3/2018 | Lomasney et al. |
| 2018/0245229 A1 | 8/2018 | Whitaker et al. |
| 2019/0309430 A1 | 10/2019 | Sklar |
| 2019/0360116 A1 | 11/2019 | Collinson et al. |
| 2020/0115998 A1 | 4/2020 | Lomasney |

(56) References Cited

U.S. PATENT DOCUMENTS

| | | |
|---|---|---|
| 2020/0131658 A1 | 4/2020 | Lomasney et al. |
| 2020/0173032 A1 | 6/2020 | Lomasney |
| 2020/0277706 A1 | 9/2020 | Lomasney et al. |
| 2020/0283923 A1 | 9/2020 | Lomasney |
| 2020/0318245 A1 | 10/2020 | Lomasney |
| 2020/0354846 A1 | 11/2020 | Whitaker et al. |
| 2020/0392642 A1 | 12/2020 | Lomasney |
| 2021/0054522 A1 | 2/2021 | Lomasney et al. |
| 2021/0071303 A1 | 3/2021 | Whitaker et al. |
| 2021/0147995 A1 | 5/2021 | Sklar |

FOREIGN PATENT DOCUMENTS

| | | |
|---|---|---|
| CN | 1924110 A | 3/2007 |
| CN | 101113527 A | 1/2008 |
| CN | 101195924 A | 6/2008 |
| CN | 102148339 A | 8/2011 |
| CN | 105442011 A | 3/2016 |
| DE | 39 02 057 A1 | 7/1990 |
| DE | 10 2004 006 441 A1 | 12/2005 |
| DE | 10 2010 011 087 A1 | 9/2011 |
| EP | 1 688 518 A2 | 8/2006 |
| EP | 1 498 976 A3 | 10/2006 |
| EP | 2 189 554 A1 | 5/2010 |
| EP | 3 128 045 A1 | 2/2017 |
| GB | 2 324 813 A | 11/1998 |
| JP | 36121 A1 | 4/1934 |
| JP | S47-2005 A | 2/1972 |
| JP | S47-33925 A | 11/1972 |
| JP | S52-109439 A | 9/1977 |
| JP | 58-197292 A | 11/1983 |
| JP | S60-97774 A | 5/1985 |
| JP | S61-99692 A | 5/1986 |
| JP | H01-132793 A | 5/1989 |
| JP | 2-214618 A | 8/1990 |
| JP | H05-251849 A | 9/1993 |
| JP | H06-196324 A | 7/1994 |
| JP | 07-065347 A | 3/1995 |
| JP | H09-119000 A | 5/1997 |
| JP | 2000-239888 A | 9/2000 |
| JP | 2001-152388 A | 6/2001 |
| JP | 2001-181893 A | 7/2001 |
| JP | 2002-53999 A | 2/2002 |
| JP | 2006-035176 | 2/2006 |
| JP | 2009-215590 A | 9/2009 |
| KR | 2003-0092463 A | 12/2003 |
| KR | 20150132043 A | 11/2015 |
| WO | 83/02784 A1 | 8/1983 |
| WO | 95/14116 A1 | 5/1995 |
| WO | 97/00980 A1 | 1/1997 |
| WO | 02/33516 A2 | 4/2002 |
| WO | 03/100484 A2 | 12/2003 |
| WO | 2004/001100 A1 | 12/2003 |
| WO | 2007/045466 A1 | 4/2007 |
| WO | 2007/136387 A1 | 11/2007 |
| WO | 2007/138619 A1 | 12/2007 |
| WO | 2008/057401 A2 | 5/2008 |
| WO | 2009/045433 A1 | 4/2009 |
| WO | 2011/033775 A1 | 3/2011 |
| WO | 2012/145750 A2 | 10/2012 |
| WO | 2013/133762 A1 | 9/2013 |
| WO | 2017/097300 A1 | 6/2017 |

OTHER PUBLICATIONS

"Low-temperature iron plating," web blog article found at http:blog.sina.com.cn/s/blog_48ed0a9c01100024z.html, published Mar. 22, 2006, 3 pages. (with English translation).
Adams et al., "Controlling strength and toughness of multilayer films: A new multiscalar approach," *J. Appl. Phys.* 74(2):1015-1021, 1993.
Aizenberg et al., "Skeleton of *Euplectella* sp.: Structural Hierarchy from the Nanoscale to the Macroscale," *Science* 309:275-278, 2005.
Alfantazi et al., "Synthesis of nanocrystalline Zn—Ni alloy coatings," *JMSLD5* 15(15):1361-1363, 1996.
Atanassov et al., "Electrodeposition and properties of nickel-manganese layers," *Surface and Coatings Technology* 78:144-149, 1996.
Bakonyi et al., "Electrodeposited multilayer films with giant magnetoresistance (GMR): Progress and problems," *Progress in Materials Science* 55:107-245, 2010.
Bartlett et al., "Electrochemical deposition of macroporous platinum, palladium and cobalt films using polystyrene latex sphere templates," *Chem. Commun.*, pp. 1671-1672, 2000.
Beattie et al., "Comparison of Electrodeposited Copper-Zinc Alloys Prepared Individually and Combinatorially," *J. Electrochem. Soc.* 150(11):C802-C806, 2003.
Bird et al., "Giant Magnetoresistance in Electrodeposited Ni/Cu and Co/Cu Multilayers," *J. Electrochem. Soc.* 142(4):L65-L66, 1995.
Blum, "The Structure and Properties of Alternately Electrodeposited Metals," presented at the Fortieth General Meeting of the American Electrochemical Society, Lake Placid, New York, Oct. 1, 1921, 14 pages.
Cohen et al., "Electroplating of Cyclic Multilayered Alloy (CMA) Coatings," *J. Electrochem. Soc.* 130(10):1987-1995, 1983.
Cowles, "High cycle fatigue in aircraft gas turbines—an industry perspective," *International Journal of Fracture* 80(2-3):147-163, 1996.
"Designing with Metals: Dissimilar Metals and The Galvanic Series," 3 pages, http://www.pwrmfg.com/power-manufacturing/technical-info/designing-with-metals/, printed October 5, 2017.
Despic et al., "Electrochemical Formation of Laminar Deposits of Controlled Structure and Composition," *J. Electrochem. Soc.* 136(6):1651-1657, 1989.
Dini et al. "On the High Temperature Ductility Properties of Electrodeposited Sulfamate Nickel," *Plating and Surface Finishing* 65(2):36-40, 1978.
Etminanfar et al., "Corrosion resistance of multilayer coatings of nanolayered Cr/Ni electrodeposited from Cr(III)-Ni(II) bath," *Thin Solid Films* 520:5322-5321, 2012.
Gasser et al., "Materials Design for Acoustic Liners: an Example of Tailored Multifunctional Materials," *Advanced Engineering Materials* 6(1-2):97-102, 2004.
Georgescu et al., "Magnetic Behavior of [Ni/Co—Ni—Mg—N] x n Cylindrical Multilayers prepared by Magnetoelectrolysis," *Phys. Stat. Sol. (a)* 189(3):1051-1055, 2002.
Ghanem et al., "A double templated electrodeposition method for the fabrication of arrays of metal nanodots," *Electrochemistry Communications* 6:441-453, 2004.
Grimmett et al., "Pulsed Electrodeposition of Iron-Nickel Alloys," *J. Electrochem. Soc.* 137(11):3414-3418, 1990.
Hariyanti, "Electroplating of Cu—Sn Alloys and Compositionally Modulated Multilayers of Cu—Sn—Zn—Ni Alloys on Mild Steel Substrate," Master of Science Thesis, University of Science, Malaysia, Penang, Malaysia, 2007, (81 pages).
Harris et al., "Improved Single Crystal Superalloys, CMSX-4® (SLS)[La+Y] and CMSX-486®," *TMS (The Minerals, Metals & Materials Society), Superalloys*, p. 45-52, 2004.
Huang et al., "Hardness variation and annealing behavior of a Cr—Ni multilayer electroplated in a trivalent chromium-based bath," *Surface and Coatings Technology* 203:3320-3324, 2009.
Huang et al., "Characterization of Cr—Ni multilayers electroplated from a chromium(III)-nickel(II) bath using pulse current," *Scripta Materialia*, 57:61-64, 2007.
Igawa et al., "Fabrication of SiC fiber reinforced SiC composite by chemical vapor infiltration for excellent mechanical properties," *Journal of Physics and Chemistry of Solids* 66:551-554, 2005.
Ivanov et al., "Corrosion resistance of compositionally modulated multilayered Zn—Ni alloys deposited from a single bath," *Journal of Applied Electrochemistry* 33:239-244, 2003.
Jeong et al., "The Effect of Grain Size on the Wear Properties of Electrodeposited Nanocrystalline Nickel Coatings," *Scripta Mater.* 44:493-499, 2001.
Jia et al., "LIGA and Micromolding" Chapter 4, *The MEMS Handbook*, 2nd edition, CRC Press, Boca Raton, Florida, Edited by Mohamed Gad-el-Hak, 2006.

(56) References Cited

OTHER PUBLICATIONS

Kalu et al., "Cyclic voltammetric studies of the effects of time and temperature on the capacitance of electrochemically deposited nickel hydroxide," *Journal of Power Sources 92*:163-167, 2001.
Kaneko et al., "Vickers hardness and deformation of Ni/Cu nanomultilayers electrodeposited on copper substrates," Eleventh International Conference on Intergranular and Interphase Boundaries 2004, *Journal of Material Science 40*:3231-3236, 2005.
Karimpoor et al., "Tensile Properties of Bulk Nanocrystalline Hexagonal Cobalt Electrodeposits", *Materials Science Forum 386-388*:415-420, 2002.
Keckes et al., "Cell-wall recovery after irreversible deformation of wood," *Nature Materials 2*:810-814, 2003.
Kirilova et al., "Corrosion behaviour of Zn—Co compositionally modulated multilayers electrodeposited from single and dual baths," *Journal of Applied Electrochemistry 29*:1133-1137, 1999.
Kockar et al., "Effect of potantiostatic waveforms on properties of electrodeposited NiFe alloy films," *Eur. Phys. J. B 42*:497-501, 2004.
Lashmore et al., "Electrodeposited Cu—Ni Textured Superlattices," *J. Electrochem. Soc. 135*(5):1218-1221, 1988.
Lashmore et al., "Electrodeposited Multilayer Metallic Coatings", *Encyclopedia of Materials Science and Engineering, Supp. Vol. 1*:136-140, 1988.
Leisner et al., "Methods for electrodepositing composition-modulated alloys," *Journal of Materials Processing Technology 58*:39-44, 1996.
Leith et al., "Characterization of Flow-Induced Compositional Structure in Electrodeposited NiFe Composition-Modulated Alloys," *J. Electrochem. Soc. 145*(8):2821-2833, 1998,.
Lekka et al., "Corrosion and wear resistant electrodeposited composite coatings," *Electrochimica Acta 50*:4551-4556, 2005.
Lewis et al., "Stability in thin film multilayers and microlaminates: the role of free energy, structure, and orientation at interfaces and grain boundaries," *Scripta Materialia 48*:1079-1085, 2003.
Low et al., "Electrodeposition of composite coatings containing nanoparticles in a metal deposit," *Surface & Coatings Technology 201*:311-383, 2006.
Malone, "New Developments in Electroformed Nickel-Based Structural Alloys," *Plating and Surface Finishing 74*(1):50-56, 1987.
Marchese, "Stress Reduction of Electrodeposited Nickel," *Journal of the Electrochemical Society 99*(2):39-43, 1952.
Meng et al., "Fractography, elastic modulus, and oxidation resistance of Novel metal-intermetallic Ni/Ni$_3$Al multilayer films," *J. Mater. Res. 17*(4):790-796, 2002.
Naslain et al., "Synthesis of highly tailored ceramic matrix composites by pressure-pulsed CVI," *Solid State Ionics 141-142*:541-548, 2001.
Naslain, "The design of the fibre-matrix interfacial zone in ceramic matrix composites," *Composites Part A 29A*:1145-1155, 1998.
Nicholls, "Advances in Coating Design for High-Performance Gas Turbines," *MRS Bulletin:659-670*, Sep. 2003.
Onoda et al., "Preparation of amorphous/crystalloid soft magnetic multilayer Ni—Co—B alloy films by electrodeposition," *Journal of Magnetism and Magnetic Materials 126*(1-3):595-598, 1993.
Parkin et al., "Oscillations in Exchange Coupling and Magnetoresistance in Metallic Superlattice Structures: Co/Ru, Co/Cr, and Fe/Cr," *Physical Review Letters 64*(19):2304-2307, 1990.
Pilone et al., "Model of Multiple Metal Electrodeposition in Porous Electrodes," *Journal of the Electrochemical Society 153*(5):D85-D90, 2006.
Podlaha et al., "Induced Codeposition : I. An Experimental Investigation of Ni—Mo Alloys," *J. Electrochem. Soc. 143*(3):885-892, 1996.
Ross, "Electrodeposited Multilayer Thin Films," *Annual Review of Materials Science 24*:159-188, 1994.
Rousseau et al., "Single-bath Electrodeposition of Chromium-Nickel Compositionally Modulated Multilayers (CMM) From a Trivalent Chromium Bath," *Plating and Surface Finishing:106-110*, Sep. 1999.
Saleh et al., "Effects of electroplating on the mechanical properties of stereolithography and laser sintered parts," *Rapid Prototyping Journal 10*(5)305-315, 2004.
Sanders et al., "Mechanics of hollow sphere foams," *Materials Science and Engineering A347*:70-85, 2003.
Sartwell et al., "Replacement of Chromium Electroplating on Gas Turbine Engine Components Using Thermal Spray Coatings," Report No. NRL/MR/6170-05-8890, *Naval Research Laboratory*, 2005.
Schwartz, "Multiple-Layer Alloy Plating," *ASM Handbook 5: Surface Engineering*:214-216, 1994.
Sherik, "Synthesis, Structure and Properties of Electrodeposited Bulk Nanocrystalline Nickel," Master's Thesis, Queen's University, Ontario, Canada, 1993. (175 pages).
Shishkovski, "Laser synthesis of functionally graded mesostructures and bulk products," FIZMATLIT, Moscow, Russia, pp. 30-38, 2009. (with English Abstract).
Simunovich et al., "Electrochemically Layered Copper-Nickel Nanocomposites with Enhanced Hardness," *J. Electrochem. Soc. 141*(1):L10-L11, 1994.
Sperling et al., "Correlation of stress state and nanohardness via heat treatment of nickel-aluminide multilayer thin films," *J. Mater. Res. 19*(11):3374-3381, 2004.
Srivastava et al., "Corrosion resistance and microstructure of electrodeposited nickel-cobalt alloy coatings," *Surface & Coatings Technology 201*:3051-3060, 2006.
Stephenson, Jr., "Development and Utilization of a High Strength Alloy for Electroforming," *Plating 53*(2):183-192, 1966.
Suresh, "Graded Materials for Resistance to Contact Deformation and Damage," *Science 292*:2447-2451, 2001.
Switzer et al., "Electrodeposited Ceramic Superlattices," *Science 247*(4941):444-446, 1990.
Tench et al., "Considerations in Electrodeposition of Compositionally Modulated Alloys," *J. Electrochem. Soc. 137*(10):3061-3066, 1990.
Tench et al., "Enhanced Tensile Strength for Electrodeposited Nickel-Copper Multilayer Composites," *Metallurgical Transactions A 15A*:2039-2040, 1984.
Thangaraj et al., "Corrosion behavior of composition modulated multilayer Zn—Co electrodeposits produced using a single-bath technique," *J. Appl. Electrochem. 39*:339-345, 2009.
Thangaraj et al., "Surface Modification by Compositionally Modulated Multilayered Zn—Fe Coatings," *Chinese Journal of Chemistry 26*:2285-2291, 2008.
Tokarz et al., "Preparation, structural and mechanical properties of electrodeposited Co/Cu multilayers," *Phys. Stat. Sol. 5*(11):3526-3529, 2008.
Touchstone Research Laboratory, Ltd., Material Safety Data Sheet, CFOAM Carbon Foams, , 2008.
Vill et al., "Mechanical Properties of Tough Multiscalar Microlaminates," *Acta metall. mater. 43*(2)427-431, 1995.
Voevodin et al., "Superhard, functionally gradient, nanolayered and nanocomposite diamond-like carbon coatings for wear protection," *Diamond and Related Materials 7*:463-467, 1998.
Wearmouth et al., "Electroforming with Heat-Resistant, Sulfur-Hardened Nickel," *Plating and Surface Finishing 66*(10):53-57, 1979.
Weil et al., "Pulsed Electrodeposition of Layered Brass Structures," *Metallurgical Transactions A 19A*:1569-1573, 1988.
Weil et al., "Properties of Composite Electrodeposits," *U.S. Army Research Office*, Final Report, Contract No. DAALO3-87-K-0047, 1990.
Wikipedia, "Gold," URL=http://en.wikipedia.org/wiki/Gold, version modified Nov. 3, 12 pages, 2008.
Wikipedia, "Silver," URL= http://en.wikipedia.org/wiki/Silver, version modified Nov. 3, 12 pages, 2008.
Wilcox, "Surface Modification With Compositionally Modulated Multilayer Coatings," *The Journal of Corrosion Science and Engineering 6*(Paper 52), 2004.
Wu et al., "Preparation and characterization of superhard $CN_x$/ZrN multilayers," *J. Vac. Sci. Technol. A 15*(3):946-950, 1997.
Yahalom et al., "Formation of composition-modulated alloys by electrodeposition," *Journal of Materials Science 22*:499-503, 1987.

(56) References Cited

OTHER PUBLICATIONS

Yang et al., "Effects of SiC sub-layer on mechanical properties of Tyranno-SA/SiC composites with multiple interlayers," *Ceramics International 31*:525-531, 2005.
Yang et al., "Enhanced elastic modulus in composition-modulated gold-nickel and copper-palladium foils," *Journal of Applied Physics 48*(3):876-879, 1977.
Yogesha et al., "Optimization of deposition conditions for development of high corrosion resistant Zn—Fe multilayer coatings," *Journal of Materials Processing Technology 211*:1409-1415, 2011.
Zabludovsky et al., "The Obtaining of Cobalt Multilayers by Programme-controlled Pulse Current," *Transactions of the Institute of Metal Finishing* 75(5):203-204, 1997.
U.S. Appl. No. 16/346,843, filed May 1, 2019.
U.S. Appl. No. 16/582,931, filed Sep. 25, 2019.
U.S. Appl. No. 16/606,723, filed Oct. 18, 2019.
U.S. Appl. No. 16/671,104, filed Oct. 31, 2019.
U.S. Appl. No. 16/726,079, filed Dec. 23, 2019.
U.S. Appl. No. 16/909,939, filed Jun. 23, 2020.
U.S. Appl. No. 17/024,007, filed Sep. 17, 2020.
U.S. Appl. No. 17/050,395, filed Oct. 23, 2020.
U.S. Appl. No. 17/077,970, filed Oct. 22, 2020.
Kruth et al., "Progress in Additive Manufacturing and Rapid Prototyping" *CIRP Annals 47*(2):525-540, 1998.
Paz et al., "Nano-Laminated Alloys for Improved Return on Oilfield Assets," Society of Petroleum Engineers, 2016. (14 pages).

\* cited by examiner

Significant Surface  —  Face  —  Threads

FIG. 1A   FIG. 1B   FIG. 1C

Significant Surface

Significant Surface

End Threads   Middle Threads

PROCESSES FOR PROVIDING LAMINATED COATINGS ON WORKPIECES, AND ARTICLES MADE THEREFROM

TECHNICAL FIELD

This disclosure generally relates to providing laminated coatings on workpieces using electroplating methods, such as barrel plating, vibratory plating, rocker plating, or other non-rack methods that involve movement of workpieces to be plated in a containment apparatus, as well as articles made from such processes. Embodiments of such processes involve mass-transfer modulation to provide compositionally modulated coatings.

BACKGROUND

Electrodeposition is recognized as a low-cost method for forming a dense coating or cladding on a variety of conductive materials, including metals, alloys, conductive polymers, and the like. Electrodeposition has also been successfully used to deposit nanolaminated coatings on non-conductive materials, such as non-conductive polymers, by incorporating sufficient materials into the non-conductive polymer to render it sufficiently conductive or by treating the surface to render it conductive, for example, by electroless deposition of nickel, copper, silver, cadmium, etc., in a variety of engineering applications. Electrodeposition has also been demonstrated as a viable means for producing laminated and nanolaminated coatings, claddings, materials, and objects, in which the individual laminate layers may vary in the composition of the metal, ceramic, organic-metal composition, and/or microstructure features.

Although electrodeposition methods are known, there remains a need in the art for methods to electrodeposit laminated coatings on workpieces that are not economically feasible or structurally suited to known rack plating methods. This disclosure provides this and related advantages.

BRIEF SUMMARY

This disclosure provides, among other things, processes for plating a batch of workpieces using non-racking systems such as barrel and vibratory basket plating, to provide laminated (including nanolaminated) coatings thereon, and articles made from such processes.

In embodiments, the present disclosure provides a method for producing a plurality of articles by electroplating a batch of workpieces, the method comprising: contacting at least a portion of a batch of workpieces with an electrodeposition bath in contact with at least a portion of a containment apparatus, the electrodeposition bath comprising at least a first and second electrodepositable material; moving the portion of the batch of workpieces by moving the containment apparatus in a predetermined motion; electrodepositing a first identifiable layer onto at least a portion of the workpieces in the batch by applying a first electric current for a first amount of time via at least two cathode contacts that make at least intermittent electrical contact with the portion of the batch of workpieces, the first identifiable layer comprising at least the first and second electrodepositable materials; and electrodepositing a second identifiable layer onto the portion of the workpieces in the batch by applying a second electric current for a second amount of time via the cathode contacts, the second identifiable layer comprising at least the first and second electrodepositable materials, the composition, grain size, structure, or thickness, or combinations thereof, of the second identifiable layer being different from that of the first identifiable layer.

In further embodiments, the present disclosure provides a method for forming a plurality of articles by forming a nanolaminate coating on a plurality of workpieces, the method comprising: contacting at least a portion of the plurality of workpieces with an electrodeposition bath in contact with an interior volume of a plating barrel, wherein the electrodeposition bath comprises at least a first and second electrodepositable material, wherein the workpieces each independently have a longest dimension and the plating barrel has a length and a radius; rotating the plating barrel; electrodepositing a first identifiable layer onto at least a portion of the plurality of workpieces by applying a first electric current for a first amount of time via at least two cathodes having ends positioned within the interior volume of the plating barrel, the ends being separated by a distance, and the first identifiable layer comprising the at least first and second electrodepositable materials; and electrodepositing a second identifiable layer onto the portion of the plurality of workpieces by applying a second electric current for a second amount of time via the at least two cathodes, the second identifiable layer comprising at least the first and second electrodepositable materials, wherein at least one of the composition, grain size, structure, and thickness, or combinations thereof, of the second identifiable layer is different from that of the first identifiable layer.

In still further embodiments, the present disclosure provides an article made according to a method of the disclosure. In other embodiments, the present disclosure provides an article comprising a nanolaminate coating, the nanolaminate coating comprising: a first identifiable layer having a thickness ranging from about 150 nanometers to about 20,000 nanometers at one or more locations on the article, the first identifiable layer comprising at least a first and second component, the first identifiable layer having a first composition, a first grain size, and a first grain structure; a second identifiable layer having a thickness ranging from about 150 nanometers to about 20,000 nanometers at one or more locations on the article, the second identifiable layer comprising the first and second component, the second identifiable layer having a second composition, a second grain size, and a second grain structure, wherein at least one of the second composition, the second grain size, and the second grain structure, or combinations thereof, are different than the first composition, the first grain size, and the first grain structure; and one or more discontinuities characterized by an inward deformation of the first and second identifiable layers toward the substrate surface.

Embodiments of the methods provided herein include plating a batch of workpieces to produce identifiable nanolaminate coating layers on a plurality of the workpieces in the batch. For example, some embodiments include at least first and second identifiable layers. Embodiments provided herein include a batch of workpieces having identifiable nanolaminate coating layers on a plurality of the workpieces in the batch.

Embodiments of the non-rack processes described herein provide mass-transfer modulated processes for providing nanolaminate coatings. In such processes, the alloy compositions in individual layers of the nanolaminate can be varied by modulating the frequency of the electrochemical deposition between different current densities. In embodiments, the current densities and other deposition parameters are coordinated with the parameters of the particular plating method used in order to achieve compositional modulation of the nanolaminate layers having the desired properties.

In embodiments, the layers comprise one, two, three, four, or more elements independently selected from the group consisting of Ag, Al, Au, B, Be, C, Co, Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr, wherein each of the independently selected metals is present in amounts greater than 0.1 wt. %. In further embodiments, each of the independently selected metals is present in amounts greater than 0.05 wt. %, 0.01 wt. %, 0.005 wt. %, or 0.001 wt. %. Included within such embodiments of this disclosure include coating layers comprising various elements including Ni, Zn, Co, Al, and Fe. Included within such embodiments are corrosion-resistant coatings comprising Zn and Ni, where the nickel comprises from 11% to 17% by weight, and the remaining weight percent of the coating, i.e., the balance, comprises Zn.

In embodiments, the first identifiable layer in the laminates in the plurality has a thickness at one or more locations on the article that is at least about 200 nanometers (nm). In other embodiments, the first identifiable layer in the laminates in the plurality has a thickness at one or more locations on the article that is at least about 250 nm. In further embodiments, the first identifiable layer in the laminates in the plurality has a thickness at one or more locations on the article that is up to 1 micron. In yet further embodiments, the first identifiable layer in the laminates in the plurality has a thickness at one or more locations on the article that is more than one micron.

In embodiments, the second identifiable layer likewise also has a thickness of at least about 200 nm at one or more locations on the article. In other embodiments, the second identifiable layer in the laminates in the plurality is at least about 250 nm at one or more locations on the article. For example, the second layer has a thickness of from about 200 to about 400 nm at one or more locations on the article.

In embodiments, at one or more locations on the article, the second identifiable layer is substantially the same thickness, or is thinner than the first layer. In other embodiments, at one or more locations on the article, the second layer is thicker than the first layer. For example, the first layer may have a thickness ranging from about 200 to about 400 nm, and the second layer may have a thickness ranging from about 600 to about 1000 nm. In other embodiments, at one or more locations on the article, the second layer is substantially thinner than the first layer. For example, the second layer may have a thickness ranging from about 200 to about 400 nm at one or more locations on the article, and the first layer may have a thickness greater than about 600 nm at one or more locations on the article. In some such embodiments, the first layer has a thickness ranging from about 600 to about 1000 nm (or more) at one or more locations on the article. In embodiments, the thickness is measured for comparison purposes at a non-threaded surface.

In embodiments, the articles with nanolaminate coatings in the plurality provide corrosion-resistant coatings. In embodiments, the nanolaminate coatings provide from at least 1,000 hours to over 15,000 hours to first red rust when tested according to the ASTM-B117-11 salt fog test.

The laminated coatings provided by this disclosure, and in particular nanolaminated metals provided by this disclosure, are of interest for a variety of purposes, including structural, thermal, and corrosion resistance applications because of their unique toughness, fatigue resistance, thermal stability, wear, abrasion resistance, and chemical properties. Methods for producing such nanolaminated coatings via the manufacturing methods described herein, and the articles including laminated (e.g., nanolaminated) coatings produced by the processes herein, are of interest due to their low cost manufacturability and impressive materials characteristics. Electrodeposition via the processes described herein is thus a viable means for producing laminated (e.g., nanolaminated) materials and coatings in which identifiable, individual laminate layers may vary in composition (e.g., concentration of metals in an alloy, etc.) or structure (e.g., microstructure, morphology, layer thickness, layer density, etc.) of the deposited components. In addition, the manufactured nanolaminated coatings can have reproducible wavelengths that may be substantially continuous across the portions of the surface of the workpiece. In some embodiments, the coating is a cladding.

BRIEF DESCRIPTION OF THE SEVERAL VIEWS OF THE DRAWINGS

FIGS. 1A-1E illustrate examples of some of the different workpieces that may be laminated (e.g., barrel plated) as described herein, and indicate various surfaces where coatings can be provided and measured.

DETAILED DESCRIPTION

Figure 1D:
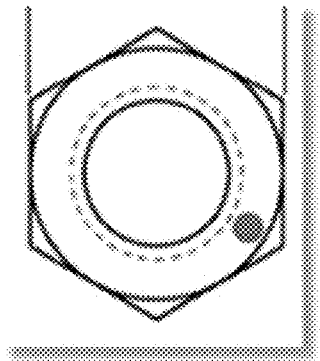
Figure 1D:
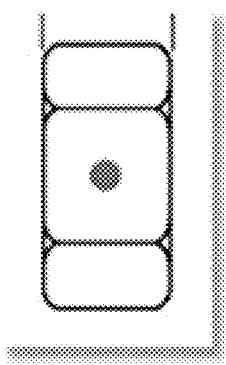
Figure 1D:
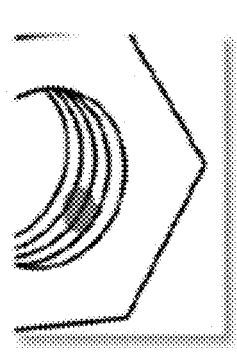
Figure 1D:
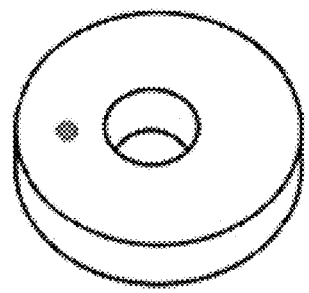
Figure 1E:
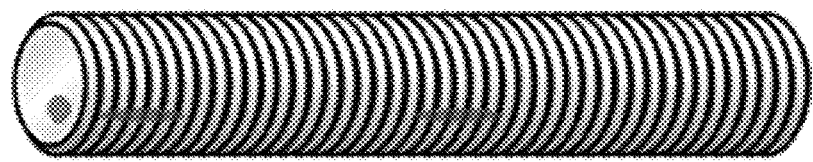

This disclosure relates to the coating of a batch of workpieces through the use non-rack plating processes such as barrel plating, vibratory plating, or other plating methods in which laminated coatings are provided on the workpieces. Such methods may be useful, e.g., for plating a quantity of smaller workpieces that may be difficult or too costly in terms of labor to rack plate. Embodiments described herein also provide mass transfer modulated processes in which the composition of the laminate layers are modulated through variations of current density, other process parameters in the plating process, or both.

Prior to setting forth this disclosure in more detail, it may be helpful to an understanding thereof to provide definitions of certain terms to be used herein. Additional definitions are set forth throughout this disclosure.

"Electrodeposition" or "electrodeposited" refers to a process or a resultant product, respectively, in which electrolysis is used to deposit a coating onto a workpiece. In other words, a workpiece is contacted with (e.g., partially immersed in, or fully immersed in) an electrolyte solution containing one or more ions (e.g., metal, ceramic, etc.) while an electric current is passed through the workpiece and the electrolyte solution, resulting in a thin coating being deposited on the surface of the workpiece.

For the purposes of this disclosure "coatings" include thin layers that are electrodeposited onto a surface of a workpiece. Therefore "coatings," as used herein, includes claddings, which are made of a series of thin electrodeposited layers on a surface of a mandrel, where the mandrel is removed after formation of the electrodeposited layers. Claddings are generally fastened to another article as a protective layer after formation.

For purposes of this disclosure, "laminate" or "laminated" refers to materials (e.g., coatings) that comprise two or more layers. "Nanolaminated coatings" within the meaning of this disclosure are coatings comprising two or more layers in which each of the individual layers has a thickness of less than 10,000 nanometers (i.e., 10 microns). In other words, the term "nanolaminated" in "nanolaminated coatings" in this disclosure refers to the thickness of the layers in the coating, not the overall thickness of the coating made up of the individual layers. The processes described herein are particularly suited for providing nanolaminated coatings, however, they certainly also can be used to make articles in which the individual layers that are thicker than 10 microns.

The term "wavelength" refers to the thickness of two adjacent layers that are formed in a single deposition cycle in embodiments where the current density is a periodic function.

The phrase "periodic layer" refers to an individual layer of a series of two or more, (e.g., three or more, or four or more) non-identical layers (types of electrodeposited layers) that are repeatedly applied to a workpiece. The series of non-identical layers that are repeatedly applied have variations in at least one of composition, grain size, metallic composition and/or structure from the other types of electrodeposited layers that are repeated applied in the series. In some embodiments, the series of non-identical layers are deposited in an alternating pattern of a first and a second layer.

"Fully dense" indicates that the electrodeposited material is substantially free from pinholes, void and cracks that would expose the substrate to corrosive agents ("corrodants") contacted with the coatings or claddings described herein.

The term "workpiece" includes any item with a surface onto which a coating is electrodeposited. Workpieces include substrates, which are objects on which a coating is applied, and mandrels, which are substrates from which the coating is removed after formation. Workpieces can be formed of a conductive material (e.g., a metal), formed of a mixture of conductive and non-conductive materials (e.g., a polymer-metal mixture), or coated with a conductive material (e.g., non-conductive material coated with a metal layer through electroless deposition).

A workpiece employed in embodiments of the present disclosure may be any suitable workpiece. In embodiments, a workpiece is made of a metal or metal alloy. In some embodiments, a workpiece is made of a steel alloy. In certain embodiments, a steel alloy includes: C and Fe; C, Fe, and Mo; or C, Fe, Mo, and Co. In other embodiments, a workpiece is made of a plastic or polymeric material. In some embodiments, a plastic or polymeric material includes arylamides, acrylamides, polybenzimidazole (PBI), polyetherimide, polyetherketoneketone (PEKK), polyether ether ketone (PEEK), polyamide, polyimide, polyamideimides, polyphenylene oxide (PPO), polystyrene (PS), polyphenylene oxide (PPO) and polystyrene (PS), polyphthalamide (PPA), polyvinyl alcohol (PVA), acrylonitrile butadiene styrene (ABS), polycarbonate (PC), polylactic acid (PLA), PC/ABS, cellulose fiber, polyphenylsulfone (PPSU), thermosets, PBI-PEEK, urea, epoxies, cyanate esters, polyurethanes, or any combination thereof.

An "article" describes a finished product of a workpiece that has been coated by a method as described herein. Therefore, an article is a workpiece with a laminate, nanolaminate, or microlaminate coating, or a cladding after the mandrel has been removed.

Embodiments provided herein provide a batch of metal articles having identifiable nanolaminate coating layers on plurality of the articles in the batch. In such processes, the "plurality of the articles" may comprise all of the articles in the batch, or may comprise a subset selected from all of the articles in the batch. In other words, not all of the articles in the batch may receive the desired nanolaminate plating and/or have the desired characteristics of one or more of the embodiments described herein. Where less than all of the articles in the batch possess the desired characteristics of a particular embodiment, then the "plurality" referred to herein will comprise those articles within the batch that are determined (after inspection, measurement and/or testing, if necessary) to have received a nanolaminate plating according to the processes described herein or have the desired characteristics as described herein.

As used herein, ASTM (ASTM International, 100 Barr Harbor Drive, PO Box C700, West Conshohocken, Pa., 19428-2959). Where an ASTM standard having more than one version is referenced in this disclosure and no version number is provided, the reference is understood to be directed to the ASTM standard in effect at the time the earliest priority document in the patent family is filed.

The term "about" has the meaning reasonably ascribed to it by a person of ordinary skill in the art when used in conjunction with a stated numerical value or range, i.e., denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

The term "substantially" has the meaning reasonably ascribed to it by a person of ordinary skill in the art when used to describe a physical characteristic of an item, i.e., indicating that the item possesses the referenced characteristic to a significant extent, e.g., to within a range of ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic. For example, an item may be considered substantially circular if any two measurements of a diameter of the item are within a range of ±20%, ±19%; ±18%; ±17%; ±16%; ±15%; ±14%; ±13%; ±12%; ±11%; ±10%; ±9%; ±8%; ±7%; ±6%; ±5%; ±4%; ±3%; ±2%; or ±1% of each other. When used in conjunction with a comparator (e.g., a first coating is substantially thicker than a second coating) substantially is used to mean that the difference is at least ±20% of the referenced characteristic; ±19% of the referenced characteristic; ±18% of the referenced characteristic; ±17% of the referenced characteristic; ±16% of the referenced characteristic; ±15% of the referenced characteristic; ±14% of the referenced characteristic; ±13% of the referenced characteristic; ±12% of the referenced characteristic; ±11% of the referenced characteristic; ±10% of the referenced characteristic; ±9% of the referenced characteristic; ±8% of the referenced characteristic; ±7% of the referenced characteristic; ±6% of the referenced characteristic; ±5% of the referenced characteristic; ±4% of the referenced characteristic; ±3% of the referenced characteristic; ±2% of the referenced characteristic; or ±1% of the referenced characteristic.

The terms "a," "an," "the," and similar articles or terms used in the context of describing the disclosure (especially in the context of the following claims) are to be construed to cover both the singular and the plural (i.e., "one or more"), unless otherwise indicated herein or clearly contradicted by context. Ranges of values recited herein are intended to serve as a shorthand method of referring individually to each separate value falling within the range. In the present description, any concentration range, percentage range, ratio range, or integer range is to be understood to include the value of any integer within the recited range and, when appropriate, fractions thereof (such as one tenth and one hundredth of an integer), unless otherwise indicated. Also, any number range recited herein relating to any physical feature, such as size or thickness, are to be understood to include any integer within the recited range, unless otherwise indicated. Unless otherwise indicated herein, each individual value is incorporated into the specification as if it were individually recited herein.

The use of the alternative (e.g., "or") should be understood to mean one, both, or any combination thereof of the alternatives. The various embodiments described above can be combined to provide further embodiments. Groupings of alternative elements or embodiments of the disclosure described herein should not be construed as limitations. Each member of a group may be referred to and claimed individually, or in any combination with other members of the group or other elements found herein. The phrase "or," as used herein in the specification and in the claims, should be understood to mean "either or both" of the elements so conjoined, i.e., elements that are conjunctively present in some cases and disjunctively present in other cases. Multiple elements listed with "or" should be construed in the same fashion, i.e., "one or more" of the elements so conjoined. Other elements may optionally be present other than the elements specifically identified by the "or" clause, whether related or unrelated to those elements specifically identified. Thus, as a non-limiting example, a reference to "A or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the context of this disclosure, the words "process" and "method" are synonymous. It should also be understood that, unless clearly indicated to the contrary, processes described herein and claimed below can include steps in addition to the steps recited, and the order of the steps or acts of the process is not necessarily limited to the order in which the steps or acts of the process are recited.

Each embodiment disclosed herein can comprise, consist essentially of, or consist of a particular stated element, step, ingredient, or component. The term "comprise" or "comprises" means "includes, but is not limited to," and allows for the inclusion of unspecified elements, steps, ingredients, or components, even in major amounts. The phrase "consisting of" excludes any element, step, ingredient, or component that is not specified. The phrase "consisting essentially of" limits the scope of the embodiment to the specified elements, steps, ingredients, or components, and to those that do not materially affect the basic and novel characteristics of the claimed disclosure.

In the claims, as well as in the specification, all transitional phrases such as "comprising," "comprised of," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure provides containment apparatuses that can be used to deposit nanolaminate coatings on workpieces. While in use, at least a portion of such containment apparatuses (e.g., a basket or barrel) contains one or more workpieces while allowing at least a portion of the workpieces to make contact with an electrodeposition bath. Methods of plating workpieces using the containment apparatuses are also provided herein.

Barrel Plating

In barrel plating processes, workpieces to be coated are placed in a containment apparatus (i.e., a plating barrel) made of plastic or other material that does not conduct electrical current. The plating barrel (referred to herein as the barrel) has openings around the circumference (e.g., apertures formed in the barrel wall, or sections of a mesh or perforated screen) such that when the barrel is placed into a plating bath containing a plating solution, the solution can pass through the openings in the circumference to the internal portion of the barrel and contact the workpieces to be coated. Typically a cathode (e.g., a cathode "dangler" or "dongle," which is so named because it is typically attached via a flexible conduit) is provided through an opening at each end of the barrel. The cathode extends into the barrel and remains in the interior of the barrel while the barrel is rotated about its horizontal, rotational axis. One or more anodes are provided in the plating solution external to the barrel.

In operation, the barrel is at least partially immersed in the plating bath and rotated. A current is applied between the anode(s) external to the barrel and the cathode(s) in the barrel. As the barrel is rotated, one or more workpieces in the barrel can intermittently contact each other and at least one of the cathodes, thereby completing a circuit between the cathode(s) and conductive articles. When the circuit is complete or "closed," the workpiece(s) in the circuit is negatively charged, and attract the positively charged ions from the anode and in the plating solution. Positively charged ions from the anode, the plating solution, or both that are able to reach the negatively charged workpiece(s) in the closed circuit plate onto the workpiece(s). Typically, more positively charged ions reach those workpieces that are at or near the "plating surface" of the barrel, which is the area near the outer circumference of the plating barrel. In the plating surface of the barrel there is less hindrance for the ions to reach and plate onto the surface of the negatively charged workpieces. The plating tends to occur principally on the workpieces that are present in the external portion of the barrel as that is where the attraction is the strongest.

Substantially any type of plating barrel can be used in accordance with this disclosure. Barrels are available from various manufacturers (e.g., Sterling Systems) in various lengths, diameters, and overall shapes (e.g., round or octagonal). For example, barrels come in various sizes such as 18 inches (in) by 36 in, 24 in by 60 in, 3 in by 5 in, 4 in by 6 in, 6 in by 6 in, 6 in by 9 in, 6 in by 12 in, or 10 in by 18 in.

Figure 3A:
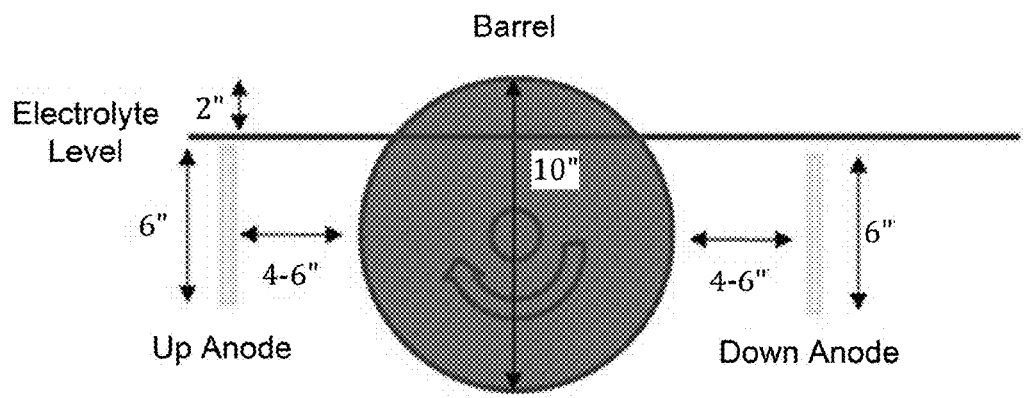
FIGS. 3A and 3B are schematic illustrations of an embodiment of a barrel plating configuration that may be used to provide nanolaminate coatings as described herein.
Figure 3B:
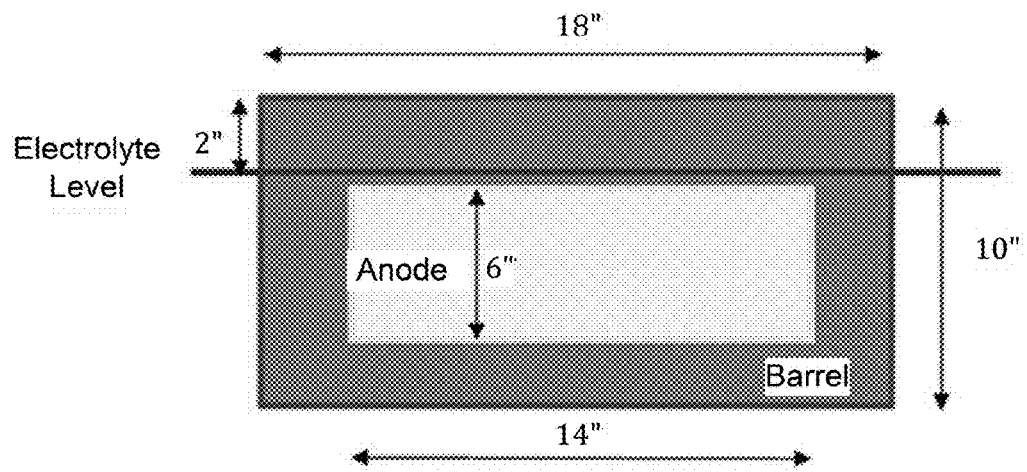

Barrels that do not have a circular cross section in the plane perpendicular to the axis of rotation may be employed to increase the mixing. For example, barrels that that have a hexagonal or octagonal cross section may be employed. Similarly, barrels with surface features (e.g., ridges) on the interior wall(s) to encourage mixing may be employed. An illustrative configuration of a barrel, electrolyte, and anodes is provided in FIGS. 3A and 3B.

The cathodes may be any shape, size, or configuration, as is understood by one of skill in the art. In embodiments, the cathodes are designed or modified to better remain substantially centered along the rotational axis in the barrel. In embodiments where cathode danglers are employed, supports are provided for the danglers to keep them positioned more toward the rotational axis of the barrel. In embodiments, such supports can comprise a non-conductive material such as PVC piping or other non-conductive plastic piping that at least partially covers the flexible portion of the dangler. Such supports also can serve to protect the danglers from being damaged by the workpieces being plated.

Commonly, two cathodes will be used. In some such embodiments, the lengths of the cathodes (e.g., cathode danglers) are such that when fully extended toward the center of the barrel, the cathodes are separated by a distance that is greater than the longest dimension of any of the workpieces to be plated so that a single workpiece could not cause a connection between the cathodes. The longer distance may aid in providing more uniform plating because more workpieces in the barrel may be charged with current during the process. In other embodiments, the cathodes, when fully extended toward the center of the barrel, are separated by a distance that is less than or the same as the longest dimension of any one of the workpieces to be plated. During operation, however, as the loaded barrel rotates, the downward weight of the workpieces in the barrel may cause some downward deflection of the cathodes, thereby lengthening the distance between the ends of the cathodes. Hence, during plating, shorter separation distances may be effectively increased.

Embodiments of the barrel plating processes describe herein include, for example:

(i) providing a barrel plating system comprising:
 (a) a plating barrel having a length and radius;
 (b) at least two cathode danglers being positioned in the plating barrel, the at least two cathode danglers having a length that, when fully extended into the center of the plating barrel, the ends of the danglers are separated by a distance (i.e., the combined lengths of the at least two cathode danglers is less than the length of the plating barrel);
 (c) an electrodeposition bath comprising one or more electrodepositable ions; and
 (d) at least one anode in the electrodeposition bath external to the plating barrel;
(ii) contacting at least a portion of a batch of workpieces to be coated positioned in the plating barrel with an electrodeposition bath, the workpieces having a longest dimension;
(iii) rotating the barrel;
(iv) electrodepositing a first identifiable layer onto at least a portion of the workpieces in the batch by applying a first electric current (e.g., a first constant current or a first time varying waveform) for a first amount of time via the cathodes, the first identifiable layer comprising at least a first and second electrodepositable ion of the one or more electrodepositable ions;
(vii) electrodepositing a second identifiable layer onto the portion of the workpieces in the batch by applying a second electric current (e.g., a second constant current or a second time varying waveform) for a second amount of time via the danglers, the second identifiable layer comprising at least the first and second electrodepositable ions, the composition, grain size, structure (e.g., microstructure or morphology), or thickness of the second identifiable layer is different from that of the first layer; and
(viii) optionally electrodepositing an additional layer onto the portion of the workpieces in the batch by applying an additional electric currents via the cathodes, the additional layer comprising at least the first and second electrodepositable ions, the composition, grain size, structure (e.g., microstructure or morphology), or thickness of the additional layer is different from that of the immediately preceding layer.

In some embodiments, the first layer has a thickness at one or more locations on the article ranging from about 150 nm to about 20,000 nm, the second layer having a thickness at one or more locations on the article ranging from about 150 nm to about 20,000 nm, or both. In additional embodiments, the additional layer has a thickness at one or more locations on the article ranging from about 150 nm to about 20,000 nm.

Further embodiments of the barrel plating processes describe herein include, for example:

(i) providing a plating barrel with a batch of metal articles to be coated, the plating barrel having a length and radius, wherein each of the articles has a longest dimension;

(ii) placing at least a portion of the plating barrel and metal articles into a tank containing an electrodeposition bath comprising one or more electrodepositable metal ions;

(iii) providing at least one anode in the electrodeposition bath external to the plating barrel;

(iv) providing at least two cathode danglers extending into opposite ends of the plating barrel, wherein when fully extended into the center of the plating barrel, the ends of the danglers are separated by a distance;

(v) rotating the barrel;

(vi) applying a first electric current (e.g., a first constant current or a first time varying waveform) for a first amount of time via the danglers, thereby causing a first identifiable metallic layer to be electrodeposited onto metal articles in the batch, the first layer having a thickness at one or more locations on the article ranging from about 150 nm to about 20,000 nm and comprising at least a first and second metal components;

(vii) applying a second electric current (e.g., a second constant current or a second time varying waveform) for a second amount of time via the danglers, thereby causing a second identifiable metallic layer to be electrodeposited onto metal articles in the batch having a thickness at one or more locations on the article ranging from about 150 nm to about 20,000 nm and comprising at least the first and second metal components, wherein the composition, grain size, and/or structure (e.g., microstructure or morphology) of the second layer is different from that of the first layer, and additionally the second layer also may vary in thickness from the first layer; and (viii) optionally applying one or more additional electric currents via the danglers to cause additional metallic layers to be electrodeposited onto metal articles in the batch, each of which has a thickness at one or more locations on the article ranging from about 150 nm to about 20,000 nm and comprising at least one of the first and second metal components, and wherein at least one feature selected from the group consisting of composition, grain size, and/or structure (e.g., microstructure or morphology) of each such additional metallic layer is different from at least one of the features in the immediately preceding layer.

In some embodiments, a thickness of a coating varies in different areas of an article. For example, a thickness of a coating can vary in threaded areas of an article. For comparison purposes, therefore, it may be easier or advantageous to measure and compare thickness on a target surface in a non-threaded area of the article. Such a target surface may be designated as a "significant surface," i.e., a surface on which to make determinations of coating thickness, and may be chosen, e.g., because it is a surface on which corrosion may be experienced. In other embodiments, it is advantageous to measure and compare a thickness in a threaded area of an article.

In barrel-plating systems, as the barrel rotates about its rotational axis (i.e., its longitudinal axis), the workpieces in the barrel move and tumble around the inside of the barrel. Movement of the workpieces is a function of the amplitude of the displacement of the containment system, workpiece size, and/or ratio of "loading fraction" to barrel size. The "loading fraction" is the ratio of the volume of workpieces (i.e., displacement volume) loaded into the barrel to the volume of the barrel.

At times during rotation of the barrel, a workpiece may be located in the interior part of the barrel near the barrel center where it is unlikely to become plated even if charged due to competition with the other workpieces in the barrel, which are blocking the ions from reaching the workpiece. At other times the workpiece will be located toward the exterior surface of the barrel (i.e., the plating surface) where ions can readily plate onto the workpiece if it is charged. At other times, the workpiece is somewhere between the barrel center and plating surface. The movement of workpieces in the barrel and frequency with which a workpieces appears and reappears at the plating surface during the plating process is referred to herein as "mixing."

The rate of mixing may be approximated by a "mixing fraction" in which the number of appearances at the plating surface of a workpiece within the batch that could be plated during fifty (50) rotations of the barrel, divided by the number of rotations of the barrel (i.e., 50). The greater the mixing fraction, the greater the number of times that article workpiece within a batch will appear at the plating surface of the barrel where it can be plated. In other words, as the mixing fraction increases, the more a particular workpiece in the batch will be plated. The mixing fraction can be empirically determined, e.g., by including differently colored "tracer" workpieces within a plating barrel and observing the number of appearances of the tracer workpieces at the plating surface during fifty rotations of the barrel as described in Example 4 below.

Similarly, as the barrel rotates, a group of workpieces in the barrel can simultaneously come into contact with each other and with the cathode(s) to complete or close the circuit between the cathode(s) and thus create a current between the cathode(s) that passes through and charges each workpiece in the group. At such times, the group of workpieces becomes negatively charged and deposition will occur on the negatively charged workpieces in the group that are at or near the plating surface. At other times, a group of workpieces in the barrel is not simultaneously touching each other and the cathodes and thus there is an open circuit between the cathodes. When there is no current between the cathode(s), there is no charge and no plating on the workpieces. As discussed herein, this deviation from the completed or closed circuit (when plating occurs) to an open circuit (when plating does not occur) is referred to herein as "chatter."

One formula that may be used for experimentally measuring the amount of such chatter during barrel plating is the absolute value of the applied signal less the mean of the measured signal, i.e.:

Chatter=|applied signal−mean of the measured signal|.

The goal is to produce systems in which the chatter is as close to zero as possible. However, systems in which the chatter is low but the standard deviation of the measured signal exceeds 20% of the applied signal may supply too much "noise" to provide desired plating results.

Chatter may be experimentally determined by taking measurements for any particular barrel, loading (including, e.g., loading fraction, "length fraction," and types of articles), voltage, RPM, and current. The ratio of the longest dimension of the metal articles in the batch to the radius of the barrel is the "length fraction." Mixing likewise may be experimentally determined as described above By comparing chatter and mixing among multiple potential combinations of barrels, loadings (e.g., amount, sizes, and constituents articles), RPM, applied currents, voltages, and other parameters discussed herein, one can vary the parameters of different systems to find and optimize combinations of parameters that can provide plating conditions that lead to the desired laminate and nanolaminate coatings (see, e.g., Examples 4 and 5 below).

Embodiments described herein that minimize chatter and maximize mixing also provide better results in terms improved uniformity of plating across multiple articles in the batch because workpieces will more often be both charged and near the plating surface of the barrel where they can be plated. Embodiments of the processes described herein can provide workpieces in the barrel with a laminated coating comprising at least two identifiable layers of electrodeposited coatings in which the composition, grain size, and/or grain structure (e.g., microstructure or morphology) of the first electrodeposited layer is different from the composition, grain size, and/or grain structure (e.g., microstructure or morphology) of the second electrodeposited layer. In other embodiments the process described herein can provide articles comprising three to twenty layers. In further embodiments the process described herein can provide articles comprising at least three identifiable layers, at least four identifiable layers, five to ten identifiable layers, ten to fifteen identifiable layers, fifteen to twenty identifiable layers, or more than twenty identifiable layers. Each identifiable layer of which differs in one or more features selected from composition, grain size, and/or grain structure (e.g., microstructure or morphology), and also potentially in thickness, from the immediately adjacent layers. Regardless of the number of identifiable layers, the layers may be applied using a bath having a single composition by varying one or more of the current/voltage, waveform, mixing rate, and temperature. Alternatively, it is possible to change the composition of the bath in situ or to move the barrel or a batch of workpieces to another bath during the process to apply coating layers differing in their wherein the composition, grain size, and/or grain structure (e.g., microstructure or morphology).

Vibratory Basket Plating

Other alternatives to rack plating may be used according to this disclosure, e.g., vibratory basket plating methods in which workpieces to be coated are placed inside of a containment system of a vibratory plating apparatus. In some embodiments, the containment system comprises a basket positioned around a center shaft. The basket comprises electrical contact points, e.g., buttons arranged symmetrically around the bottom of the basket, to provide a cathodic connection which are connected to a power supply. In some embodiments, the basket is porous (i.e., has one or more openings or includes sections of a mesh or perforated screen) such that when the containment system is placed into a plating bath, the electrolyte solution can pass through the openings into the containment system when it is immersed in a plating solution to contact the workpieces, and drained when it is removed from the solution. The basket may include ramps, deflectors, or other designs that facilitate movement of the workpieces within the basket.

The vibratory plating apparatus includes a frequency generator and vibrator plate that vibrates the basket at a predetermined frequency and amplitude, which causes the vibratory plate to twist back and forth, in turn causing the workpieces in the basket to slide and move around the center shaft of the basket.

In some embodiments, the basket can move around the center shaft at a predetermined rotations per minute (RPM), e.g., from 5 RPM to 20 RPM. In further embodiments, the basket can move around the center shaft at 5 RPM to 10 RPM, 10 RPM to 15 RPM, or 15 RPM to 20 RPM.

In operation, the basket is loaded with the workpieces to be coated and at least partially immersed in plating solution. An anode may be placed in the bath solution external to the basket. In some embodiments, an anode is placed beneath the basket. In further embodiments, two or more anodes are positioned external to the basket. Because the basket is porous, plating solution is able to enter the basket and contact the workpieces. The basket is vibrated at a predetermined frequency, rotated around the center shaft at a predetermined RPM, or both, while current is applied to the electrical contact points, e.g., buttons. As the basket moves, the workpieces slide over the surface of the basket and each other, and contact the electrical contact points, at which point they become negatively charged and are plated. The basket advantageously permits substantially uniform mixing and sliding of workpieces during the plating process.

In some embodiments of a vibratory system, the basket is connected to a motor or similar system via the center shaft, which causes displacement of the basket by a displacement distance (x) at a perodicity (p), where "p" is set to provide electrodeposition of a complete layer by applying the first current and a second complete layer by applying the second current, resulting in the formation of a targeted layer structure on a portion of the workpieces within the containment system. The displacement distance, x, and periodicity, p, are determined in part by the level of current variation (i.e., "chatter") measured for any given combination of system parameters (e.g., workpiece length fraction, loading fraction, and mean mixing fraction). The variables x and p are chosen to minimize the measured chatter of the system. In such embodiments, the processes may produce a plurality of articles in which the weight percent of a first component in any one article of the plurality does not differ by more than a specified amount, for example, six weight percent (wt. %) or less, from the weight percent of that same metal component in another article of the plurality.

Other Non-Rack Plating Methods Involving Containment Apparatuses

Alternatively, other non-rack plating methods may be used according to this disclosure to provide nanolaminated coatings as well as mass transfer modulated processes for making such coatings. For example, nanolaminate coatings may be provided through plating processes that involve movement of the workpieces to be plated within a containment apparatus that provides discontinuous contact of the workpieces to be plated with an electrical source. In other embodiments, nanolaminate coatings may be provided through plating processes that involve movement of the workpieces to be plated within a containment apparatus that provides substantially continuous contact of the workpieces to be plated with an electrical source.

For example, a rocking-type plating system could be constructed in which workpieces to be plated are held in a containment system comprising a basket having a conductive (e.g., metal) mesh bottom that can be flat or shaped, e.g., arcuate. In embodiments, the sides of the basket may be coated in a non-conductive coating, or made from a non-conductive material. In operation, the basket can be at least partially immersed in the electrodeposition bath and current applied to the conductive mesh bottom. One or more anode(s) may be placed in the bath external to the basket. In some embodiments, an anode is positioned below the basket. In embodiments, the basket is coupled to rocker arms, which, in use, rock the basket. The basket can be rocked back and forth in an arcuate motion about a longitudinal axis of rotation that would cause the workpieces to roll or shift along the basket bottom, substantially maintaining contact with the conductive mesh and providing a metered exposure of the surface to be coated depending on the rocking frequency. The longitudinal axis of rotation typically may be located outside of the electrodeposition bath. In other embodiments, the basket is tilted in one direction for a period and then tilted in the reverse direction for a period. In further embodiments, the basket is tilted in a first direction for a period of time, tiled in a second direction for a period of time, and tilted in a third direction for a period of time. In still further embodiments, the basket moves in a circular motion around a center shaft while tilted away from the center shaft.

Such a rocker-plating process can provide an acceptable replacement for rack plating of small workpiece. In some embodiments, the rocker-plating apparatus provides substantially continuous electrical contact with the workpiece(s) being plated without the need to physically attach each part to the electrical circuit. For example, such a process could be used for plating studs (i.e., threaded, cylindrical workpiece) given their ability to roll along the mesh bottom. Such a process could provide an additional advantage by minimizing damage during the plating process caused by forceful collisions between larger workpieces that can occur in processes such as barrel plating. Hence, such a process also could advantageously be used for plating heavier workpieces (e.g., studs) that cannot be barrel plated due to damage from collisions that can occur in the barrel during barrel plating. For example, the rocker-plating processes described herein can advantageously plate studs weighing more than 0.1 kg, more than 0.2 kg, more than 0.25 kg, more than 0.5 kg, more than 1 kg, more than 1.5 kg, more than 2 kg, or more than 2 kg with significantly less damage to the coating than an equivalent stud plating using a traditional barrel plating process.

In such rocker systems, the basket can be divided into compartments or lanes using non-conductive partitions, which themselves can be moveable or detachable (e.g., like refrigerator dividers) to facilitate loading of different size workpieces from batch to batch and run to run. For example, a rectangular basket could have four partitions to create five compartments or lanes within the basket. Workpieces to be coated then can be arranged along the conductive bottom with enough space in each compartment or lane to permit the workpieces to roll or move along the conductive mesh floor when the basket is rocked. The compartments or lanes can be sized so as to facilitate a substantially linear rolling motion for the workpieces and minimize any twisting of the workpieces that might impede rolling. For example, the width of the lane could be just slightly wider than the length of the workpieces, thereby permitting the workpieces to be laid aside of each other and then allowing the workpieces to roll freely in the direction of the arcuate or tilting motion, but impeding the workpieces from twisting within the lane.

In embodiments, the mesh bottom provides substantially continuous electrical contact with workpieces in the basket. Providing electricity to the mesh bottom could be accomplished in any number of ways, as is understood by one of skill in the art. For example, coated wire(s) could extend directly to contact points on the mesh bottom from outside of the bath. Alternatively, the rocker arms may be conductive and in contact with the basket such that the rocker arms conduct current from outside of the bath to the mesh bottom in the bath. In such embodiments, a portion of the basket that is to be immersed in the bath (e.g., the sides) then would be coated with a dielectric such as plastic so as to render such portions non-conductive. In embodiments, the rocker plating apparatus is a circular revolving wheel (like a Ferris wheel or a running wheel) that when partly submerged in the electrodeposition bath and rotated provides one or more continuous lanes for rolling of the workpieces to be coated.

In embodiments, the basket is connected to a motor or similar system which causes displacement of the basket by a displacement distance (x) at a frequency (h), where "h" is set to provide electrodeposition of a complete layer by applying the first current and a second complete layer by applying the second current resulting in the formation of a targeted layer structure on a portion of the metal workpieces within the containment system. The displacement distance, x, and frequency, h, are determined in part by the level of current variation (i.e., "chatter") measured for any given combination of system parameters (e.g., workpiece length fraction, loading fraction, and mean mixing fraction). The variables x and h are chosen to minimize the measured chatter of the system. The rocker arms can be rocked or tilted back and forth, e.g., in an arcuate, linear, or circular tilting motion, so as to encourage the workpieces to roll along the mesh bottom. In embodiments where the workpiece is a stud, the stud can roll back and forth so that it is continuously in contact with the mesh bottom, while maintaining substantially constant motion, which can help provide a substantially uniform laminate layer and help prevent the stud from "growing" and attaching to the mesh bottom.

As with the above barrel and vibratory basket plating processes, embodiments of the rocker plating systems also include mass transfer modulation as discussed above to modulate the composition of the nanolaminate layers. Such mass transfer modulation can take into account the movement of the basket, which also contributes to the mass transfer modulation effects described above.

Waveform, Voltage, Current, and Mass Transfer Frequency

Embodiments of the non-rack processes described herein provide mass-transfer modulated processes for providing nanolaminate coatings. In such processes, the alloy compositions in individual layers of the nanolaminate can be varied by modulating the frequency of the electrochemical deposition between different current densities. In embodiments, the current densities and other deposition parameters are coordinated with the parameters of the particular plating method used in order to achieve compositional modulation of the nanolaminate layers having the desired properties.

The characteristics of nanolaminate coatings applied by the various plating processes described herein, including layer thickness and stress, can be controlled by, among other things, controlling the voltage and current in the electrodeposition process. Current can be applied in a uniform and continuous manner for each type of layer (periodic layer) being applied to a workpiece. Current can also be applied in a predetermined pattern such as a waveform to electrodeposit one or more periodic layer(s). In particular, the waveform can be applied continuously or intermittently (pulsed)

to promote the electrodeposition process for each periodic layer. Intermittent reversal of the current applied in the electrodeposition process (pulse reverse) may be employed to improve the quality of the electrodeposited material (e.g., promote fully dense layers), alter grain size, and/or to alter the internal stress of the material being electrodeposited. Suitable waveforms include sine waves, square waves, saw tooth waves, triangle waves, or combinations thereof applied either sequentially or super positioned (superimposed).

In one embodiment an offset sine wave or sinewave-like function resulting from the superimposition of an offset current and a sinewave/sinewave-like function may be utilized to deposit a corrosion-resistant coating comprising one or more periodic layers where the coating has stress that is less than 400 MPa, less than 300 MPa, less than 200 MPa, less than 100 MPa, less than 50 MPa, less than 20 MPa, less than 10 MPa, or not measurable.

The voltage, current, and/or current density and the period of the wave forms may be varied. In embodiments, the voltage varies from 1 volt to about 10 volts, for example, the voltage may vary from 2 to 9 volts or from 3 to 8 volts. In embodiments, the voltage is varied from about 3 to about 8 volts. In some embodiments, the voltage varies from 3 to 4 volts, from 3 to 5 volts, from 3 to 6 volts, from 3 to 7 volts, from 4 to 5 volts, from 4 to 6 volts, from 4 to 7 volts, from 4 to 8 volts, from 4 to 9 volts, from 5 to 6 volts, from 5 to 7 volts, from 5 to 8 volts, from 5 to 9 volts, from 6 to 7 volts, from 6 to 8 volts, from 6 to 9 volts, from 7 to 8 volts, or from 7 to 9 volts. In embodiments, the voltage for the application of a second layer may be at least twice the voltage that is used for the application of a first layer. Depending upon the chemistry and pH of the bath, voltages below about 3.3 volts may not be sufficient to produce adequate plating results, and voltages above about 8 volts may produce unacceptable plating of metals such as nickel, as well as levels of noise and chatter that are too great to produce the desired plating results.

In embodiments, a first electric current that is applied to deposit a first layer is, for example, from about 10 to about 180 amps. In other embodiments, the first electric current is more than 180 amps. In further embodiments, the first electric current ranges from about 10 to about 20 amps, from about 20 to about 30 amps, from about 30 to about 40 amps, from about 40 to about 50 amps, from about 50 to about 60 amps, from about 60 to about 70 amps, from about 70 to about 80 amps, from about 80 to about 90 amps, from about 90 to about 100 amps, from about 100 to about 110 amps, from about 110 to about 120 amps, from about 120 to about 130 amps, from about 130 to about 140 amps, from about 140 to about 150 amps, from about 150 to about 160 amps, from about 160 to about 170 amps, from about 170 to about 180 amps, or more than 180 amps. In embodiments, the first electric current ranges from about 40 to about 140 amps. In such embodiments, the first electric current can range from about 40 to about 60 amps, from about 60 to about 80 amps, from about 80 to about 110 amps, from about 100 to about 140 amps, from about 70 to 80 amps, from about 80 to about 90 amps, from about 90 to about 100 amps, from about 100 to about 110 amps, from about 110 to about 120 amps, from about 120 to about 130 amps, and from about 130 to about 140 amps.

In some embodiments where the workpieces are washers, which are being nanolaminated, the first electrical current ranges from about 60 to about 70 amps. In particular embodiments where the workpieces are washers, the first electrical current is about 64 amps. In some embodiments where the workpieces are nuts that are being nanolaminated, the first current ranges from about 40 to about 60 amps. In particular embodiments where the workpieces are nuts, the first electrical current is about 50 amps. In some embodiments where the workpieces are studs that are being nanolaminated, the first current ranges from about 20 to about 30 amps. In particular embodiments where the workpieces are studs, the first electrical current is about 25 amps.

In embodiments, the second electric current that is applied to deposit a second layer is, for example, 10 about to about 180 amps. In other embodiments, the second electric current is more than 180 amps. In further embodiments, the second electric current ranges from about 10 to about 20 amps, from about 20 to about 30 amps, from about 30 to about 40 amps, from about 40 to about 60 amps, from about 40 to about 50 amps, from about 50 to about 60 amps, from about 60 to about 70 amps, from about 70 to about 80 amps, from about 80 to about 90 amps, from about 90 to about 100 amps, from about 90 to about 110 amps, from about 100 to about 110 amps, from about 110 to about 120 amps, from about 120 to about 130 amps, from about 130 to about 140 amps, from about 140 to about 150 amps, from about 150 to about 160 amps, from about 160 to about 170 amps, from about 170 to about 180 amps, or more than 180 amps. In embodiments, the current that is applied to deposit the second layer is about twice the current that is applied to deposit the first layer. In other embodiments, the current that is applied to deposit the second layer is significantly more than twice the current that is applied to deposit the first layer.

In embodiments where the workpieces are studs that are being nanolaminated, the second electric current ranges from about 40 to about 60 amps. In particular embodiments where the workpieces are studs, the second electrical current is about 50 amps. In some embodiments where the workpieces are nuts that are being nanolaminated, the second current ranges from about 90 to about 110 amps. In particular embodiments where the workpieces are nuts, the first electrical current is about 100 amps. In some embodiments where the workpieces are washers that are being nanolaminated, the first current ranges from about 120 to about 135 amps. In particular embodiments where the workpieces are washers, the first electrical current is about 128 amps.

In embodiments where one or more additional electric currents are provided to deposit one or more additional layers, each additional electric current may be the same as the first and/or second electrical current. In other embodiments, each additional electric current is 10 to 180 amps. In further embodiments, each additional electric current independently ranges from 10 to about 20, from about 20 to about 30, from about 30 to about 40, from about 40 to about 60, from about 40 to about 50, from about 50 to about 60, from about 60 to about 70, from about 70 to about 80, from about 80 to about 90, from about 90 to about 100, from about 90 to about 110, from about 100 to about 110, from about 110 to about 120, from about 120 to about 130, from about 130 to about 140, from about 140 to about 150, from about 150 to about 160, from about 160 to about 170, from about 170 to about 180 amps, or more than about 180 amps.

In embodiments, the first and second electric currents are repeated a number of times (for the same length of time as the first and second times) until the desired number of layers and/or overall coating thickness is reached.

In some embodiments, current density may be continuously or discretely varied with the range of about 0.5 to about 200 mA/cm$^2$. In barrel plating embodiments, the use of current density as a parameter is generally a less accurate measure of current because of the constantly changing surface area of the workpieces being plated. However, current density may come into play if the barrel plating equipment used requires input of a current density value.) In embodiments, current density values used range from about 1 to about 5 mA/cm², from about 5 to about 10 mA/cm², from about 10 to about 20 mA/cm², from about 20 to about 40 mA/cm², from about 40 to about 60 mA/cm², from about 60 to about 80 mA/cm², from about 80 to about 100 mA/cm², from about 100 to about 150 mA/cm², or from about 150 to about 200 mA/cm². In embodiments, higher current densities are used.

In some embodiments the frequency of the waveforms may be from about 0.01 Hz to about 50 Hz. In other embodiments the frequency can be from about 0.5 to about 10 Hz; from about 0.02 to about 1 Hz; from about 2 to about 20 Hz; or from about 1 to about 5 Hz.

The electric currents typically will be applied for times on the order of minutes to plate a given layer onto all or a substantial portion of the workpieces in the batch. In embodiments, the step of applying a first electric current for a first amount of time is carried out for a number of minutes ranging from about 0.5 to about 25 minutes. In other embodiments, the first electric current is applied for more than 25 minutes. In further embodiments, the first electric current is applied for a first amount of time ranging from about 0.5 to about 1 minute, from about 1 to about 3 minutes, from about 1 to about 4 minutes, from about 1 to about 5 minutes, from about 2 to about 4 minutes, from about 2 to about 5 minutes, from about 2 to about 6 minutes, from about 3 to about 6 minutes, from about 3 to about 7 minutes, from about 4 to about 6 minutes, from about 4 to about 7 minutes, from about 4 to about 8 minutes, from about 5 to about 8 minutes, from about 5 to about 9 minutes, from about 5 to about 10 minutes, from about 6 to about 8 minutes, from about 6 to about 9 minutes, from about 6 to about 10 minutes, from about 8 to about 12 minutes, from about 10 to about 15 minutes, from about 15 to about 20 minutes, from about 20 to 25 minutes, or greater than about 25 minutes.

In embodiments, the step of applying a second electric current for a second amount of time is carried out for a number of minutes, ranging from about 0.5 to about 25 minutes. In other embodiments, the second electric current is applied for more than 25 minutes. In further embodiments the second electric current is applied for a second amount of time ranging from about 0.5 to about 1 minutes, from about 1 to about 3 minutes, from about 1 to about 4 minutes, from about 1 to about 5 minutes, from about 2 to about 4 minutes, from about 2 to about 5 minutes, from about 2 to about 6 minutes, from about 3 to about 6 minutes, from about 3 to about 7 minutes, from about 4 to about 6 minutes, from about 4 to about 7 minutes, from about 4 to about 8 minutes, from about 5 to about 8 minutes, from about 5 to about 9 minutes, from about 5 to about 10 minutes, from about 6 to about 8 minutes, from about 6 to about 9 minutes, from about 6 to about 10 minutes, from about 8 to about 12 minutes, from about 10 to about 15 minutes, from about 15 to about 20 minutes, from about 20 to about 25 minutes, or greater than about 25 minutes.

In embodiments where one or more additional electric currents are provided to deposit one or more additional layers, the step of applying each additional electric current may be for the same number of minutes as for the first and/or second layers. In embodiments, each additional electric current is applied for a number minutes ranging from about 0.5 to about 25 minutes. In other embodiments, each additional electric current is applied for more than 25 minutes. In further embodiments, each additional electric current is applied for an amount of time ranging from about 0.5 to about 1 minutes, from about 1 to about 3 minutes, from about 1 to about 4 minutes, from about 1 to about 5 minutes, from about 2 to about 4 minutes, from about 2 to about 5 minutes, from about 2 to about 6 minutes, from about 3 to about 6 minutes, from about 3 to about 7 minutes, from about 4 to about 6 minutes, from about 4 to about 7 minutes, from about 4 to about 8 minutes, from about 5 to about 8 minutes, from about 5 to about 9 minutes, from about 5 to about 10 minutes, from about 6 to about 8 minutes, from about 6 to about 9 minutes, from about 6 to about 10 minutes, from about 8 to about 12 minutes, from about 10 to about 15 minutes, from about 15 to about 20 minutes, from about 20 to about 25 minutes, and greater than about 25 minutes.

In embodiments, the optional step of applying an additional current comprises repeating the first electric current for the first amount of time a number of additional times. In some embodiments, the first electric current is applied for the first amount of time 1 time, 2 times, 3 times, 4 times, 5 times, 6 times, 7 times, 8 times, 9 times, 10 times, 11 times, 12 times, 13 times, 14 times, 15 times, 16 times, 17 times, 18 times, 19 times, 20 times, or more than 20 times. In embodiments, the optional step of applying an additional current comprises repeating the second electric current for the second amount of time a number of additional times. In some embodiments, the second electric current is applied for the second amount of time 1 time, 2 times, 3 times, 4 times, 5 times, 6 times, 7 times, 8 times, 9 times, 10 times, 11 times, 12 times, 13 times, 14 times, 15 times, 16 times, 17 times, 18 times, 19 times, 20 times, or more than 20 times.

In embodiments, the optional step of electrodepositing additional layers comprises applying a current that is the same as the first or second electric current for a period of time that is the same as either the first or second amount of time. In other embodiments, the optional step of electrodepositing additional layers comprises applying a current that is the same as the first or second electric current for a period of time that is different from the first or second amount of time. In embodiments, the optional step of electrodepositing additional layers comprises applying a current that is different from the first or second electric current for a period of time that is the same as the first or second amount of time. In embodiments, the optional step of electrodepositing additional layers comprises applying a current that is different from the first or second electric current for a period of time that is different from either the first or second amount of time. Again, depending on the parameters discussed above, including voltage, current, and desired layer thickness, the amount of time for depositing each such additional layer likely will be on the order of minutes, e.g., from about 0.5 to about 1 minutes, from about 1 to about 2 minutes, from about 2 to about 3 minutes, from about 3 to about 4 minutes, from about 4 to about 5 minutes, from about 5 to about 6 minutes, from about 6 to about 7 minutes, from about 7 to about 8 minutes, from about 8 to about 9 minutes, from about 9 to about 10 minutes, from about 10 to about 11 minutes, from about 11 to about 12 minutes, from about 12 to about 14 minutes, from about 14 to about 16 minutes, from about 16 to about 18 minutes, from about 18 to about 20 minutes, from about 20 to about 25 minutes, or greater than about 25 minutes.

In embodiments, the power supply for the plating process is designed to minimizes noise. Illustrative power supply vendors include Dynatronix, American Plating Power, and Kepco.

Electrolytes and Optional Post-Treatments

Electrodeposition of the coatings, including individual layers, may be carried out using an electrolyte (plating bath) comprising a liquid/solvent, and ions of material(s) to be electrodeposited. Such baths are well known in the art. The liquid/solvent may be water, an organic solvent, an ionic liquid, a molten salt, or a combination thereof. In addition to the liquid/solvent the plating bath may comprise various salts (e.g., metal salts) that will become reduced at the cathode to produce electrodeposited metal(s). The bath may further comprise metalloids, polymers, ceramics, or ceramic like materials that may be present as, for example, particles that are electrophoretically deposited. During the deposition process, the constituents of the bath will be depleted and thus must be monitored and replenished as needed depending on the age of the bath.

A variety of ionic liquids are known that may be employed in electrodeposition of the coatings and claddings described herein. Suitable ionic liquids include those recited in Table 1 where EMIM is 1-ethyl-3-methylimidazolium, PMIM is 1-propyl-3-methylimidazolium, BMIM is 1-butyl-3-methylimidazolium, HMIM is 1-hexyl-3-methylimidazolium, DMIM is 1-decyl-3-methylimidazolium, b-diMIM is 1-butyl-2,3-dimethylimidazolium, OMIM is 1-methyl-3-octyl-imidazolium, BZMIM is 1-benzyl-3-methylimidazolium, and P14+ is a phosphorous cation:

TABLE 1

| Cation | Anion |
| --- | --- |
| [EMIM]$^+$ | [BF$_4$]$^-$ |
| | [(CF$_3$SO$_2$)$_2$N]$^-$ |
| [PMIM]$^+$ | [BF$_4$]$^-$ |
| | [(CF$_3$SO$_2$)$_2$N]$^-$ |
| [BMIM]$^+$ | [BF$_4$]$^-$ |
| | [PF$_6$]$^-$ |
| | [TfO]$^-$ |
| | [(CF$_3$SO$_2$)$_2$N]$^-$ |
| | [SbF$_6$]$^-$ |
| | [CF$_3$SO$_3$]$^-$ |
| [HMIM]$^+$ | [(CF$_3$SO$_2$)$_2$N]$^-$ |
| [OMIM]$^+$ | [BF$_4$]$^-$ |
| | [PF$_6$]$^-$ |
| | [(CF$_3$SO$_2$)$_2$N]$^-$ |
| [DMIM]$^+$ | [(CF$_3$SO$_2$)$_2$N]$^-$ |
| [b-diMIM]$^+$ | [BF$_4$]$^-$ |
| | [(CF$_3$SO$_2$)$_2$N]$^-$ |
| [BZMIM]$^+$ | [(CF$_3$SO$_2$)$_2$N]$^-$ |
| [OH(CH$_2$)$_2$-MIM]$^+$ | [(CF$_3$SO$_2$)$_2$N]$^-$ |
| [P$_{14}$]$^+$ | [(CF$_3$SO$_2$)$_2$N]$^-$ |
| n-butylammonium | [SCN]$^-$ |
| sec-butylammonium | [SCN]$^-$ |
| dipropylammonium | [SCN]$^-$ |
| ethylammonium | [NO$_3$]$^-$ |
| n-propylammonium | [NO$_3$]$^-$ |
| tributylammonium | [NO$_3$]$^-$ |
| tetrabutylammonium | [CHES]$^-$ |
| tetrapropylammonium | [CHES]$^-$ |
| tetrapentylammonium | [(CF$_3$SO$_2$)$_2$N]$^-$ |

The coatings may be subject to an adjunct treatment, for example, chromate, carbonate, or heat treatment using techniques known to one of skill in the art, in order to increase corrosion resistance, hardness, or some other property of the coating.

Other Parameters that Affect Plating

Additional parameters of the plating process can affect the plating results. As discussed above, embodiments that maximize mixing and minimize chatter will tend to provide better results in terms improved uniformity of plating across multiple articles in the batch.

Further, in addition to varying the applied electric current as discussed above to produce periodic layers that vary in composition or in microstructure, one or more of electrolyte temperature, pH, electrolyte additive concentration, or electrolyte agitation may be varied alone or in combination with changes in the applied current to produce one or more of the layers of the coating.

For barrel plating, one example of such a parameter is the ratio of the longest dimension of the workpieces to be coated to the radius of the barrel, i.e., the length fraction. In embodiments, this ratio is less than about 1.5, less than about 1.3, less than about 1.1, less than about 1.0, less than about 0.9, less than about 0.8. less than about 0.75, less than about 0.7, less than about 0.6, less than about 0.5, less than about 0.45, less than about 0.4, less than about 0.35, less than about 0.3, less than about 0.25, or less than about 0.2. In other embodiments, this ratio ranges from about 0.1 to about 1.5. in some embodiments, this ratio ranges from about 0.1 to about 0.2, from about 0.2 to about 0.3, from about 0.2 to about 0.4, from about 0.2 to about 0.5, from about 0.2 to about 0.6, from about 0.2 to about 0.7, from about 0.2 to about 0.8, from about 0.3 to about 0.4, from about 0.3 to about 0.5, from about 0.3 to about 0.6, from about 0.3 to about 0.7, from about 0.3 to about 0.8, from about 0.4 to about 0.5, from about 0.4 to about 0.6, from about 0.4 to about 0.7, from about 0.4 to about 0.8, from about 0.5 to about 0.6, from about 0.5 to about 0.6, from about 0.5 to about 0.7, from about 0.5 to about 0.8, from about 0.6 to about 0.7, from about 0.6 to about 0.75, from about 0.6 to about 0.8, from about 0.6 to about 0.9, from about 0.7 to about 0.8, from about 0.7 to about 0.9, from about 0.8 to about 1.0, from about 0.8 to about 1.1, from about 0.8 to about 1.2, from about 0.9 to about 1.1, from about 0.9 to about 1.2, from about 0.9 to about 1.3, from about 1.0 to about 1.1, from about 1.0 to about 1.2, from about 1.0 to about 1.3, from about 1.0 to about 1.4, from about 1.1 to about 1.2, from about 1.1 to about 1.3, from about 1.1 to about 1.4, from about 1.1 to about 1.5, from about 1.2 to about 1.3, from about 1.2 to about 1.4, or from about 1.2 to about 1.5. In some embodiments of the processes disclosed herein, a length fraction ranging from about 0.6 to about 0.75 provides an acceptable result. In further embodiments, a length fraction of about 0.67 can provide acceptable results (see Example 1 below).

In other embodiments, the parameters of the system are adjusted to permit plating of articles having a greater length fraction. In such embodiments, the length fraction may be up to about 1.1 or about 1.3. In further such embodiments, the length fraction may be greater than 1.3. Altering parameters such as the loading fraction and/or composition of the types of workpieces in the barrel, as well as other parameters such as RPM and current may permit higher length fractions to be used successfully.

The loading volume fraction, which is the ratio of the packing volume of the workpieces to the volume of the portion of the containment apparatus that holds the workpieces to be plated, e.g., the plating barrel, vibratory basket, or rocking rack, is another parameter that can be adjusted to modify the plating results. In the case of solid workpieces, the loading volume fraction will be the same as the loading fraction (i.e., the ratio of the volume of the workpieces to the volume of the containment apparatus). Packing volume is the volume of a workpiece if it was treated as a geometric solid. For example, in the case of a washer, the packing volume would not consider the hole in the washer. Thus, the packing volume would be greater than the displacement volume. Accordingly, in the case of workpieces that are not solid objects (e.g., washers and nuts), packing volume (as opposed to displacement volume) should be used.

In barrel plating embodiments, if a loading fraction is too great, then chatter will be reduced, but mixing also will be reduced, potentially resulting in reduced plating uniformity among the articles in the batch, including in the deposition of multiple layers. Conversely, if the loading fraction is too low, then mixing will be improved, but chatter will be increased, again potentially resulting in reduced plating uniformity among the articles in the batch.

In embodiments, the loading fraction is less than specified a value, for example, less than about 0.7 (i.e., 70%), less than about 0.6, less than about 0.5, less than about 0.4, less than about 0.35, less than about 0.3, less than about 0.25 less than about 0.2, less than about 0.15, or less than about 0.1. In embodiments, the processes herein have loading fractions, for example, ranging from about 0.05 to about 0.10, from about 0.05 to about 0.15, from about 0.05 to about 0.20, from about 0.05 to about 0.25, from about 0.05 to about 0.3, from about 0.05 to about 0.35, from about 0.05 to about 0.4, from about 0.10 to about 0.15, from about 0.10 to about 0.20, from about 0.10 to about 0.25, from about 0.10 to about 0.3, from about 0.1 to about 0.35, from about 0.1 to about 0.4, from about 0.15 to about 0.20, from about 0.15 to about 0.25, from about 0.15 to about 0.30, from about 0.15 to about 0.35, from about 0.15 to about 0.40, from about 0.15 to about 0.45, from about 0.20 to about 0.25, from about 0.20 to about 0.30, from about 0.20 to about 0.35, from about 0.20 to about 0.40, from about 0.20 to about 0.45, from about 0.25 to about 0.30, from about 0.25 to about 0.35, from about 0.25 to about 0.40, from about 0.25 to about 0.45, from about 0.30 to about 0.35, from about 0.30 to about 0.40, from about 0.30 to about 0.45, from about 0.30 to about 0.50, from about 0.35 to about 0.40, from about 0.35 to about 0.45, from about 0.35 to about 0.50, from about 0.35 to about 0.60, from about 0.40 to about 0.50, from about 0.40 to about 0.60, or from about 0.50 to about 0.60. Generally speaking, loading fractions ranging from about 0.05 to about 0.4 can provide acceptable plating results depending on the other parameters of the specific barrel-plating system discussed herein. In some embodiments, the loading fraction ranges from about 0.2 to about 0.4.

Loading fraction can be used in determining the volume of workpieces loaded in a containment apparatus, e.g., barrel, vibratory basket or rocking rack.

Another measure of loading is "apparent loading," which is an experimentally determined ratio of (i) the number of workpieces, e.g., fasteners, nuts, washers, etc., that are actually loaded into a barrel, basket, or other containment apparatus to (ii) the number of workpieces, e.g., fasteners, nuts, washers, etc. that can be physically loaded into the barrel, basket, or other containment apparatus. In some embodiments where apparent loading is used to determine loading, apparent loading percentages ranging from about 10% to about 80% are used. In further embodiments, apparent loading percentages of more than about 10% are used. In some embodiments, apparent loadings range from about 10% to about 20%, from about 10% to about 30%, from about 10% to about 40%, from about 15% to about 25%, from about 15% to about 35%, from about 15% to about 45%, from about 20% to about 30%, from about 20% to about 40%, from about 25% to about 35%, from about 25% to about 45%, from about 25% to about 55%, from about 25% to about 65%, from about 25% to about 75%, from about 30% to about 40%, from about 30% to about 50%, from about 30% to about 60%, from about 30% to about 70%, from about 40% to about 50%, from about 40% to about 60%, from about 40% to about 70%, from about 40% to about 80%, from about 50% to about 60%, from about 50% to about 70%, or from about 50% to about 80%. It is noted that apparent loading values may have some variability because the value is experimentally derived by actually loading workpieces in a barrel, basket, or other containment apparatus and thus can vary based on the packing of the workpieces in any given attempt to determine how many workpieces can be loaded.

The types and geometries of workpieces to be plated also can affect the plating results. For example, one set of parameters may give acceptable results when one type of workpiece is being plated, e.g., studs or bolts of the same size. A different set of parameters may give acceptable results when multiple types of workpieces are being plated, e.g., studs together with nuts and washers. That is because the presence of smaller workpieces may facilitate the mixing of larger articles in the barrel, basket, or other containment apparatus such that a greater loading fraction or length fraction may be employed. Additionally or alternatively, items such as stainless steel balls can be added to facilitate better mixing among the workpieces in the containment apparatus.

The revolutions per minute (RPM) of the barrel, vibratory basket, rocker plating apparatus, or other containment apparatus is another parameter that can affect plating results. In embodiments, the containment apparatus is rotated during the application of the first and second currents at a specified rate of RPM, for example, at least 3 RPM. In some embodiments, the containment apparatus is rotated at an RPM ranging from about 3 to about 20 RPM. In some embodiments, the containment apparatus is rotated at an RPM ranging from about 3 to 4 RPM, from about 3 to 5 RPM, from about 3 to about 6 RPM, from about 3 to about 7 RPM, from about 4 to about 5 RPM, from about 4 to about 6 RPM, from about 4 to about 7 RPM, from about 4 to about 8 RPM, from about 5 to about 6 RPM, from about 5 to about 7 RPM, from about 5 to about 8 RPM, from about 5 to about 9 RPM, from about 5 to about 10 RPM, from about 6 to about 7 RPM, from about 6 to about 8 RPM, from about 6 to about 9 RPM, from about 6 to about 10 RPM, from about 7 to about 8 RPM, from about 7 to about 9 RPM, from about 7 to about 10 RPM, from about 8 to about 9 RPM, from about 8 to about 10 RPM, from about 8 to about 11 RPM, from about 8 to about 12 RPM, from about 10 to about 12 RPM, from about 10 to about 15 RPM, from about 15 to about 18 RPM, from about 15 to about 20 RPM, or more than about 20 RPM. Generally speaking, for barrel plating embodiments, rates of RPM ranging from about 3 RPM to about 8 RPM can provide acceptable plating results depending on the other parameters of the specific barrel-plating system discussed herein. Generally speaking, for vibratory basket plating, RPMs ranging from about 6 RPM to about 20 RPM may provide acceptable plating results, again depending on the other parameters of the specific vibratory basket system. Once the other parameters in the system have been set, the RPM may be varied to improve the overall plating results, e.g., by improving chatter and mixing in a barrel plating system.

In barrel plating embodiments, a number of parameters can thus be tested and adjusted to achieve a barrel plating system in which nanolaminate coatings may be obtained on a desired proportion of workpieces or a plurality of workpieces in the batch. For example, length fraction, loading fraction, RPM, and the type(s) of workpieces to be plated can all affect the plating results. The amount of chatter and mixing also may be experimentally determined by taking measurements for any particular barrel plating system including loading (e.g., loading fraction, length fraction, and types of articles), voltage, RPM, and current.

Likewise, in vibratory or rocker embodiments, a number of parameters can be tested and adjusted to achieve a plating system in which nanolaminate coatings may be obtained on a plurality of workpieces in the batch. For example, length fraction, loading fraction, RPM, and the type(s) of workpieces to be plated can all affect the plating results.

Layer and Coating Thicknesses

In embodiments of the processes described herein, the first and second layers in the articles in the plurality have a thickness greater than about 150 nm, e.g., ranging from about 150 to about 5000 nm. In further embodiments, the first and second layers in the articles in the plurality have a thickness, e.g., independently ranging from about 200 to about 500 nm, from about 200 to about 300 nm, from about 300 to about 400 nm, from about 400 to about 500 nm, from about 500 to about 750 nm, from about 500 to about 1000 nm, from about 500 to about 600 nm, from about 600 to about 700 nm, from about 700 to about 800 nm, from about 800 to about 900 nm, from about 900 to about 1000 nm, from about 1000 to about 1250 nm, from about 1000 to about 1500 nm, from about 1250 to about 1500 nm, from about 1500 to about 2000 nm, from about 2000 to about 2500 nm, from about 2500 to about 3000 nm, from about 3000 to about 4000 nm, from about 4000 to about 5000 nm, or greater than 5000 nm. In embodiments, the first and second layers have a minimum thickness of at least about 200 nm. In embodiments, the first and second layers have a minimum thickness of at least about 250 nm. In particular embodiments, the first and/or second layer has a thickness ranging from about 200 to about 400 nm. In other embodiments, the first and/or second layer has a thickness ranging from about 250 to about 350 nm.

In embodiments, the second layer is substantially thicker than the first layer. For example, the thickness of the first layer may range from about 200 to about 400 nm, and the thickness of the second layer may range from about 600 to about 1000 nm. In embodiments, the thickness of the second layer is approximately a multiple of the thickness of the first layer, e.g., approximately two times (2x), three times (3x), or four times (4x) the thickness of the first layer. For example, if the first layer is about 250 nm thick, the second layer may be about 500 nm thick or about 750 nm thick. In embodiments, the thickness of the first layer ranges from about 200 to about 300 nm and the thickness of the second layer ranges from about 400 to about 600 nm. In further embodiments, the thickness of the first layer ranges from about 200 to about 300 nm and the thickness of the second layer ranges from about 600 to about 900 nm. In embodiments, individual layer thicknesses range up to 5000 nm. In other embodiments, individual layer thicknesses range more than 5000 nm.

Commonly, one or more additional layers will be applied, and each additional layer independently can have a thickness of at least about 150 nm, e.g., independently ranging from about 150 to about 5000 nm. In embodiments, each additional layer has a thickness, e.g., from about 200 to about 500, from about 200 to about 300, from about 300 to about 400, from about 400 to about 500, from about 500 to about 750, from about 500 to about 1000, from about 500 to about 600, from about 600 to about 700, from about 700 to about 800, from about 800 to about 900, from about 900 to about 1000, from about 1000 to about 1250, from about 1000 to about 1500, from about 1250 to about 1500, from about 1500 to about 2000, from about 2000 to about 2500, from about 2500 to about 3000, from about 3000 to about 4000, from about 4000 to about 5000, or greater than about 5000 nm. As with the first and second layers, the one or more additional layers will generally have a minimum thickness of at least about 200 nm. In other embodiments, the one or more additional layers will generally have a minimum thickness of at least about 250 nm. For example, the first and/or second layer may have a thickness independently ranging from about 200 to about 400 nm or about 250 to about 350 nm.

Generally speaking, it may be desired to provide overall coating thicknesses ranging from about 5 to about 15 microns. In some embodiments, it is desired that the overall coating thickness ranges from about 6 to about 10 microns, from about 6 to about 12 microns, from about 8 to about 10 microns, from about 8 to about 12 microns, from about 10 to about 12 microns, or from about 12 to about 15 microns. The overall or combined thickness of the electrodeposited layers (i.e., the thickness of the coating) on the plurality of articles can be at least about 300 nm. In other embodiments, the thickness of the coating ranges from about 300 nm to about 50 microns. In further embodiments, the thickness of the coating ranges from about 500 nm to about 50 microns. In still further embodiments, the thickness of the coating is greater than about 50 microns. The overall coating thickness may range from about 400 to about 500 nm, from about 500 to about 750 nm, from about 500 to about 1,000 nm, from about 750 to about 1,000 nm, from about 500 to about 600 nm, from about 600 to about 700 nm, from about 700 to about 800 nm, from about 800 to about 900 nm, from about 900 to about 1,000 nm, from about 1,000 to about 1,500 nm, from about 1,500 to about 2,000 nm, from about 2,000 to about 3,000 nm, from about 3,000 to about 4,000 nm, from about 4,000 to about 5,000 nm, from about 5,000 to about 6,000 nm, from about 6,000 to about 7,000 nm, from about 7,000 to about 8,000 nm, from about 8,000 to about 9,000 nm, from about 9,000 to about 10,000 nm, from about 10,000 to about 11,000 nm, from about 11,000 to about 12,000 nm, from about 12,000 to about 13,000 nm, from about 13,000 to about 14,000 nm, from about 14,000 to about 15,000 nm, from about 15,000 to about 16,000 nm, from about 16,000 to about 17,000 nm, from about 17,000 to about 18,000 nm, from about 18,000 to about 19,000 nm, from about 19,000 to about 20,000 nm, from about 20,000 to about 25,000 nm, from about 25,000 to about 30,000 nm, from about 30,000 to about 40,000 nm, from about 40,000 to about 50,000 nm, or be greater than about 50,000 nm. In embodiments, the combined thickness of the layers on the plurality of articles can range from about 200 to about 50,000 nm. In some embodiments, the combined thickness of the layers on the plurality of articles can range from about 5,000 to about 15,000 nm (from about 5 to about 15 microns) or from about 8,000 to about 12,000 (from about 8 to about 12 microns).

Where the workpieces to be plated are threaded, the coating thickness generally is about 12 microns or less, e.g., the coating thickness may range from about 6 to about 12 microns. In some embodiments where the workpieces to be plated are threaded, the coating thickness ranges from about 8 to about 10 microns. Depending on the desired total thickness and desired thickness of the individual layers, a total number of layers ranging from 10 to 18 may be desirable. In some embodiments, 12 to 15 total layers may be deposited.

One consideration in coating threaded workpieces such as nuts, bolts, and studs is the possibility for substantial variation in composition and deposition rate between the non-threaded surfaces and the threads. Where the workpieces are to be exposed to corrosive conditions and thus coated to provide corrosion resistance, generally non-threaded surfaces may be exposed more to corrosive conditions than the threaded surface and thus can be chosen as a target surfaces for evaluating the coating.

Examples of the different surfaces of workpieces where measurements can be taken, including significant surfaces, are provided in FIGS. 1A-1E. As shown, for a nut or washer, the significant surface may be designated as a face of the nut or washer. For a bolt, the significant surface may be designated as the top of the head of the bolt, and for a stud, the significant surface may be designated as a non-threaded end of the stud (as shown). Such non-threaded surfaces also are more accessible to electrolyte and current than the threads and as a result exhibit higher deposition rates on average. The thread peaks, however, act as sharp asperities during deposition and the associated current crowding on these surfaces leads to higher localized deposition rates and also may have higher proportions of one or more of the components. For example, where a ZnNi coating is to be applied, the percentage of nickel may be higher in the threaded region. Conversely, the thread "valleys" are substantially more difficult to coat because of the current that is thieved by the thread peaks. The result is that thread valley thicknesses can be thinner than the non-threaded surfaces or the thread peaks. Hence, the systems and parameters employed in the plating process should be optimized to ensure that the target surfaces meet target composition and thickness without leaving the coating on the thread valleys too thin or the coating on the thread peaks too thick. Given this variation, in practice the system and parameters may be designed to apply a coating on the one or more non-threaded surfaces of the workpiece to be coated having a composition and thickness within specified ranges. The process and parameters typically will be adjusted so that the thickness of the coatings in the threads is not so great so as to make the surfaces incapable of mating with the corresponding threaded surfaces. As noted above, the non-threaded surfaces are typically a good location for measuring and comparing the thickness and composition of a nanolaminate coating among the articles in the batch because of the greater uniformity of deposition on such surfaces. Generally speaking, when comparing the coating thickness and composition among two or more articles in a batch, it is preferable to compare the thickness and/or composition at the same location on each of the articles. Such comparisons also can be made at the multiple locations on plated articles in a batch, again comparing the coating thickness and/or composition at each location on one article (e.g., middle-thread peak or valley, or end thread peak or valley) with the coating thickness and/or composition at the same locations on another article.

Depending on several parameters, including the part geometry of the non-threaded surface, and the age and composition of the bath, the deposition rates may range from less than 1 um/hr to more than 10 um/hr. In various embodiments, deposition ranges are less than 0.5 um/hr or range from about 0.5 to about 1 um/hr, from about 1 to about 2 um/hr, from about 1 to about 3 um/hr, from about 1 to about 4 um/hr, from about 1 to about 5 um/hr, from about 2 to about 3 um/hr, from about 2 to about 4 um/hr, from about 2 to about 5 um/hr, from about 2 to about 6 um/hr, from about 2 to about 7 um/hr, from about 2 to about 8 um/hr, from about 2 to about 9 um/hr, from about 2 to about 10 um/hr, from about 3 to about 4 um/hr, from about 3 to about 5 um/hr, from about 3 to about 6 um/hr, from about 3 to about 7 um/hr, from about 3 to about 8 um/hr, from about 3 to about 9 um/hr, from about 3 to about 10 um/hr, from about 4 to about 5 um/hr, from about 4 to about 6 um/hr, from about 4 to about 7 um/hr, from about 4 to about 8 um/hr, from about 4 to about 9 um/hr, from about 4 to about 10 um/hr, from about 5 to about 6 um/hr, from about 5 to about 7 um/hr, from about 5 to about 8 um/hr, from about 5 to about 9 um/hr, from about 5 to about 10 um/hr, from about 6 to about 7 um/hr, from about 6 to about 8 um/hr, from about 6 to about 9 um/hr, from about 6 to about 10 um/hr, from about 7 to about 8 um/hr, from about 7 to about 9 um/hr, from about 7 to about 10 um/hr, from about 8 to about 10 um/hr, from about 9 to about 10 um/hr, from about 10 to about 15 um/hr, or from about 15 to about 20 um/hr.

The Nanolaminate Coating

By adjusting the plating parameters discussed above, the workpieces in the batch can be plated with identifiable layers. As used herein, "identifiable layers" are distinct layers that differ in composition and/or structure from the adjacent layers. The identifiable layers may be visualized using any procedure that is appropriate, as would be understood by one of skill in the art. In one procedure, the article is first sectioned with a diamond saw to reveal a cross-section. The sectioned portion of the article to be visualized is then secured, e.g., by mounting the sectioned material in an epoxy resin. The sectioned material is then ground and polished with sandpaper and alumina to prepare for etching. The prepared material is then chemically etched with an etchant that etches slowly, e.g., Nital etch, and observed under a Scanning Electron Microscope (SEM) using a backscatter detector.

Such etching techniques reveal that the plated articles provided by this disclosure will have nanolaminate coatings that comprise identifiable layers. Further, for barrel plating embodiments, the coatings are distinguishable from nanolaminate coatings provided by rack-plating.

An interface between individual layers may be discrete or diffuse. An interface between the neighboring layers is considered to be "discrete" if the composition shifts between a first layer and a second layer over a distance that is less than about 20% of a thickness of the thinner of the two layers. In embodiments, an interface between neighboring layers is considered to be discrete if the composition shifts between a first layer and a second layer over a distance that is less than about 15%, about 10%, about 8%, about 5%, about 4% or about 2% of a thickness of the thinner of the layers.

In embodiments, an interface is "diffuse" if the composition shifts between a first layer and a second layer over a more than about 20% of the thickness of a thinner of the two layers. In embodiments, an interface between neighboring layers is considered to be diffuse if the composition shifts between a first layer and a second layer over a distance that is more than about 15%, about 10%, about 8%, about 5%, about 4% or about 2% of a thickness of the thinner of the layers.

In embodiments, a diffuse interface has a composition shift between a first layer and a second layer over a thickness in a range of about 0.5 nm to about 5 nm. In some embodiments, a diffuse interface has a thickness in a range of about 0.5 nm to about 3 nm, about 1 nm to about 4 nm, or about 2 nm to about 5 nm. In further embodiments, a diffuse interface has a thickness in a range of about 0.5 nm to about 1 nm, about 1 nm to about 2 nm, about 2 nm to 3 nm, from about 3 nm to about 4 nm, or from about 4 nm to about 5 nm.

Figure 2A:
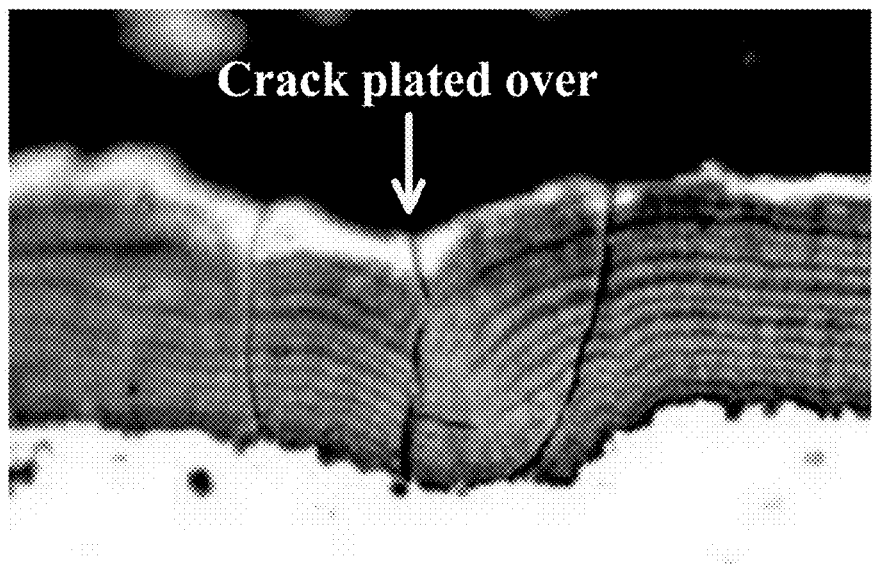
FIGS. 2A, 2B, and 2C are scanning electron micrograph cross-section images of nanolaminate coatings in accordance with embodiments of this disclosure.
Figure 2B:
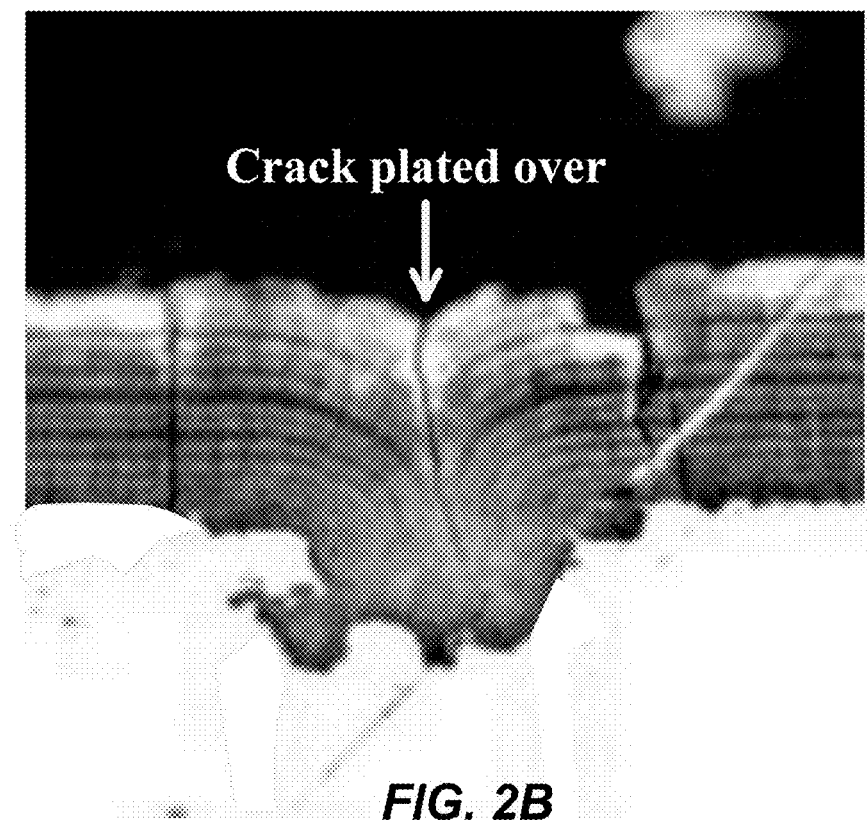
Figure 2C:

As shown in FIGS. 2A, 2B, and 2C, the barrel-plated nanolaminate coatings commonly will comprise one or more random "injury discontinuities" in the coating that result from collisions between articles in the barrel as they tumble into and over one another during the plating process. As shown in FIGS. 2A, 2B, and 2C, these injury discontinuities typically may take the form of an inward gash, indentation, or inward deformation from the coating surface of the nanolaminate coating toward the surface of the workpiece. The layers of the nanolaminate coating on either side of the injury discontinuity are deformed in a direction along the direction of the gash, indentation or deformation again, typically in a direction toward the substrate surface. As also seen in FIGS. 2A and 2B, the injury discontinuities may include a crack or split that extends to or near the surface of the substrate, and may be in a direction that is substantially perpendicular to the coating surface. As shown if FIG. 2C, the injury discontinuity may not include a crack or split in the coating, but rather only an indentation of the coating layer, which additionally may be plated over by metal. FIG. 2C exemplifies an indentation that is plated over. In other embodiments, such indentations are not plated over, however, e.g., if they are formed near the end of the barrel plating run. As also shown in FIGS. 2A, 2B, and 2C, the injury discontinuity also typically contains material plated in the discontinuity itself. That is, once formed during the plating process, the discontinuity is then typically plated over by subsequent plating steps. It is noted that the substantially clean, vertical discontinuities in FIGS. 2A and 2B that appear to be uniform breaks from the surface to the substrate with no plating-over by metal or deformation of the layers inwardly from the coating surface toward the substrate surface are likely caused by surface preparation for etching and not from the barrel plating process.

In practice, the processes disclosed herein can provide a batch of articles in which a plurality of the articles has a desired distribution of characteristics. That is, within ranges, the plurality can be substantially fully dense (having no pinholes or cracks that propagate from the coating surface to the surface of the article) and can have the desired number of layers, desired overall coating thickness, and desired compositions of the layers at one or more locations on the articles, e.g., on a non-threaded surface. Depending on the desired characteristics and ranges, by adjusting the parameters discussed herein, the plurality can comprise a majority of the articles in the batch, e.g., at least 70%, at least 75%, at least 80%, at least 85%, at least 90%, at least 95%, or at least 97%.

For example, in embodiments, a plurality of plated articles produced according to this disclosure can have a total nanolaminate coating thickness at one location on the article that is within 6 microns or less of the average thickness of the nanolaminate coating at the same location on the other articles in the plurality that are of the same size and shape. In other embodiments, a plurality of plated articles produced according to this disclosure can have a total nanolaminate coating thickness at one location on the article that is within 5 microns or less of the average thickness of the nanolaminate coating at the same location on the other articles in the plurality that are of the same size and shape. In further embodiments, a plurality of plated articles produced according to this disclosure can have a total nanolaminate coating thickness at one location on the article that is within 4 microns or less of the average thickness of the nanolaminate coating at the same location on the other articles in the plurality that are of the same size and shape. In still further embodiments, a plurality of plated articles produced according to this disclosure can have a total nanolaminate coating thickness at one location on the article that is within 3 microns or less of the average thickness of the nanolaminate coating at the same location on the other articles in the plurality that are of the same size and shape. In still further embodiments, a plurality of plated articles produced according to this disclosure can have a total nanolaminate coating thickness at one location on the article that is within 2 microns or less of the average thickness of the nanolaminate coating at the same location on the other articles in the plurality that are of the same size and shape. In yet further embodiments, a plurality of plated articles produced according to this disclosure can have a total nanolaminate coating thickness at one location on the article that is within 1 micron or less of the average thickness of the nanolaminate coating at the same location on the other articles in the plurality that are of the same size and shape.

Further, in embodiments, a plurality of plated articles produced by according to this disclosure have total nanolaminate coating thicknesses at two different locations on the article that are within 6 microns or less of the average thickness of the nanolaminate coating at the same locations on the other articles in the plurality that are of the same size and shape. In embodiments, a plurality of plated articles produced by according to this disclosure have total nanolaminate coating thicknesses at two different locations on the article that are within 5 microns or less of the average thickness of the nanolaminate coating at the same locations on the other articles in the plurality that are of the same size and shape. In other embodiments, a plurality of plated articles produced by according to this disclosure have total nanolaminate coating thicknesses at two different locations on the article that are within 4 microns or less of the average thickness of the nanolaminate coating at the same locations on the other articles in the plurality that are of the same size and shape. In some embodiments, a plurality of plated articles produced by according to this disclosure have total nanolaminate coating thicknesses at two different locations on the article that are within 3 microns or less of the average thickness of the nanolaminate coating at the same locations on the other articles in the plurality that are of the same size and shape. In further embodiments, a plurality of plated articles produced by according to this disclosure have total nanolaminate coating thicknesses at two different locations on the article that are within 2 microns or less of the average thickness of the nanolaminate coating at the same locations on the other articles in the plurality that are of the same size and shape. In yet further embodiments, a plurality of plated articles produced by according to this disclosure have total nanolaminate coating thicknesses at two different locations on the article that are within 1 micron or less of the average thickness of the nanolaminate coating at the same locations on the other articles in the plurality that are of the same size and shape.

Further, in embodiments, a plurality of plated articles produced according to processes of this disclosure have total nanolaminate coating thicknesses at three different locations on the article that are within 6 microns or less of the average thickness of the nanolaminate coating at the same locations on the other articles in the plurality that are of the same shape. In some embodiments, a plurality of plated articles produced according to processes of this disclosure have total nanolaminate coating thicknesses at three different locations on the article that are within 5 microns or less of the average thickness of the nanolaminate coating at the same locations on the other articles in the plurality that are of the same shape. In further embodiments, a plurality of plated articles produced according to processes of this disclosure have total nanolaminate coating thicknesses at three different locations on the article that are within 4 microns or less of the average thickness of the nanolaminate coating at the same locations on the other articles in the plurality that are of the same shape. In some embodiments, a plurality of plated articles produced according to processes of this disclosure have total nanolaminate coating thicknesses at three different locations on the article that are within 3 microns or less of the average thickness of the nanolaminate coating at the same locations on the other articles in the plurality that are of the same shape. In further embodiments, a plurality of plated articles produced according to processes of this disclosure have total nanolaminate coating thicknesses at three different locations on the article that are within 2 microns or less of the average thickness of the nanolaminate coating at the same locations on the other articles in the plurality that are of the same shape. In yet further embodiments, a plurality of plated articles produced according to processes of this disclosure have total nanolaminate coating thicknesses at three different locations on the article that are within 1 micron or less of the average thickness of the nanolaminate coating at the same locations on the other articles in the plurality that are of the same shape.

Similarly, in embodiments, a plurality of plated articles produced by processes according to this disclosure will have a first electrodepositable component (e.g., a metal) in the first layer of any one article in the plurality that differ by less than a specified amount from the weight percent of that same electrodepositable component in another article in the plurality. In some embodiments, the weight percent of the first electrodepositable component in the first layer of any one article in the plurality differs from the weight percent of that same electrodepositable component in another article in the plurality by less than 6 weight percent. In further embodiments, the weight percent of the first electrodepositable component in the first layer of any one article in the plurality differs from the weight percent of that same electrodepositable component in another article in the plurality by less than 5 weight percent. In further embodiments, the weight percent of the first electrodepositable component in the first layer of any one article in the plurality differs from the weight percent of that same electrodepositable component in another article in the plurality by less than 4 weight percent. In some embodiments, the weight percent of the first electrodepositable component in the first layer of any one article in the plurality differs from the weight percent of that same electrodepositable component in another article in the plurality by less than 3 weight percent. In yet further embodiments, the weight percent of the first electrodepositable component in the first layer of any one article in the plurality differs from the weight percent of that same electrodepositable component in another article in the plurality by less than 2 weight percent. In particular embodiments, the weight percent of the first electrodepositable component in the first layer of any one article in the plurality differs from the weight percent of that same electrodepositable component in another article in the plurality by less than 1 weight percent.

Measurements and/or testing may be required to determine whether plated articles in a batch possess the desired characteristics. Any suitable techniques may be used, as is understood by one of skill in the art. For example, x-ray fluorescence (XRF) can be used to determine the composition and thickness of a particular coating. XRF measurements can be corroborated with energy dispersive x-ray spectroscopy (EDS) and inductively coupled plasma (ICP) assay results.

Coating Compositions

The composition of each electrodeposited layer that is plated onto the metal workpieces in a batch may vary in its constituent elements. In embodiments, the nanolaminate composition at one or more locations on an article comprises at least one (e.g., one or more, two or more, three or more, four or more, etc.) different elements independently selected from Ag, Al, Au, B, Be, C, Co, Cr, Cu, Fe, Hg, In, Mg, Mn, Mo, Nb, Nd, Ni, P, Pb, Pd, Pt, Re, Rh, Sb, Sn, Ta, Ti, W, V, Zn and Zr, $Al_2O_3$, $SiO_2$, $TiO_2$, BN, CrN, GaN, $Mo_2N$, NbN, TiN, VN, $W_2N$, $Fe_2O_3$, MgO, $Cr_3C_2$, $Cr_7C_3$, $Cr_{23}C_6$, $Mo_2C$, SiC, WC ZrC, diamond, epoxy, polyurethane, polyaniline, polyethylene, polyether ether ketone (PEEK), polyether ether ketone copolymers, polyether ketone ketone (PEKK), polyether ketone ketone copolymers, polypropylene, and other polymers including conductive polymers, such as poly(3,4-ethylenedioxythiophene) or poly(styrenesulfonate). In some embodiments, the electrodepositable elements are selected from silver (Ag), aluminum (Al), gold (Au), boron (B), beryllium (Be), carbon (C), cobalt (Co), chromium (Cr), copper (Cu), iron (Fe), mercury (Hg), indium (In), iridium (Ir), magnesium (Mg), manganese (Mn), molybdenum (Mo), niobium (Nb), neodymium (Nd), nickel (Ni), phosphorous (P), palladium (Pd), platinum (Pt), rhenium (Re), rhodium (Rh), antimony (Sb), silicon (Si), tin (Sn), lead (Pb), tantalum (Ta), titanium (Ti), tungsten (W), vanadium (V), zinc (Zn), and zirconium (Zr), In embodiments, each of the independently selected elements is present in an amount of at least 0.1 wt. %, 0.05 wt. %, 0.01 wt. %, 0.005 wt. %, or 0.001 wt. %. In further embodiments, each of the independently selected elements is present in an amount greater than 0.1 wt. %, 0.05 wt. %, 0.01 wt. %, 0.005 wt. %, or 0.001 wt. %. In some embodiments, each of the independently selected elements is present in an amount independently ranging from about 1 wt. % to about 99 wt. %. In such embodiments, the amount of each element present may include from about 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. %, from about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. %, or from about 98 wt. % to about 99 wt. %. As would be understood by one of skill in the art, the percentages of elements that are electrodeposited in a given layer will add up to 100%. Embodiments comprising of two or more, three or more, or four or more, different electrodepositable elements (e.g., metals) that can be electrodeposited together include, for example, at least two or more elements selected independently from the group consisting of Zn, Cr, Fe, Co, and Ni. In such embodiments, one or more additional elements that can be included with such combinations include Ag, Al, Au, B, Be, C, Cu, Hg, In, Mg, Mn, Mo, Nb, Nd, Pd, Pt, Re, Rh, Sb, Sn, Mn, Pb, Ta, Ti, W, V, and Zr. In some embodiments, the one or more additional elements that can be included with such combinations include P, Al, Si, and B can be included with the two or more metals selected independently from the group consisting of Zn, Cr, Fe, Co, and Ni. In some such embodiments, the one or more additional elements are selected from the subset group consisting of P, Al, Si, and B. Examples of such combinations include NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, and FeCrB.

In other embodiments, one or more coating layers comprise various elements including Ni, Zn, Co, Al, and Fe. Included within such embodiments are corrosion-resistant coatings comprising Zn and Ni, where the nickel comprises from about 11 wt. % to about 17 wt. %, and the remaining weight percent of the composition, i.e., the balance, comprises zinc.

Throughout this disclosure where percentages are given for coating components they are given as percent by weight (weight percent) unless stated otherwise. In those instances where the "balance" of a coating is mentioned, it is understood to refer to the remaining weight percent of the coating whose composition is not otherwise specifically recited. Thus, for example, the above statement that the balance comprises zinc means only that the remaining weight percent of the layer composition includes zinc but it is not limited to zinc and also may include other components.

In this disclosure the elements listed in a combination of elements are not listed in the order from the most abundant element to the least abundant element. For example, the combination of NiCr above denotes a combination of Ni and Cr metals in which either Ni or Cr may be more the more abundant element.

Other embodiments comprising two or more, three or more, or four or more, different elements that are electrodeposited together include, for example, at least two or more elements selected independently from C, Cr, Mo, W, Nb, Fe, Ti, Al, V, and Ta. In some embodiments, the at least two or more elements are selected independently from the group consisting of C, Cr, Mo, W, Nb, Fe, Ti, Al, V, and Ta. In embodiments, one or more additional elements that are included with such combinations include Ag, Al, Au, B, Be, Co, Cu, Hg, In, Mg, Mn, Ni, Nd, Pd, Pt, Re, Rh, Sb, Sn, Mn, Pb, Ta, Zn, and Zr.

Illustrative alloys that may be used in one or more layer(s) of the coating comprise Zn and Fe; Zn and Ni; Co and Ni; Ni, Co, and Mo; Ni and Fe; Ni and Cr; Cu and Zn; Cu and Sn; Ni, Co, and P; Ni, Co, W, and P; Ni, Co, and W; Ni and W; Ni, W, and P; Ni, Co, and B; Ni, Co, W, and B; or Ni, W, and B. In specific embodiments, an alloy used in a layer of a nanolaminate coating includes Ni and Fe; or Ni and Co. In still further embodiments, a layer of a nanolaminate coating comprises three or more, four or more, or five or more of Co, Cr, Mo, W, Fe, Si, Mn, and Ni.

In embodiments, a first layer and a second layer of a nanolaminate coating comprise a first alloy and a second alloy, respectively, which comprise the same first and second metals. In some embodiments, a difference between a concentration of a first metal in a first alloy and a first metal in a second alloy is less than about 10%, about 20%, about 30%, or about 50%. In further embodiments, a difference between a concentration of a first metal in a first alloy and a first metal in a second alloy is more than about 1%, about 2%, about 5%, or about 10%.

Other species may be co-deposited or entrained along with any of the foregoing elements and combinations of elements. Such other species include, for example, $Al_2O_3$, $Fe_2O_3$, MgO, P, Si, $SiO_2$, TiN, $TiO_2$, diamond, epoxy, polyurethane, polyaniline, polyethylene, polyether ether ketone (PEEK), polyether ether ketone copolymers, polyether ketone ketone (PEKK), polyether ketone ketone copolymers, and polypropylene, any of which may be present as particles. In some embodiments, the particles have a largest dimension that is less than that of the individual layers being applied (e.g., a tenth or less, a quarter or less, or less than one-half of the layer thickness).

In some embodiments, the first and second identifiable layers at one or more locations on the article (e.g., a non-threaded surface), may comprise from 1 wt. % to 99 wt. % Ni. In further embodiments, Ni is present in the first and second identifiable layers at one or more locations on the article in an amount independently ranging from about 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. %, from about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. %, or from about 98 wt. % to about 99 wt. %. The balance (i.e., the remainder of the composition) of the first and second identifiable layers at one or more locations on the article, e.g., a non-threaded surface, may comprises Co and/or Cr, as well as additional elements or electrodepositable species, where the cobalt and/or chromium comprise the majority of the balance. In some embodiments, Co and/or Cr are present in an amount of at least 75 wt. %, at least 80 wt. %, at least 85 wt. %, at least 90 wt. %, at least 95 wt. %, at least 97 wt. %, at least 99 wt. %, at least 99.9 wt. % or 100 wt. % of the balance.

In embodiments, the second layer(s) comprise chromium and/or cobalt in an amount ranging from 1 wt. % to 35 wt. %. In some embodiments, the second layer(s) comprise chromium and/or cobalt in an amount independently ranging from 1 wt. % to 3 wt. %, 2 wt. % to 5 wt. %, 5 wt. % to 10 wt. %, 10 wt. % to 15 wt. %, 15 wt. % to 20 wt. %, 20 wt. % to 25 wt. %, 25 wt. % to 30 wt. %, or 30 wt. % to 35 wt. %. The balance of the second layer(s) in such embodiments comprises Ni. In such embodiments, the balance of the second layer(s) may also comprise additional elements or electrodepositable species. In some such embodiments, Ni comprises the majority of the balance, e.g., at least 75 wt. %, at least 80 wt. %, at least 85 wt. %, at least 90 wt. %, at least 95 wt. %, at least 97 wt. %, at least 99 wt. %, at least 99.9 wt. % or 100 wt. % of the balance.

In some embodiments, the first and second identifiable layer(s) at one or more locations on the article (e.g., a non-threaded surface) comprise Ni in a range from about 1 wt. % to about 99 wt. %. In further embodiments, the first and second identifiable layer(s) at one or more locations on the article comprise Ni in an amount ranging from about 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. %, from about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. %, or from about 98 wt. % to about 99 wt. %. The balance (i.e., remainder of the composition) of the first and second identifiable layers at one or more locations on the article, e.g., a non-threaded surface, may comprise aluminum (e.g., deposited by ionic liquid deposition) as well as additional elements or electrodepositable species. In some such embodiments, the Al comprises the majority of the balance. In some embodiments, the Al comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. %, or about 100 wt. % of the balance. In embodiments, the second layer(s) comprise Al in an amount ranging from about 1 wt. % to about 35 wt. %. In some embodiments, the second layer(s) comprise Al in an amount ranging from about 1 wt. % to about 3 wt. %, from about 2 wt. % to about 5 wt. %, from about 5 wt. % to about 10 wt. %, from about 10 wt. % to about 15 wt. %, from about 15 wt. % to about 20 wt. %, from about 20 wt. % to about 25 wt. %, from about 25 wt. % to about 30 wt. %, or from about 30 wt. % to about 35 wt. %. In some such embodiments, the balance of the second layer comprises Ni. In some embodiments, the balance of the second layer also comprises additional elements or electrodepositable species, wherein the Ni comprises the majority of the balance. In some embodiments, Ni comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. % or about 100 wt. % of the balance.

In some embodiments, the first and second identifiable layer(s) at one or more locations on the article, e.g., a non-threaded surface, comprise nickel in a range from 1 wt. % to 99 wt. %. In some embodiments, the first and second identifiable layer(s) at one or more locations on the article comprise nickel in an amount independently ranging from about 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. %, from about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. %, or from about 98 wt. % to about 99 wt. %. In embodiments, the balance of the first and second identifiable layers at one or more locations on the article, e.g., a non-threaded surface, comprises Al and/or Co as well as additional elements or electrodepositable species, where the Al and/or Co comprise the majority of the balance. In some embodiments, the Al and/or Co are, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. % or about 100 wt. % of the balance. In embodiments, the second layer(s) comprise Al and/or Co in an amount ranging independently from about 1 wt. % to about 35 wt. %. In some embodiments, the second layer(s) comprise Al and/or Co in an amount independently ranging from about 1 wt. % to about 3 wt. %, 2 wt. % to about 5 wt. %, from about 5 wt. % to about 10 wt. %, from about 10 wt. % to about 15 wt. %, from about 15 wt. % to about 20 wt. %, from about 20 wt. % to about 25 wt. %, from about 25 wt. % to about 30 wt. %, or from about 30 wt. % to about 35 wt. %; the balance of the second layer in such embodiments comprises Ni. In some such embodiments, the balance of the second layer also comprises additional elements or electrodepositable species, wherein the Ni comprises the majority of the balance. In some embodiments, Ni comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. % or about 100 wt. % of the balance.

In embodiments, the first and second identifiable layer(s) at one or more locations on the article, e.g., a non-threaded surface, comprise nickel in a range from 1 to 99%. In some embodiments, the first and second identifiable layer(s) at one or more locations on the article comprise nickel in an amount ranging from about 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. %, from about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. %, or from about 98 wt. % to about 99 wt. % by weight. In some embodiments, the balance of the first and second identifiable layers at one or more locations on the article, e.g., a non-threaded surface, comprises iron as well as additional elements or electrodepositable species. In some such embodiments, the Fe comprises the majority of the balance. In some embodiments, the comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. % or about 100 wt. % of the balance. In embodiments, the second layer(s) comprise Fe in a range from about 1% to about 35%. In some embodiments, the second layer(s) comprise iron in an amount ranging from about 1% to about 3 wt. %, from about 2 wt. % to about 5 wt. %, from about 5 wt. % to about 10 wt. %, from about 10 wt. % to about 15 wt. %, from about 15 wt. % to about 20 wt. %, from about 20 wt. % to about 25 wt. %, from about 25 wt. % to about 30 wt. %, or from about 30 wt. % to about 35 wt. %. The balance of the second layer in such embodiments comprises Ni. In some embodiments, the balance of the second layer also comprises additional elements or electrodepositable species, wherein the Ni comprises the majority of the balance. In some embodiments, the Ni comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. %, or about 100 wt. % of the balance.

In some embodiments, the first and second identifiable layers at one or more locations on the article, e.g., a non-threaded surface, comprise Zn in a range from about 1 wt. % to about 99 wt. %. In some embodiments, the first and second identifiable layers at one or more locations on the article comprise Zn in a range from 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. %, from about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. % or 98 wt. % to about 99 wt. % by weight. The balance of the first and second layers at one or more locations on the article, e.g., a non-threaded surface, comprises Fe as well as additional elements or electrodepositable species, where the Fe comprises the majority of the balance. In some embodiments, Fe comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. % or about 100 wt. % of the balance. In embodiments, the second layer(s) comprise Fe in a range independently selected from about 1 wt. % to about 35 wt. %. In some embodiments, the second layer(s) comprise Fe in a range from about 1 wt. % to about 3 wt. %, from about 2 wt. % to about 5 wt. %, from about 5 wt. % to about 10 wt. %, from about 10 wt. % to about 5 wt. %, from about 15 wt. % to about 20 wt. %, from about 20 wt. % to about 25 wt. %, from about 25 wt. % to about 30 wt. %, or from about 30 wt. % to about 35 wt. % by weight. The balance of the second layer in such embodiments comprises zinc. In another embodiment, the balance of the second layer also comprises additional elements or electrodepositable species, wherein the Zn comprises the majority of the balance. In some embodiments, Zn comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. % or about 100 wt. % of the balance.

In some embodiments, the first and second layers at one or more locations on the article, e.g., a non-threaded surface, comprise Zn in a range independently selected from about 1 wt. % to about 99 wt. %. In some embodiments, the first and second layers at one or more locations on the article comprise Zn in a range from about 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. %, from about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. % or 98 wt. % to about 99 wt. % by weight. The balance (remainder of the composition) of the first and second layers at one or more locations on the article, e.g., a non-threaded surface, comprises Fe as well as additional elements or electrodepositable species, where the Fe comprises the majority of the balance. In some embodiments, Fe comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. %, or about 100 wt. % of the balance. In embodiments, the second layer(s) independently comprise Ni in a range from about 1 wt. % to about 35 wt. %. In embodiments, the second layer(s) independently comprise Ni in a range from about from 1 wt. % to about 3 wt. %, from about 2 wt. % to about 5 wt. %, from about 5 wt. % to about 10 wt. %, from about 10 wt. % to about 15 wt. %, from about 15 wt. % to about 20 wt. %, from about 20 wt. % to about 25 wt. %, from about 25 wt. % to about 30 wt. %, from about, or 30 wt. % to about 35 wt. % by weight. The balance of the second layer in such embodiments comprises Zn. In some embodiments, the balance of the second layer also comprises additional elements or electrodepositable species, wherein the Zn comprises the majority of the balance, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. % or about 100 wt. % of the balance.

Included within such ZnNi embodiments are embodiments where the first and second layers comprise combinations of Zn and Ni in which the Zn component at one or more locations on the article, e.g., a non-threaded surface, comprises from about 80 wt. % to about 90 wt. % of the first and second layers and nickel comprises from about 10 wt. % to about 20 wt. % of the first and layers. Within such embodiments, at one or more locations on the article, e.g., a non-threaded surface, the nickel in the nanolaminate coating can comprise from about 10 wt. % to about 17 wt. %, from about 13 wt. % to about 15 wt. %, from about 13 wt. % to about 16 wt. %, from about 13 to about 17 wt. %, about 14 wt. %, from about 14 wt. % to about 16 wt. %, from about 14 wt. % to about 17 wt. %, from about 14.5 wt. % to about 16.5 wt. %, from about 11 wt. % to about 16 wt. %, from about 12 wt. % to about 16 wt. %, from about, or from 12 wt. % to about 15 wt. %, with the Zn comprising at least about 97 wt. % of the balance. In some embodiments, Zn comprises at least about 99 wt. %, at least about 99.9 wt. % or about 100 wt. %. Such embodiments can further comprise repeating first and second layers where the first layer is from about 200 to about 300 nm, from about 200 to about 400 nm, from about 250 to about 300 nm, from about 250 to about 350 nm, or about 250 nm and the second layer is from about 600 to about 900 nm, from about 650 to about 850 nm, from about 700 to about 800 nm, or about 750 nm. Such embodiments further may comprise a total number of first and second layers ranging from 12 to 15 layers, and a total coating thickness ranging from about 5 to about 11 microns or from about 8 to about 12 microns. in some embodiments, the coating thickness ranges from about 8 to about 10 microns on at least some surfaces of the articles.

In some embodiments, the first layer(s) at one or more locations on the article, e.g., a non-threaded surface, independently comprise Cu in a range from 1 to 99 wt. %. In some embodiments, a first layer at one or more locations on the article includes Cu in a range from about 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. %, from about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. %, or from about 98 wt. % to about 99 wt. %. The balance of the first and second layers at one or more locations on the article, e.g., a non-threaded surface, comprises Zn and/or Sn as well as additional elements or electrodepositable species, where the Zn and/or Sn comprises the majority of the balance, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. % or about 100 wt. % of the balance. In embodiments, the second layer(s) independently comprise Zn and/or Sn in a range from about 1 wt. % to about 35 wt. %, including from about 1 wt. % to about 3 wt. %, from about 2 wt. % to about 5 wt. %, from about 5 wt. % to about 10 wt. %, from about 10 wt. % to about 15 wt. %, from about 15 wt. % to about 20 wt. %, from about 20 wt. % to about 25 wt. %, from about 25 wt. % to about 30 wt. %, from about or 30 wt. % to about 35 wt. %. The balance of the second layer in such embodiments comprises Cu. In some embodiments, the balance may also comprise additional elements or electrodepositable species, wherein the Cu comprises the majority of the balance. In some embodiments, Cu comprises, e.g., at least about 75 wt. %, at least about 80 wt. %, at least about 85 wt. %, at least about 90 wt. %, at least about 95 wt. %, at least about 97 wt. %, at least about 99 wt. %, at least about 99.9 wt. %, or about 100 wt. % of the balance.

In embodiments, the electrodeposited layers at one or more locations on the article, e.g., a non-threaded surface, comprises a "fine to grained" or "ultrafine to grained" metal comprising a metal or metal alloy having an average grain size from 1 nm to 5,000 nm (e.g., from about 1 to about 20 nm, from about 1 to about 100 nm, from about 5 to about 50 nm, from about 5 to about 100 nm, from about 5 to about 200 nm, from about 10 to about 100 nm, from about 10 to about 200 nm, from about 20 to about 200 nm, from about 20 to about 250 nm, from about 20 to about 500 nm, from about 50 to about 250 nm, from about 50 to about 500 nm, from about 100 to about 500 nm, from about 200 to about 1,000 nm, from about 500 to about 2,000 nm, or from about 1,000 to about 5,000 nm) based on the measurement of grain size in micrographs. In such embodiments the fine-grained metal or alloy at one or more locations on the article, e.g., a non-threaded surface, may comprise one or more, two or more, three or more, or four or more elements selected independently from the group consisting of Ag, Al, Au, B, Be, C, Co, (Cr, Cu, Fe, Hg, In, Ir, Mg, Mn, Mo, Nb, Nd, Ni, P, Pd, Pt, Re, Rh, Sb, Si, Sn, Pb, Ta, Ti, W, V, Zn, and Zr, wherein each of the independently selected metals is present in amounts greater than 0.001 wt. %. In some embodiments, each of the independently selected metals is present in an amount greater than about 0.1 wt. %, greater than about 0.05 wt. %, greater than about 0.01 wt. %, or greater than about 0.005 wt. %. In other embodiments, the independently selected metals is present in an amount ranging from about 1 wt. % to about 99 wt. %. In further embodiments, the independently selected metals is present in an amount ranging from about 1 wt. % to about 5 wt. %, from about 5 wt. % to about 7 wt. %, from about 7 wt. % to about 10 wt. %, from about 10 wt. % to about 15 wt. %, from about 15 wt. % to about 20 wt. %, from about 20 wt. % to about 30 wt. %, from about 30 wt. % to about 40 wt. %, from about 40 wt. % to about 50 wt. %, from about 50 wt. % to about 55 wt. %, from about 55 wt. % to about 60 wt. %, from about 60 wt. % to about 65 wt. %, from about 65 wt. % to about 70 wt. %, from about 70 wt. % to about 75 wt. %, from about 75 wt. % to about 80 wt. % to about 85 wt. %, from about 85 wt. % to about 90 wt. %, from about 90 wt. % to about 92 wt. %, from about 92 wt. % to about 93 wt. %, from about 93 wt. % to about 94 wt. %, from about 94 wt. % to about 95 wt. %, from about 95 wt. % to about 96 wt. %, from about 96 wt. % to about 97 wt. %, from about 97 wt. % to about 98 wt. % or 98 wt. % to about 99 wt. %.

Although plating according to this disclosure normally will be carried out in a single bath, it is possible to plate different nanolaminate layers onto articles using separate baths. In practice of such embodiments, one plating bath would be used to plate one layer. The barrel, basket, rocker or other containment device then would be removed from that bath, rinsed, and then immersed in a second bath and the plating process continued. Additional layers could be obtained using the different baths.

In embodiments, the coefficient of thermal expansion of the nanolaminate coating layers is within 20% (e.g., less than 20%, 15%. 10%, 5%, or 2%) of the workpiece the direction parallel to workpiece movement (i.e., in the plane of the workpiece and parallel to the direction of workpiece movement).

Corrosion-Resistance

In embodiments, the nanolaminated articles in the plurality provide corrosion-resistant coatings. As would be understood by one of skill in the art, "corrosion" includes metal wastage, pitting, crevice corrosion, intergranular corrosion, stress corrosion cracking (SCC), blistering, embrittlement, sulfide stress cracking (SSC) and corrosion fatigue.

In embodiments, depending on the coating composition and thickness, the nanolaminate coatings at one or more locations on the article, e.g., a non-threaded surface, provide at least 1,000 hours to first red rust when tested according to the ASTM-B117-11 salt fog test. For example, embodiments of the ZnNi coatings described herein having a thickness of at least 10 microns will provide such corrosion resistance. Other embodiments provide at least 2000 hours to first red rust when tested according to the ASTM-B117-11 salt fog test, and other embodiments provide at least 3,000 hours to first red rust when tested according to the ASTM-B117-11 salt fog test. Yet other embodiments provide resistance for at least 4,000 hours, at least 5,000 hours, at least 6,000 hours, at least 7,000 hours, at least 8,000 hours, at least 9,000 hours, at least 10,000 hours, at least 12,500 hours, and at least 15,000 hours to first red rust when tested according to the ASTM-B117-11 salt fog test. Embodiments of coating processes herein also provide coatings that are considered to be non-embrittling according to ASTM F519-12a.

In embodiments, the nanolaminated articles in the plurality provide corrosion-resistant coatings. Embodiments of such corrosion-resistant coatings can comprise at least a first and second metal (and optionally one or more additional metals) selected independently for each layer from the group consisting of Zn, Cr, Fe, Co, and Ni, and optionally also may include at least one additional element selected from P, Al, Si, or B. Examples of such combinations include NiCr, NiFe, NiCo, NiCrCo, NiAl, NiCrAl, NiFeAl, NiCoAl, NiCrCoAl, NiMo, NiCrMo, NiFeMo, NiCoMo, NiCrCoMo, NiW, NiCrW, NiFeW, NiCoW, NiCrCoW, NiNb, NiCrNb, NiFeNb, NiCoNb, NiCrCoNb, NiTi, NiCrTi, NiFeTi, NiCoTi, NiCrCoTi, NiCrP, NiCrAl, NiCoP, NiCoAl, NiFeP, NiFeAl, NiCrSi, NiCrB, NiCoSi, NoCoB, NiFeSi, NiFeB, ZnCr, ZnFe, ZnCo, ZnNi, ZnCrP, ZnCrAl, ZnFeP, ZnFeAl, ZnCoP, ZnCoAl, ZnNiP, ZnNiAl, ZnCrSi, ZnCrB, ZnFeSi, ZnFeB, ZnCoSi, ZnCoB, ZnNiSi, ZnNiB, CoCr, CoFe, CoCrP, CoFeP, CoCrAl, CoFeAl, CoCrSi, CoFeSi, CoCrB, CoFeB, CoAl, CoW, CoCrW, CoFeW, CoTi, CoCrTi, CoFeTi, CoTa, CoCrTa, CoFeTa, CoC, CoCrC, CoFeC, FeCr, FeCrP, FeCrAl, FeCrSi, and FeCrB. As noted above, in the foregoing list, the elements listed in a combination of elements are not listed in the order from the most abundant element to the least abundant element. Other embodiments of such corrosion-resistant coatings can comprise at least a first and second layer comprising as electrodeposited species Ni and one or more, two or more, three or more, or four or more elements selected independently for each nanoscale layer from the group consisting of C, Co, Cr, Mo, W, Nb, Fe, Ti, Al, V, and Ta.

EXAMPLES

The following examples illustrate embodiments of this disclosure.

Example 1

Preparation of Barrel-Plated Zn—Ni Nanolaminates

This example describes barrel preparation of a multilayer coating comprising nanoscale layers of zinc-nickel alloy, in which the concentration of nickel varies in adjacent layers. In this example, 200 studs having a diameter of ⅝ in. and a length of 3.25 in. are loaded into a barrel having a diameter of 10 in. and a length of 18 in., resulting in a barrel loading fraction of 0.12. The length fraction of the studs relative to the barrel radius is 0.676. The barrel is comprised of two danglers having a total area of approximately 20 cm².

The composition of the bath is described in Table 2. The bath is held within a temperature range of 69-73° F. for the duration of the barrel lamination process.

TABLE 2

| Zn—Ni bath Make-up | |
|---|---|
| Material | Concentration (g/L) |
| NaOH | 117 |
| Ni | 1.3 |
| Zn | 7.7 |

The barrel can be rotated at 8 revolutions per minute and a square wave applied, wherein the current density is about 2 mA/cm² for a duration of about 4 minutes and a second current density of about 4 mA/cm² was applied for a duration of about 8 minutes. The barrel is processed for about 3.5 hours.

A summary of the thickness and composition of four random samples taken from a lot of 200 studs is shown below in Table 3. The resulting laminated coating is a bright and uniform finish.

TABLE 3

| ASTM B117-11 results for Zn—Ni nanolaminated studs | | | | | |
|---|---|---|---|---|---|
| Start Date | Sample ID. | Thickness (μm) | Composition (% Ni) | End Date | 1st Red Rust (hrs) |
| Jun. 8, 2014 | 113.018.01 | 7.0 | 15.4 | N/A | N/A[5] |
| | 113.018.02 | 19.2 | 14.9 | N/A | N/A[5] |
| | 113.019.01 | 9.3 | 15.2 | N/A | >19,000[5] |
| | 113.019.02 | 24.7 | 15.8 | N/A | N/A[5] |

[5]Testing ongoing, with no sign of red rust after 19,000 hours

Example 2

Comparative Corrosion Testing

This example illustrates comparative ASTM B117-11 testing results of different types of anti-corrosion coatings of studs, nuts, and washers, including samples from a batch that is plated with zinc and nickel in a manner similar to that described in Example 1.

TABLE 4

| ASTM B117-11 test results of barrel plated Zn—Ni nanolaminated studs, nuts, and washers | | | | |
|---|---|---|---|---|
| | Minimum | Salt Fog Performance (ASTM B117-11) (Hrs) | | |
| Coating System | Thickness (μm) | 1st Red Rust (RR) | 5% RR | 10% RR (Failure) |
| No Coating | N/A | N/A | 16 | 36 |
| Cadmium | 4.3 | N/A | 536 | 736 |
| Electrogalv[4] | 1.7 | 48 | 168 | 329 |
| Hot Dipped Galvanized (HDG) | 13.1 | N/A | 245 | 677 |
| PTFE | 4.5 | 48 | 563 | 840 |
| Barrel-plated Zn—Ni coating | 4.7 | N/A[1] | N/A[1] | N/A[1] |
| Barrel-plated Zn—Ni coating + Topcoat[2] | 4.7[3] | N/A[1] | N/A[1] | N/A[1] |

[1]No recordable failure after 4000 hours (test duration)
[2]Finigard 460 topcoat applied after plating
[3]Coating thickness only
[4]Electrodeposited galvanized coating Example 3

Hydrogen Embrittlement (ASTM F519)

In order to evaluate coated articles ZnNi articles produced is a 10"×18" barrel coating process similar to that described in Example 1 for susceptibility to hydrogen embrittlement, testing was performed in accordance with ASTM F519-12a.

The articles were tested for susceptibility to hydrogen embrittlement per ASTM F519-12A "Mechanical Hydrogen Embrittlement Evaluation of Plating/Coating Processes and Service Environments." After cladding specimens were baked out at 275° F. for 24 hours in accordance with ASTM B850.

Hydrogen embrittlement testing was then performed per ASTM F 519-12A. Each specimen subjected to a sustained load of 75% of the notched fracture strength (NFS) for 235 hours or until fracture. The plating process was then evaluated on the premise that if two or more specimens from the same sample fractured during testing then the process would be considered embrittling.

Test Results

None of the baked out specimens fractured within the required 200.0 hour sustained load time (Table 5). According to ASTM F519-12a, the coating process is considered to be non-embrittling.

TABLE 5

ASTM B117-11 test results for barrel plated nanolaminated Zn—Ni studs, nuts, and washers

| Specimen ID | Fracture (Y/N) | Load Time (hrs) | Fracture Location | Heat Treatment | Pass/Fail |
|---|---|---|---|---|---|
| 1 | No | 235 | N/A | 24 hrs @ 275° F. | Pass |
| 2 | No | 235 | N/A | 24 hrs @ 275° F. | Pass |
| 3 | No | 235 | N/A | 24 hrs @ 275° F. | Pass |
| 4 | No | 235 | N/A | 24 hrs @ 275° F. | Pass |

Example 4

Barrel Plating Mixing Experiment

As noted above, the rate of mixing in barrel plating may be approximated by a "mixing fraction" in which the number of appearances at the plating surface of a workpiece within the batch that could be plated during fifty (50) rotations of the barrel, divided by the number of rotations of the barrel (i.e., 50). In this example, the mixing fraction of a number of studs is studied. The studs are ⅜"×2.0", ⅝"×3.25", and ½"×2.5". Each of the studs has an aspect ratio of 5:1. Two Sterling octagonal barrels (6"×6" and 6"×9") are used, each with two stainless steel danglers. For the mixing study, mixing was approximated by adding three workpieces which could be monitored during the mixing process. Three workpieces are wrapped in different color reflective tape and the ends are dipped in plastisol for protection. Workpieces are measured optically so that one mark is made on a piece of paper every time a workpiece comes into view within a grid of areas on the barrel expected to be the best for plating. Such areas are exemplified in FIG. 4, and as shown, these areas are numbered 1-6.

Figure 4:
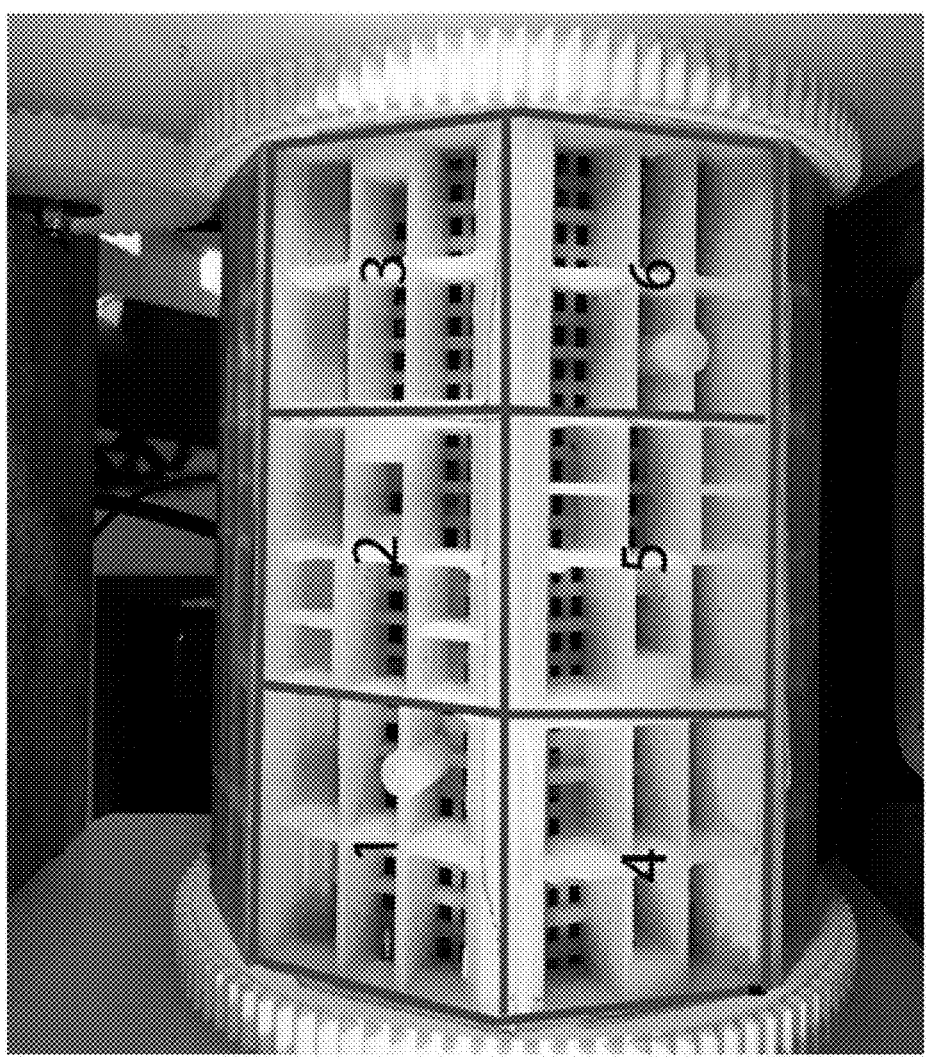
FIG. 4 illustrates the viewing area for the mixing experiment described in Example 4.

Each tracer appearance in one of the six grids shown in FIG. 4 is recorded during a measurement time coinciding with 50 revolutions. Only new appearances in each sector are noted and only measurements in these six sectors are recorded. Workpieces reappearing in the same sector or workpieces appearing in unnumbered sectors are not counted. The mean of the appearances for the three tracers may then be determined to provide the experimental mixing value for that run. Even very low populations of workpieces fill all six sectors when turning as the workpieces stack up on the front side of the barrel as it is traveling upwards.

Different runs are performed, and the various parameters are varied to determine combinations of parameters including, e.g., length fraction, loading fraction and RPM, that provide the highest mixing fractions. Multiple runs for each given combination of parameters may be run to better determine the likely mixing for any given combination of set of parameters. Generally speaking, when keeping all other parameters constant, the mixing fraction may be experimentally observed to decrease with either increased loading fraction or increased length fraction beyond a certain value. Likewise, when keeping all other parameters constant, the mixing fraction may be experimentally observed to decrease slightly with the RPM above a certain value, e.g., above 5.

Such experiments can be similarly conducted for different types of barrels and different types of loadings and parameters.

Example 5

Barrel Plating Chatter Experiment

Figure 5:
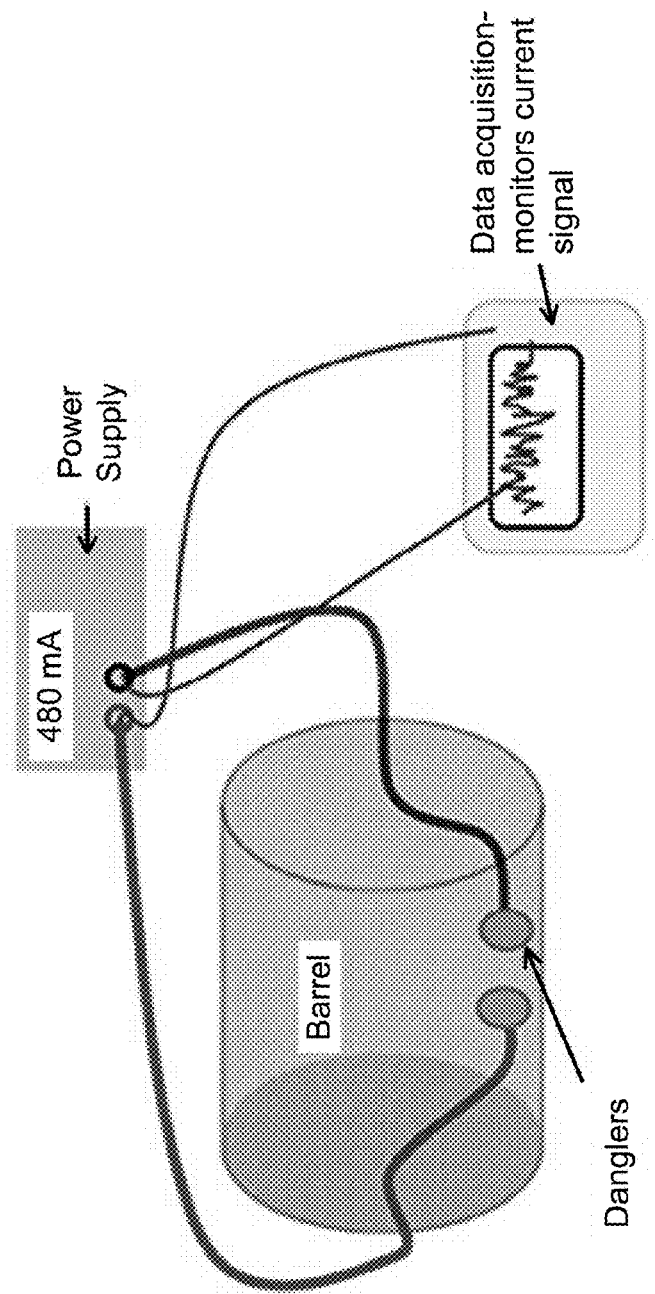
FIG. 5 illustrates a barrel configuration for experimentally determining chatter as described herein and in Example 5.

A barrel setup like that described in Example 4 is used. The barrel is further set up to monitor chatter as shown in FIG. 5. Danglers are positioned such that they are separated by one workpiece length for each size of part. Danglers are initially pushed to the bottom of the barrel and workpieces are randomly added into the barrel. A 480 mA current signal is passed across the dangler leads to simulate the noise in the current signal (aka "chatter"). These tracer workpieces described in mixing Example 4 are replaced with three regular non-tracing workpieces during this test procedure. In operation, the barrel rotates at varying RPMs, loading fractions, and sizes of workpieces. The current is monitored at 0.5 s intervals for 25 minutes=3001 measurements. Deviations from the applied signal are noise due to the workpieces between the dangler causing noise or "chatter" in the signal. This noise simulates the anode/cathode noise during plating. The instrument cannot detect more than 610 mA.

Figure 6:
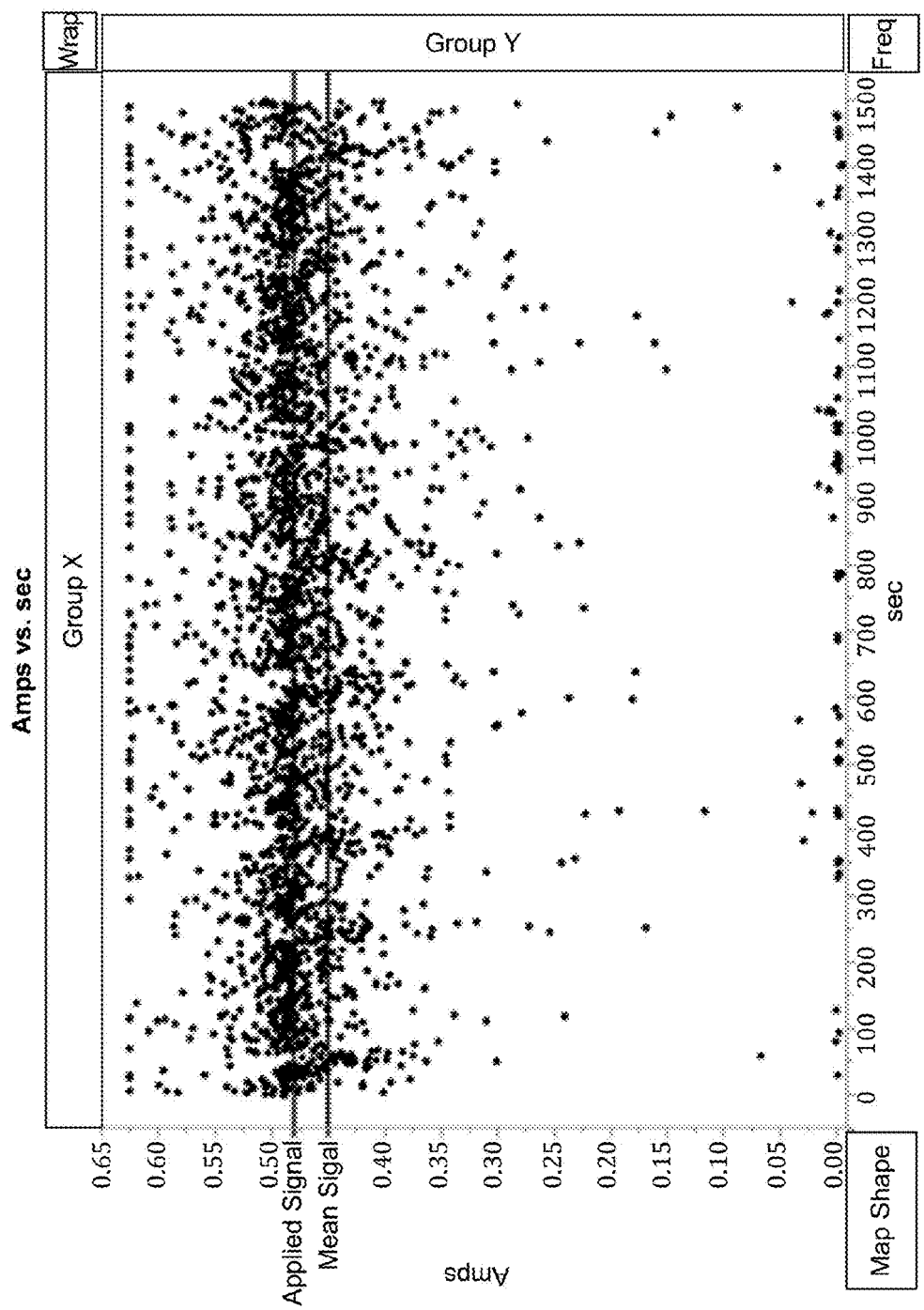
FIG. 6 is a plot of mean current measured over time for a chatter experiment as described in Example 5.
Figure 7:
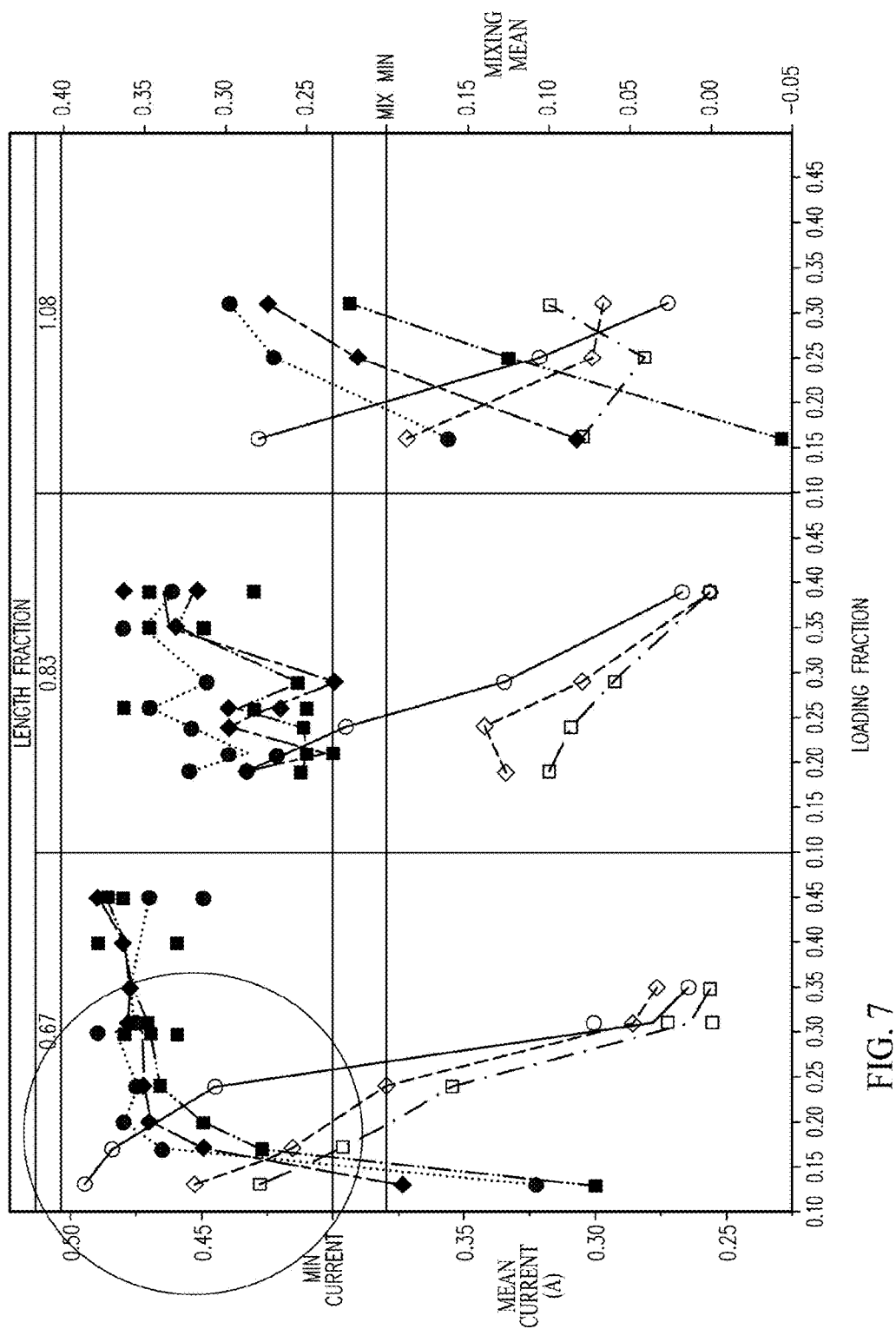
FIG. 7 is a plot of mean current measured for various combinations of barrel plating parameters as described in Example 5.
Figure 7:
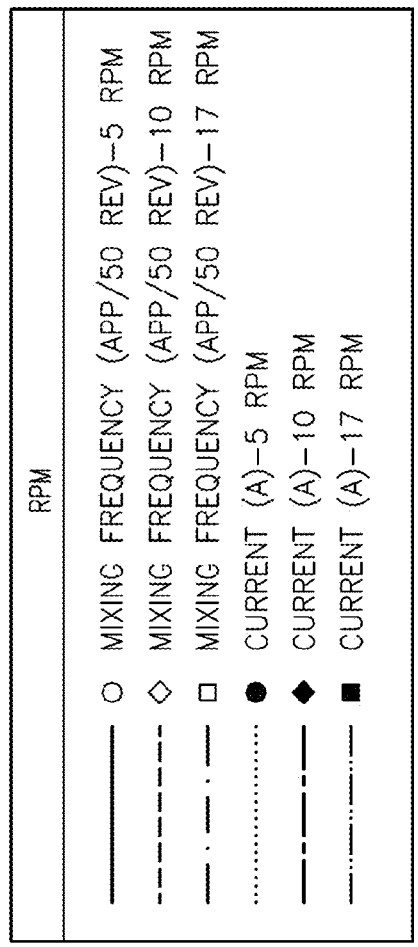

Chatter data is obtained as shown in FIG. 6. The applied signal and calculated mean measured signal are shown. The mean current for this particular barrel is then calculated for different combinations of length fraction, loading fraction, mean mixing fraction and RPM and plotted as shown in FIG. 7 to see if one or more combinations of parameters can be detected that may provide acceptable plating of nanolaminates as described herein. As shown in FIG. 7, in this particular barrel with these particular workpieces, a combination of a length fraction of 0.67, a loading fraction of about 0.20 to 0.25 and a RPM of 5 appears to be a combination that may provide acceptable plating of nanolaminates as described herein.

Example 6

Zn—Ni Coatings

A. Zn—Ni Nanolaminate Coating Application

Figure 8:
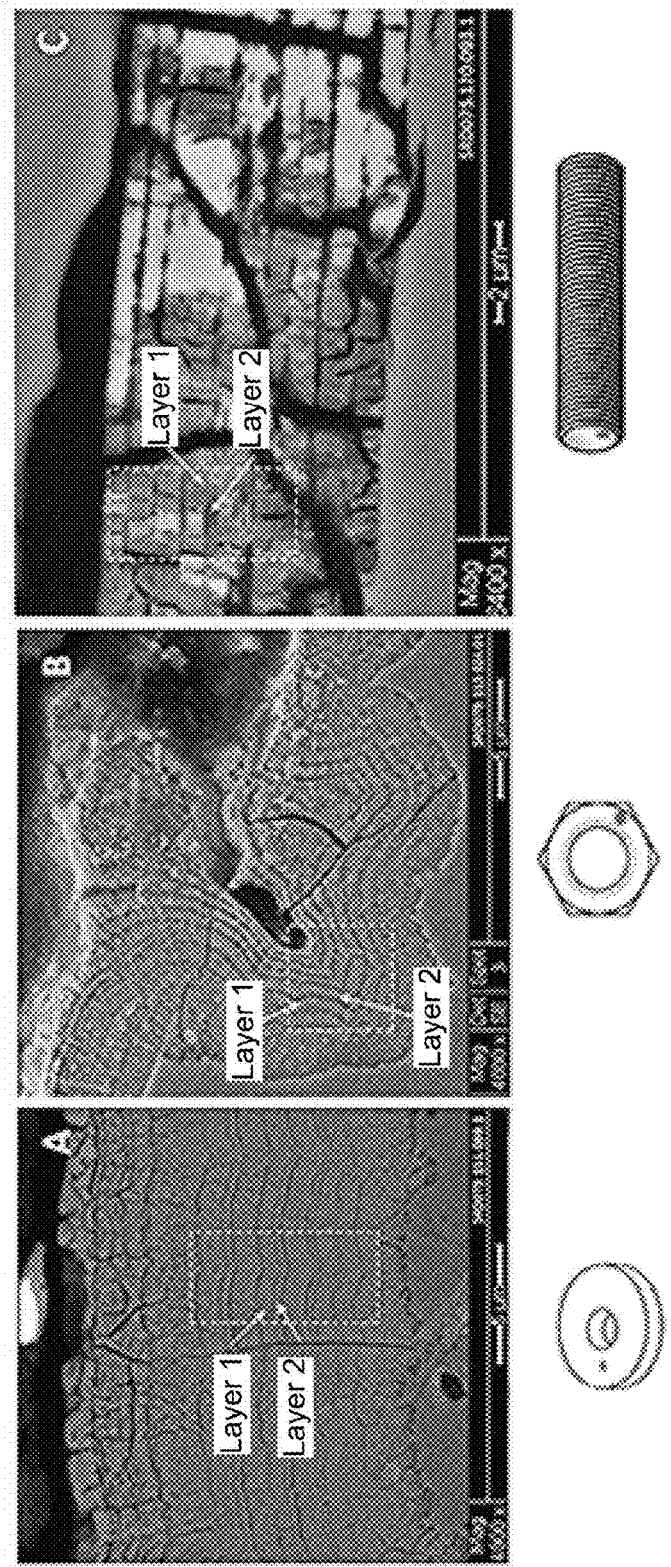
FIG. 8 shows nuts and washers in which the relative concentration of zinc to nickel varies in adjacent layers prepared using a bath comprising zinc and nickel salts as described in Example 6.

A multilayer coating comprising nanoscale layers of zinc and nickel was formed on two hundred (200) threaded steel tension bolts (studs), nuts and washers in which the relative concentration of zinc to nickel varies in adjacent layers was prepared using a bath comprising zinc and nickel salts see FIG. 8. The coating was applied using a pulsed waveform to deposit alternating layers of Zn—Ni alloy with the coating having an overall composition of 86.5% Zn and 13.5% Ni.

Analysis showed the coating varied over the length of the bolt with a thickness of 4.7 microns (middle 3 threads); 7.7 (end 3 threads); 19.4 micron average thickness.

B. Corrosion Testing

The threaded bolts (⅝" ASTM A193 B7 Fully threaded Studs), nuts (⅝" ASTM A194 2H Heavy Hex Nuts), and washers (⅝" ASTM F436) prepared as described in Section A of this example were subjected to accelerated corrosion testing under ASTM B117-11. On set of bolts, nuts, and washers were prepared as described in Section A with the addition of a Finigard 460 topcoat applied according to the manufacturer's technical data sheet. Additional control bolts, nuts, and washers that were otherwise identical to those employed in Section A but one set was uncoated, others were coated with electroplated cadmium (6.6-15.5 microns), hot dipped galvanized zinc (14.1-22.5 microns), PTFE (32.0 microns, Teflon), or ElectroGalv (1.7-7.1 microns, an electroplated zinc coating). Control bolts, nuts, and washers were tested in parallel with the bolts described in Section A. The time to the appearance of red rust is given in Table 6.

TABLE 6

| | Time Until Red Rust Observed (hours) |
|---|---|
| Nanolaminate Coating | |
| Nickel Zinc coating (Section A) | No signs of corrosion after 4,000 hours of exposure[1] |
| Control coatings | |
| Plain | 5% red rust observed after 16 hours, 10% red rust observed at 36 hours. |
| Hot dipped galvanized | 5% red rust observed after 245 hrs; 10% after 677 hrs |
| ElectroGalv | Initial red rust observed after 48 hours; 5% red rust at 168 hours and 10% red rust at 329 |
| Cadmium plated | 5% red rust at 536 hrs; 10% red rust at 736 hrs |
| PTFE coated | Initial rust at 48 hrs; 5% red rust at 563 hrs and 10% at 840 hrs |

[1]testing concluded

C. Cyclic Corrosion and Subsequent Hydrogen Embrittlement Under Tension

Three sets of threaded bolts (studs) ⅝"×3.25", nuts, and washers were coated with Zn—Ni to a thickness of 19.4 micron average thickness (4.7 microns (middle 3 threads); 7.7 (end 3 threads)) as described in Section A of this example. The coating having a 86.5%+/−0.54% of zinc by weight. Additional control bolts, nuts, and washers that were otherwise identical to those employed in Section A but one set was uncoated, others were coated with electroplated cadmium (6.6-15.5 microns), hot dipped galvanized zinc (14.1-22.5 microns), PTFE (32.0 microns, Teflon), or ElectroGalv (1.7-7.1 microns, an electroplated zinc coating). Experimental and control bolts were placed in a cylindrical collar and nuts tightened to 227 ft-lbs, 187 ft-lbs, or 176 ft-lbs of torque to subject the bolts to tension prior to cyclic corrosion testing according to General Motors Worldwide Engineering Standard GMW 14872 (General Motors accelerated corrosion test). The time to the appearance of red rust of the bolts under tension is given in Table 7.

TABLE 7

Cyclic Corrosion and subsequent hydrogen embrittlement

| Nanolaminate Coating | Time Until Red Rust Observed Under ASTM B117-11 Accelerated Corrosion Testing |
|---|---|
| Nickel Zinc coating (Section A) no tension | No signs of corrosion (red rust) after greater than 4,000 hours |
| Nickel Zinc coating (Section A) at each level of tension | No signs of corrosion (red rust) after greater than 1000 hours (42 cycles) |

| Controls | Time Until Red Rust Observed |
|---|---|
| Uncoated | Red rust after 672 hours |
| Hot dip galvanized (zinc) | Red rust after 672 hours |
| Electrogalvanized (zinc) | Red rust after 672 hours |
| Cadmium | Red rust after 672 hours |
| PTFE | Red rust after 672 hours |

EMBODIMENTS

The following embodiments are included within the scope of this disclosure.

1. A method for barrel plating a batch of metal articles to provide a nanolaminate metallic coating on plurality of the articles in the batch, comprising the steps of:
   providing a plating barrel with a batch of metal articles to be coated, the plating barrel having a length and radius, wherein each of the articles has a longest dimension;
   placing at least a portion of the plating barrel and metal articles into a tank containing an electrodeposition bath comprising one or more electrodepositable metal ions;
   providing at least one anode in the electrodeposition bath, the anode being external to the plating barrel;
   providing at least two cathode danglers in the electrodeposition bath, the at least two danglers extending into opposite ends of the plating barrel, wherein the ends of the danglers extending into the plating barrel are separated by a distance;
   rotating the barrel;
   applying a first electric current for a first amount of time via the danglers, thereby causing a first identifiable metallic layer to be electrodeposited onto metal articles in the plurality, the first layer having a thickness at one or more locations on the article of between 150 nanometers and 20,000 nanometers, the first metallic layer comprising at least a first and second metal components;
   applying a second electric current for a second amount of time via the danglers, thereby causing a second identifiable metallic layer to be electrodeposited onto metal articles in the plurality, the second layer having a thickness at one or more locations on the article of between 150 nanometers and 20,000 nanometers, the second metallic layer comprising at least one of the first and second metal components, and wherein at least one feature in the second layer selected from the group consisting of composition, grain size and grain structure (e.g., microstructure or morphology) is different from at least one of the features in the first layer;
   optionally applying one or more additional electric currents via the danglers to cause additional identifiable metallic layers to be electrodeposited onto metal articles in the plurality, each of the additional identifiable layers having a thickness at one or more locations on the article of between 150 nanometers and 20,000 nanometers and comprising at least one of the first and second metal components, wherein for each such additional layer, at least one feature selected from the group consisting of composition, grain size and grain structure (e.g., microstructure or morphology) is different from at least one of the features in the immediately preceding metallic layer.

2. A barrel plating method according to embodiment 1, wherein each identifiable metallic layer is at least 200 nm in thickness at one or more locations on the article.

3. A barrel plating method according to embodiment 1 or 2, wherein the ratio of the longest dimension of the metal articles in the batch to the radius of the barrel is less than 1.3.

4. A barrel plating method according to embodiment 1 or 2, wherein the ratio of the longest dimension of the metal articles in the batch to the radius of the barrel is less than 1.1.

5. A barrel plating method according to embodiment 1 or 2, wherein the ratio of the longest dimension of the metal articles in the batch to the radius of the barrel is less than 0.9.

6. A barrel plating method according to embodiment 1 or 2, wherein the ratio of the longest dimension of the metal articles in the batch to the radius of the barrel is less than 0.7.

7. A barrel plating method according to any of embodiments 1-6, wherein the following ratio:

the packing volume of articles loaded into the barrel
the volume of the barrel is less than 70%.

8. A barrel plating method according to embodiment 7, wherein the ratio of the volume of articles loaded into the barrel to the volume of the barrel is less than 50%.

9. A barrel plating method according to embodiment 7, wherein the ratio of the volume of articles loaded into the barrel to the volume of the barrel is between 10% and 40%.

10. A barrel plating method according to any of embodiments 1-9, wherein in a plurality of the barrel-plated articles in the batch, the weight percent of the first metal component at one or more locations in any one article in the plurality does not differ by more than six weight percent from the weight percent of that same metal component at one or more locations in another article in the plurality.

11. A barrel plating method according to any of embodiments 1-10, wherein in a plurality of the barrel-plated articles in the batch, the weight percent of the second metal component at one or more locations in any one article in the plurality does not differ by more than six weight percent from the weight percent of that same metal component at one or more locations in another article in the plurality.

12. A barrel plating method according to any of embodiments 1-11, wherein the barrel is rotated during the application of the first and second currents at a rate of from 4-10 RPM.

13. A barrel plating method according to any of embodiments 1-12, wherein each of the first and second amounts of time is between 2 to 10 minutes.

14. A barrel plating method according to embodiment 13, wherein the first amount of time is from 2 to 6 minutes.

15. A barrel plating method according to embodiment 13 or 14, wherein the first amount of time is from 5 to 10 minutes.

16. A barrel plating method according to any of embodiments 1-15, wherein the first electric current is between 20 and 70 amps.

17. A barrel plating method according to any of embodiments 1-16, wherein the second electric current is between 40 and 140 amps.

18. A barrel plating method according to any of embodiments 1-17, wherein the voltage associated with the first or second electric current or both is between 3 and 8 volts.

19. A barrel plating method according to any of embodiments 1-18, wherein the first identifiable layer in the articles in the plurality has a thickness of 200 to 500 nm at one or more locations on the article.

20. A barrel plating method according to embodiment 19, wherein the first identifiable layer in the articles in the plurality has a thickness of 200 to 350 nm at one or more locations on the article.

21. A barrel plating method according to any of embodiments 1-20, wherein the second identifiable layer in the articles in the plurality has a thickness of from 400 to 1000 nm at one or more locations on the article.

22. A barrel plating method according to embodiment 21, wherein the second layer in the articles in the plurality has a thickness of from 650 to 850 nm at one or more locations on the article.

23. A barrel plating method according to any of embodiments 1-22, comprising applying one or more additional electric currents via the danglers, each such additional electric current being applied for an amount of time sufficient to cause the formation of an additional identifiable metallic layer to be electrodeposited at one or more locations on the plurality of the metal articles.

24. A barrel plating method according to embodiment 23, comprising applying additional currents via the danglers to deposit from 6 to 15 additional identifiable layers at one or more locations on the plurality of metal articles.

25. A barrel plating method according to any of embodiments 1-24, wherein the combined thickness in nanometers of the electrodeposited metallic layers at one or more locations on each article in the plurality is from 6 to 14 microns.

26. A barrel plating method according to any of embodiments 1-24, wherein the combined thickness in nanometers of the electrodeposited metallic layers at one or more locations on each article in the plurality is from 8 to 10 microns.

27. A barrel plating method according to any of embodiments 1-26, wherein the first and second metal components in the plurality comprise at least two elements selected from the group consisting of Ni, Zn, Fe, Cu, Au, Ag, Pd, Sn, Mn, Co, Pb, Al, Ti, Mg, W, Rh, and Cr.

28. A barrel plating method according to any of embodiments 1-27, wherein in the plurality the first identifiable metallic layer, second identifiable metallic layer, or both, comprise at least two metals selected from the group consisting of Ni and Zn, Ni and Co, Ni and Cr, and Zn and Fe.

29. A barrel plating method according to any of embodiments 1-28, wherein at one or more locations on the articles in the plurality the first identifiable metallic layer, second identifiable metallic layer, or both, comprise from 13 to 17% Ni.

30. A barrel plating method according to any of embodiment 29, wherein at one or more locations on the articles in the plurality the first identifiable metallic layer, second identifiable metallic layer, or both, comprise from 83 to 87% Zn.

31. A barrel plating method according to any of embodiments 1-30, wherein one or more locations on the articles in the plurality comprise a corrosion-resistant nanolaminate coating that provides at least 1000 hours to first red rust when tested according to the ASTM-B117-11 salt fog test.

32. A barrel plating method according to any of embodiments 1-30, wherein one or more locations on the articles in the plurality comprise a corrosion-resistant nanolaminate coating that provides at least 3000 hours to first red rust when tested according to the ASTM-B117-11 salt fog test.

33. A barrel plating method according to any of embodiments 1-30, wherein one or more locations on the articles in the plurality comprise a corrosion-resistant nanolaminate coating that provides at least 5000 hours to first red rust when tested according to the ASTM-B117-11 salt fog test.

34. A method for barrel plating according to any of embodiments 1-33, wherein any one article in the plurality has a total nanolaminate coating thickness at a first location on the article that is within a thickness of 6 microns of the average thickness of the nanolaminate coating at the same location on the other articles in the plurality.

35. A method for barrel plating according to any of embodiments 1-33, wherein any one article in the plurality has a total nanolaminate coating thickness at a first location on the article that is within a thickness of 3 microns of the average thickness of the nanolaminate coating at the same location on the other articles in the plurality.

36. A method for barrel plating according to embodiment 34 or 35, wherein any one article in the plurality has a total nanolaminate coating thickness at a second location on the article that is within a thickness of 6 microns of the average thickness of the nanolaminate coating at the same location on the other articles in the plurality.

37. A method for barrel plating according to embodiment 34 or 35, wherein any one article in the plurality has a total nanolaminate coating thickness at a second location on the article that is within a thickness of 3 microns of the average thickness of the nanolaminate coating at the same location on the other articles in the plurality.

38. A method for barrel plating according to any of embodiments 1-37, wherein the plurality comprises a majority of the articles of the same shape in the batch, and wherein the majority comprises at least 70% of the total number of articles in the batch of the same shape.

39. A method for barrel plating according to any of embodiments 1-37, wherein the plurality comprises a majority of the articles of the same shape in the batch, and wherein the majority comprises at least 90% of the total number of articles in the batch of the same shape.

40. A method for barrel plating according to any of embodiments 1-37, wherein the plurality comprises a majority of the articles of the same shape in the batch, and wherein the majority comprises at least 95% of the total number of articles in the batch of the same shape.

41. A method according to any of embodiments 1-40, wherein the one or more locations includes a threaded surface.

42. A method according to any of embodiments 1-41, wherein the one or more locations includes a non-threaded surface.

43. A plurality of barrel-plated metal articles made according to a method according to any of embodiments 1-42.

44. A barrel-plated metal article in the plurality made according to a method according to any of embodiments 1-42.

45. A combination comprising a plating barrel and a plurality of barrel-plated metal articles according to embodiment 41.

46. A metallic article comprising a nanolaminate coating, wherein the coating comprises:
a first identifiable metallic layer having a thickness of between 150 nanometers and 20,000 nanometers at one or more locations on the article, the first metallic layer comprising at least a first and second metal component;
a second identifiable metallic layer having a thickness of between 150 nanometers and 20,000 nanometers at one or more locations on the articles, the second metallic layer comprising the first and second metal component;
wherein at least one feature in the second layer selected from the group consisting of composition, grain size and grain structure (e.g., microstructure or morphology) is different from at least one of the features in the first layer;
wherein the metallic article optionally comprises one or more additional, identifiable metallic layers having a thickness of between 150 nanometers and 20,000 nanometers at one or more locations on the article, the additional, identifiable metallic layer also comprising at least one of the first and second metal components, wherein for each such additional layer, at least one feature selected from the group consisting of composition, grain size and grain structure (e.g., microstructure or morphology) is different from at least one of the features in the immediately preceding metallic layer, and
wherein the nanolaminate coating comprises one or more discontinuities characterized by an inward deformation of the nanolaminate coating toward the substrate surface, with the layers of the nanolaminate coating on either side of the discontinuity being deformed along the discontinuity and in a direction away from the surface of the coating and toward the surface of the substrate.

47. A metallic article comprising a nanolaminate coating according to embodiment 46, wherein each identifiable metallic layer is at least about 200 nm in thickness at one or more locations on the article.

48. A metallic article comprising a nanolaminate coating according to embodiment 46 or 47, wherein the first identifiable metallic layer has a thickness of 225 to 500 nm at one or more locations on the article.

49. A metallic article comprising a nanolaminate coating according to embodiment 48, wherein the first identifiable metallic layer has a thickness of 225 to 350 nm at one or more locations on the article.

50. A metallic article comprising a nanolaminate coating according to any of embodiments 46-49, wherein the second identifiable layer has a thickness of from 400 to 1000 nm at one or more locations on the article.

51. A metallic article comprising a nanolaminate coating according to embodiment 50, wherein the second identifiable layer has a thickness of from 650 to 850 nm at one or more locations on the article.

52. A metallic article comprising a nanolaminate coating according to any of embodiments 46-51, wherein the article comprises from 6 to 20 identifiable metallic layers at one or more locations on the article.

53. A metallic article comprising a nanolaminate coating according to any of embodiments 46-52, wherein the combined thickness in nanometers of the electrodeposited metallic layers is from 6 to 14 microns at one or more locations on the article.

54. A metallic article comprising a nanolaminate coating according to any of embodiments 46-52, wherein the combined thickness in nanometers of the electrodeposited metallic layers is from 8 to 10 microns at one or more locations on the article.

55. A metallic article comprising a nanolaminate coating according to any of embodiments 46-54, wherein the first and second metal components comprise at least two elements selected from the group consisting of Ni, Zn, Fe, Cu, Au, Ag, Pd, Sn, Mn, Co, Pb, Al, Ti, Mg, W, Rh, and Cr.

56. A metallic article comprising a nanolaminate coating according to any of embodiments 46-55, wherein the first identifiable metallic layer, second identifiable metallic layer, or both, comprise at least two metals selected from the group consisting of Ni and Zn, Ni and Co, Ni and Cr, and Zn and Fe.

57. A metallic article comprising a nanolaminate coating according to any of embodiments 46-56, wherein the first identifiable metallic layer, second identifiable metallic layer, or both, comprise from 13 to 17% Ni at one or more locations on the article.

58. A metallic article comprising a nanolaminate coating according to any of embodiments 46-57, wherein the first identifiable metallic layer, second identifiable metallic layer, or both, comprise from 83 to 87% Zn at one or more locations on the article.

59. A metallic article comprising a nanolaminate coating according to any of embodiments 46-58, wherein at one or more locations on the article the nanolaminate coating resists corrosion and provides at least 1000 hours to first red rust when tested according to the ASTM-B117-11 salt fog test.

60. A metallic article comprising a nanolaminate coating according to any of embodiments 46-58, wherein at one or more locations on the article the nanolaminate coating resists corrosion and provides at least 2000 hours to first red rust when tested according to the ASTM-B117-11 salt fog test.

61. A metallic article comprising a nanolaminate coating according to any of embodiments 46-58, wherein at one or more locations on the article the nanolaminate coating resists corrosion and provides at least 3000 hours to first red rust when tested according to the ASTM-B117-11 salt fog test.

62. A metallic article comprising a nanolaminate coating according to any of embodiments 46-58, wherein at one or more locations on the article the nanolaminate coating resists corrosion and provides at least 5000 hours to first red rust when tested according to the ASTM-B117-11 salt fog test.

63. A metallic article according to any of embodiments 46-62, wherein the one or more locations includes a threaded surface.

64. A metallic article according to any of embodiments 46-62, wherein the one or more locations includes a non-threaded surface.

65. A plurality of metallic articles according to any of embodiments 46-64, wherein the weight percent of the first metal component in the coating on any one article in the plurality does not differ by more than six weight percent from the weight percent of that same metal component in the coating on another article in the plurality.

66. A plurality of metallic articles according to any of embodiments 46-64, wherein the weight percent of the first metal component in the coating on any one article in the plurality does not differ by more than three weight percent from the weight percent of that same metal component in the coating on another article in the plurality.

67. A plurality of metallic articles according to any of embodiments 46-66, wherein the weight percent of the second metal component in the coating on any one article in the plurality does not differ by more than six weight percent from the weight percent of that same metal component in the coating on another article in the plurality.

68. A plurality of metallic articles according to any of embodiments 46-66, wherein the weight percent of the second metal component in any one article in the plurality does not differ by more than three weight percent from the weight percent of that same metal component in another article in the plurality.

69. A plurality of metallic articles according to any of embodiments 46-68, wherein any one article in the plurality has a total nanolaminate coating thickness at a first location on the article that is within a thickness of 3 microns of the average thickness of the nanolaminate coating at the same location on the other articles in the plurality.

70. A plurality of metallic articles according to any of embodiments 46-68, wherein any one article in the plurality has a total nanolaminate coating thickness at a first location on the article that is within a thickness of 6 microns of the average thickness of the nanolaminate coating at the same location on the other articles in the plurality.

71. A plurality of metallic articles according to any of embodiments 69 or 70, wherein any one article in the plurality has a total nanolaminate coating thickness at a second locations on the article that is within a thickness of 6 microns of the average thickness of the nanolaminate coating at the same location on the other articles in the plurality.

72. A plurality of metallic articles according to any of embodiments 69 or 70, wherein any one article in the plurality has a total nanolaminate coating thickness at a second location on the article that is within a thickness of 3 microns of the average thickness of the nanolaminate coating at the same location on the other articles in the plurality.

73. A plurality of metallic articles according to any of embodiments 65-72, wherein the one or more locations includes a non-threaded surface.

74. A plurality of metallic articles according to any of embodiments 65-72, wherein the one or more locations includes a threaded surface.

75. A combination comprising a plating barrel and a plurality of metallic articles according to any of embodiments 65-74.

76. A method for non-rack plating a batch of articles in an electrodeposition bath to provide a nanolaminate metallic coating on a plurality of the articles in the batch, wherein the articles are located in a containment apparatus, and wherein at least part of the containment apparatus is capable of movement within the bath so as to cause movement of the articles within the containment apparatus, the method comprising the steps of:

introducing the batch of articles to be coated into the containment apparatus;

placing at least a portion of the containment apparatus comprising the articles into a tank containing the electrodeposition bath, wherein the electrodeposition bath comprises one or more electrodepositable metal ions;

providing at least one anode in the electrodeposition bath external to the containment apparatus;

providing at least two cathode connections providing substantially continuous or intermittent contact with the batch of metal articles within the containment apparatus;

causing the containment apparatus to move in a predetermined motion, thereby causing the articles to move within the containment apparatus;

applying a first electric current for a first amount of time, thereby causing a first identifiable metallic layer to be electrodeposited onto metal articles in the batch, the first layer having a thickness at one or more locations on the article of between 150 nanometers and 20,000 nanometers and comprising at least a first and second metal components;

applying a second electric current for a second amount of time, thereby causing a second identifiable metallic layer to be electrodeposited onto metal articles in the batch having a thickness at one or more locations on the article of between 150 nanometers and 20,000 nanometers and comprising at least the first and second metal components, wherein at least one feature selected from the group consisting of the composition, grain size and/or grain structure (e.g., microstructure or morphology) of the second layer is different from that of the first layer, and additionally the second layer also may vary in thickness from the first layer; and optionally applying one or more additional electric currents for one or more additional times to cause one or more additional identifiable metallic layers to be electrodeposited onto metal articles in the batch, each of which independently has a thickness at one or more locations on the article of between 150 nanometers and 20,000 nanometers and comprising at least one of the first and second metal components, and wherein for each such additional layer, at least one feature selected from the group consisting of composition, grain size and grain structure is different from at least one of those same features in the immediately preceding metallic layer, and wherein additionally may have a thickness that is the same as, or different from, the thickness of either the first and/or second layers.

77. A method according to embodiment 76, wherein the containment apparatus is selected from the group consisting of a barrel-platting apparatus, a vibratory basket plating apparatus and a rocker plating apparatus.

78. A method according to embodiment 76 or 77, wherein at least one parameter selected from the group consisting of the first current, the first time, the second current, the second time, the optional one or more additional electric currents, and the optional one or more additional times is determined based at least in part on the one or more parameters that are applicable to the containment apparatus, wherein the parameters applicable to the containment apparatus are selected from the group consisting of loading fraction, loading volume fraction, apparent loading, length fraction, packing volume, RPM, frequency, amplitude, rate of movement of the containment apparatus, chatter, and rate of mixing.

79. A method according to embodiment 78, wherein the parameters applicable to the containment apparatus are selected from amplitude and frequency.

80. A method according to any of embodiments 76-79, wherein each identifiable metallic layer is at least 200 nm in thickness at one or more locations on the article.

81. A plating method according to any of embodiments 1-6, wherein the following ratio:
the packing volume of articles loaded into the containment apparatus
the volume of the containment apparatus is less than 70%.

82. A method according to embodiment 81, wherein the ratio of the volume of articles loaded into the containment apparatus is less than 50%.

83. A method according to embodiment 81, wherein the ratio of the volume of articles loaded into the containment apparatus to the volume of the containment apparatus is between 10% and 40%.

84. A plating method according to any of embodiments 76-83, wherein in a plurality of the articles in the batch, the weight percent of the first metal component at one or more locations in any one article in the plurality does not differ by more than six weight percent from the weight percent of that same metal component at one or more locations in another article in the plurality.

85. A method according to any of embodiments 76-84, wherein in a plurality of the articles in the batch, the weight percent of the second metal component at one or more locations in any one article in the plurality does not differ by more than six weight percent from the weight percent of that same metal component at one or more locations in another article in the plurality 86. A method according to any of embodiments 76-85, wherein the containment apparatus is rotated during the application of the first and second currents at a rate of from 4-10 RPM.

87. A method according to any of embodiments 76-86, wherein each of the first and second amounts of time is between 2 to 10 minutes.

88. A method according to embodiment 87, wherein the first amount of time is from 2 to 6 minutes.

89. A method according to embodiment 87 or 88, wherein the first amount of time is from 5 to 10 minutes.

90. A method according to any of embodiments 76-89, wherein the first electric current is between 20 and 70 amps.

91. A method according to any of embodiments 76-90, wherein the second electric current is between 40 and 140 amps.

92. A method according to any of embodiments 76-91, wherein the voltage associated with the first or second electric current or both is between 3 and 8 volts.

93. A method according to any of embodiments 76-92, wherein the first identifiable layer in the articles in the plurality has a thickness of 200 to 500 nm at one or more locations on the article.

94. A method according to embodiment 93, wherein the first identifiable layer in the articles in the plurality has a thickness of 200 to 350 nm at one or more locations on the article.

95. A method according to any of embodiments 76-94, wherein the second identifiable layer in the articles in the plurality has a thickness of from 400 to 1000 nm at one or more locations on the article.

96. A method according to embodiment 95, wherein the second layer in the articles in the plurality has a thickness of from 650 to 850 nm at one or more locations on the article.

97. A method according to any of embodiments 76-96, comprising applying one or more additional electric currents, each such additional electric current being applied for an amount of time sufficient to cause the formation of an additional identifiable metallic layer to be electrodeposited at one or more locations on the plurality of the metal articles.

98. A method according to embodiment 97, comprising applying additional currents to deposit from 6 to 15 additional identifiable layers at one or more locations on the plurality of metal articles.

99. A method according to any of embodiments 76-98, wherein the combined thickness in nanometers of the electrodeposited metallic layers at one or more locations on each article in the plurality is from 6 to 14 microns.

100. A method according to any of embodiments 76-98, wherein the combined thickness in nanometers of the electrodeposited metallic layers at one or more locations on each article in the plurality is from 8 to 10 microns.

101. A method according to any of embodiments 76-100, wherein the first and second metal components in the plurality comprise at least two elements selected from the group consisting of Ni, Zn, Fe, Cu, Au, Ag, Pd, Sn, Mn, Co, Pb, Al, Ti, Mg, W, Rh, and Cr.

102. A method according to any of embodiments 76-101, wherein in the plurality the first identifiable metallic layer, second identifiable metallic layer, or both, comprise at least two metals selected from the group consisting of Ni and Zn, Ni and Co, Ni and Cr, and Zn and Fe.

103. A method according to any of embodiments 76-102, wherein at one or more locations on the articles in the plurality the first identifiable metallic layer, second identifiable metallic layer, or both, comprise from 13 to 17% Ni.

104. A method according to any of embodiment 103, wherein at one or more locations on the articles in the plurality the first identifiable metallic layer, second identifiable metallic layer, or both, comprise from 83 to 87% Zn.

105. A method according to any of embodiments 76-104, wherein one or more locations on the articles in the plurality comprise a corrosion-resistant nanolaminate coating that provides at least 1000 hours to first red rust when tested according to the ASTM-B117-11 salt fog test.

106. A method according to any of embodiments 76-104, wherein one or more locations on the articles in the plurality comprise a corrosion-resistant nanolaminate coating that provides at least 3000 hours to first red rust when tested according to the ASTM-B117-11 salt fog test.

107. A method according to any of embodiments 76-104, wherein one or more locations on the articles in the plurality comprise a corrosion-resistant nanolaminate coating that provides at least 5000 hours to first red rust when tested according to the ASTM-B117-11 salt fog test.

108. A method according to any of embodiments 76-107, wherein any one article in the plurality has a total nanolaminate coating thickness at a first location on the article that is within a thickness of 6 microns of the average thickness of the nanolaminate coating at the same location on the other articles in the plurality.

109. A method according to any of embodiments 76-107, wherein any one article in the plurality has a total nanolaminate coating thickness at a first location on the article that is within a thickness of 3 microns of the average thickness of the nanolaminate coating at the same location on the other articles in the plurality.

110. A method according to embodiment 108 or 109, wherein any one article in the plurality has a total nanolaminate coating thickness at a second location on the article that is within a thickness of 6 microns of the average thickness of the nanolaminate coating at the same location on the other articles in the plurality.

111. A method according to embodiment 108 or 109, wherein any one article in the plurality has a total nanolaminate coating thickness at a second location on the article that is within a thickness of 3 microns of the average thickness of the nanolaminate coating at the same location on the other articles in the plurality.

112. A method according to any of embodiments 76-111, wherein the plurality comprises a majority of the articles of the same shape in the batch, and wherein the majority comprises at least 70% of the total number of articles in the batch of the same shape.

113. A method according to any of embodiments 76-111, wherein the plurality comprises a majority of the articles of the same shape in the batch, and wherein the majority comprises at least 90% of the total number of articles in the batch of the same shape.

114. A method according to any of embodiments 76-111, wherein the plurality comprises a majority of the articles of the same shape in the batch, and wherein the majority comprises at least 95% of the total number of articles in the batch of the same shape.

115. A method according to any of embodiments 76-114, wherein the one or more locations includes a non-threaded surface.

116. A method according to any of embodiments 76-115, wherein the one or more locations includes a threaded surface.

117. A method according to any of embodiments 76-116, wherein the plurality comprises studs, and wherein the containment apparatus is a rocker plating apparatus.

118. A method according to embodiment 117, wherein the plurality comprises studs weighing at least 0.25 kg.

119. A method according to embodiment 117, wherein the plurality comprises studs weighing at least 0.5 kg.

120. A plurality of metal articles made according to a method according to any of embodiments 76-120.

121. A metal article in a plurality of metal articles made according to a method according to any of embodiments 76-120.

122. A combination comprising a containment apparatus and a plurality of metal articles according to embodiment 120.

123. A combination comprising a vibratory plating apparatus and a plurality of metal articles according to embodiment 120.

124. A combination comprising a rocker plating apparatus and a plurality of metal articles according to embodiment 120.

125. A method for producing a plurality of articles by plating a batch of workpieces, the method comprising:
contacting at least a portion of a batch of workpieces with an electrodeposition bath in contact with a portion of a containment apparatus, the electrodeposition bath comprising at least a first and second electrodepositable material;
moving the portion of the batch of workpieces by moving the containment apparatus in a predetermined motion;
electrodepositing a first identifiable layer onto at least the portion of the workpieces in the batch by applying a first electric current for a first amount of time via at least two cathode contacts that make at least intermittent electrical contact with the portion of the batch of workpieces, the first identifiable layer comprising at least the first and second electrodepositable materials; and
electrodepositing a second identifiable layer onto the portion of the workpieces in the batch by applying a second electric current for a second amount of time via the cathode contacts, the second identifiable layer comprising at least the first and second electrodepositable materials, the composition, grain size, structure, or thickness, or combinations thereof, of the second identifiable layer being different from that of the first identifiable layer.

126. The method according to embodiment 125, wherein the containment apparatus is a barrel-plating apparatus, a vibratory basket plating apparatus, and a rocker plating apparatus.

127. The method according to embodiment 125 or 126, further comprising electrodepositing an additional layer onto the portion of the workpieces in the batch by applying an additional electric currents via the cathode contacts, the additional layer comprising at least the first and second electrodepositable materials, the composition, grain size, structure (e.g., microstructure or morphology), or thickness of the additional layer is different from that of the immediately preceding layer.

128. The method according to any of embodiments 125-127, wherein at least one parameter selected from the group consisting of the first current, the first time, the second current, and the second time is determined based at least in part on the one or more parameters that are applicable to the containment apparatus, wherein the parameters applicable to the containment apparatus are selected from the group consisting of loading fraction, loading volume fraction, apparent loading, length fraction, packing volume, RPM, frequency, amplitude, rate of movement of the containment apparatus, chatter, and rate of mixing.

129. The method according to any of embodiments 125-128, wherein a ratio of packing volume of articles loaded into the containment apparatus to volume of the containment apparatus is less than 70%.

130. The method according to any of embodiments 125-129, wherein the ratio of the volume of articles loaded into the containment apparatus to the volume of the containment apparatus ranges from about 10% to about 40%.

131. The method according to any of embodiments 125-130, wherein in the plurality of the articles produced, the weight percent of the first electrodepositable material at one or more locations in any one article in the plurality does not differ by more than six weight percent from the weight percent of that same electrodepositable material at one or more locations in another article in the plurality; or
wherein in the plurality of the articles in the batch, the weight percent of the second electrodepositable material at one or more locations in any one article in the plurality does not differ by more than six weight percent from the weight percent of that same electrodepositable material at one or more locations in another article in the plurality.

132. The method according to any of embodiments 125-131, wherein each of the first and second amounts of time ranges from about 2 to about 10 minutes.

133. The method according to any of embodiments 125-132, wherein the first electric current ranges from about 20 to about 70 amps; or
wherein the second electric current ranges from about 40 to about 140 amps.

134. The method according to any of embodiments 125-133, wherein the voltage associated with the first electric current, the second electric current, or both ranges from about 3 to about 8 volts.

135. The method according to any of embodiments 125-134, wherein the combined thickness of the electrodeposited layers at one or more locations on each article in the plurality is, independently, from 6 to 14 microns.

136. The method according to any of embodiments 125-135, wherein the first and second electrodepositable materials in the plurality comprise at least two elements selected from the group consisting of Ni, Zn, Fe, Cu, Au, Ag, Pd, Sn, Mn, Co, Pb, Al, Ti, Mg, W, Rh, and Cr.

137. The method according to any of embodiments 125-136, wherein in the plurality the first identifiable layer, second identifiable layer, or both, comprise at least two metals selected from the group consisting of Ni and Zn, Ni and Co, Ni and Cr, and Zn and Fe.

138. The method according to any of embodiments 125-137, wherein at one or more locations on the articles in the plurality the first identifiable layer, second identifiable layer, or both, comprise from 13 wt. % to 17 wt. % Ni; or
wherein at one or more locations on the articles in the plurality the first identifiable layer, second identifiable layer, or both, comprise from 83 wt. % to 87 wt. % Zn.

139. The method according to any of embodiments 125-138, wherein one or more locations on the articles in the plurality comprise a corrosion-resistant nanolaminate coating that provides at least 1000 hours to first red rust when tested according to the ASTM-B117-11 salt fog test.

140. The method according to any of embodiments 125-139, wherein any one article in the plurality has a total nanolaminate coating thickness at a first location on the article that is within a thickness of 6 microns of the average thickness of the nanolaminate coating at the same location on the other articles in the plurality.

141. The method according to any of embodiments 125-140, wherein any one article in the plurality has a total nanolaminate coating thickness at a second location on the article that is within a thickness of 6 microns of the average thickness of the nanolaminate coating at the same location on the other articles in the plurality.

142. The method according to any of embodiments 125-141, wherein the plurality of articles comprises a majority articles having the same shape, and wherein the majority comprises at least 70% of the total number of articles.

143. The method according to any of embodiments 125-142, wherein the one or more locations includes a non-threaded surface.

144. The method according to any of embodiments 125-143, wherein the plurality comprises studs, and wherein the containment apparatus is a rocker plating apparatus.

145. The method according to any of embodiments 125-144, wherein the plurality comprises studs weighing at least 0.25 kg.

146. The method according to any of embodiments 125-145, wherein the at least two cathode contacts make at least substantially continuous contact with the portion of the batch of workpieces.

147. A method for producing a plurality of articles by forming a nanolaminate coating on a plurality of workpieces, the method comprising:
contacting at least a portion of the plurality of workpieces with an electrodeposition bath in contact with an interior volume of a plating barrel, wherein the electrodeposition bath comprises at least a first and second electrodepositable material, wherein the workpieces each independently have a longest dimension and the plating barrel has a length and a radius;
rotating the plating barrel;
electrodepositing a first identifiable layer onto at least a portion of the plurality of workpieces by applying a first electric current for a first amount of time via at least two cathodes having ends positioned within the interior volume of the plating barrel, the ends being separated by a distance, and the first identifiable layer comprising the at least first and second electrodepositable materials; and
electrodepositing a second identifiable layer onto the portion of the plurality of workpieces by applying a second electric current for a second amount of time via the at least two cathodes, the second identifiable layer comprising at least the first and second electrodepositable materials, wherein at least one of the composition, grain size, structure, and thickness, or combinations thereof of the second identifiable layer is different from that of the first identifiable layer.

148. The method according to embodiment 147, further comprising electrodepositing an additional identifiable layer onto the portion of the plurality of workpieces by applying an additional electric current via the at least two cathodes, the additional layer comprising at least the first and second electrodepositable materials, wherein at least one of the composition, grain size, structure, and thickness, or combinations thereof of the additional layer is different from that of an adjacent layer.

149. The method according to embodiments 147 or 148, wherein the first electric current is a first time varying waveform; or
wherein the second electric current is a second time varying waveform.

150. The method according to any of embodiments 147-149, wherein the first identifiable layer has a thickness at one or more locations on the workpiece ranging from about 150 nanometers to about 20,000 nanometers; or
wherein the second identifiable layer has a thickness at one or more locations on the workpiece ranging from about 150 nanometers to about 20,000 nanometers.

151. The method according to any of embodiments 147-150, wherein the ratio of the longest dimension of the plurality of workpieces to the radius of the plating barrel is less than 1.3.

152. The method according to any of embodiments 147-151, wherein a ratio of packing volume of the plurality of workpieces loaded into the plating barrel to the interior volume of the plating barrel is less than 70%.

153. The method according to any of embodiments 147-152, wherein the ratio of the volume of the plurality of workpieces loaded into the plating barrel to the volume of the plating barrel ranges from about 10% to about 40%.

154. The method according to any of embodiments 147-153, wherein in the plurality of articles, the weight percent of the first electrodepositable material at one or more locations in any one article in the plurality does not differ by more than six weight percent from the weight percent of that same electrodepositable material at one or more locations in another article in the plurality; or
wherein in the plurality of articles, the weight percent of the second electrodepositable material at one or more locations in any one article in the plurality does not differ by more than six weight percent from the weight percent of that same electrodepositable material at one or more locations in another article in the plurality.

155. The method according to any of embodiments 147-154, wherein the plating barrel is rotated during the application of the first and second currents at a rate of from 4-10 RPM.

156. The method according to any of embodiments 147-155, wherein each of the first and second amounts of time ranges from about 2 to about 10 minutes.

157. The method according to any of embodiments 147-156, wherein the first electric current ranges from about 20 to about 70 amps.

158. The method according to any of embodiments 147-157, wherein the second electric current ranges from about 40 to about 140 amps.

159. The method according to any of embodiments 147-158, wherein the voltage associated with the first electric current, the second electric current, or both range from about 3 to about 8 volts.

160. The method according to any of embodiments 147-159, wherein the combined thickness in nanometers of the electrodeposited layers at one or more locations on each workpiece in the plurality ranges from about 6 to about 14 microns.

161. The method according to any of embodiments 147-160, wherein the first and second electrodepositable materials comprise at least two elements selected from the group consisting of Ni, Zn, Fe, Cu, Au, Ag, Pd, Sn, Mn, Co, Pb, Al, Ti, Mg, W, Rh, and Cr.

162. The method according to any of embodiments 147-161, wherein the first identifiable layer, second identifiable layer, or both, comprise at least two metals selected from the group consisting of Ni and Zn, Ni and Co, Ni and Cr, and Zn and Fe.

163. The method according to any of embodiments 147-162, wherein at one or more locations on the articles in the plurality the first identifiable layer, second identifiable layer, or both, comprise about 13 wt. % to about 17% wt. % Ni; or
wherein at one or more locations on the articles in the plurality the first identifiable layer, second identifiable layer, or both, comprise about 83 wt. % to about 87 wt. % Zn.

164. The method according to any of embodiments 147-163, wherein one or more locations on the articles in the plurality comprise a corrosion-resistant nanolaminate coating that provides at least 1000 hours to first red rust when tested according to the ASTM-B117-11 salt fog test.

165. The method according to any of embodiments 147-164, wherein any one article in the plurality has a total nanolaminate coating thickness at a first location on the article that is within a thickness of 6 microns of the average thickness of the nanolaminate coating at the same location on the other articles in the plurality; or
wherein any one article in the plurality has a total nanolaminate coating thickness at a second location on the article that is within a thickness of 6 microns of the average thickness of the nanolaminate coating at the same location on the other articles in the plurality.

166. The method according to any of embodiments 147-165, wherein the plurality of articles comprises a majority articles having the same shape, and wherein the majority comprises at least 70% of the total number of articles in the plurality.

167. The method according to any of embodiments 150-166, wherein the one or more locations includes a non-threaded surface.

168. A plated article made according to a method according to any of embodiments 125-167.

169. An article comprising a nanolaminate coating, the nanolaminate coating comprising:
a first identifiable layer having a thickness ranging from about 150 nanometers to about 20,000 nanometers at one or more locations on the article, the first identifiable layer comprising at least a first and second component, the first identifiable layer having a first composition, a first grain size, and a first grain structure;
a second identifiable layer having a thickness ranging from about 150 nanometers to about 20,000 nanometers at one or more locations on the article, the second identifiable layer comprising the first and second component, the second identifiable layer having a second composition, a second grain size, and a second grain structure, wherein at least one of the second composition, the second grain size, and the second grain structure are different than the first composition, the first grain size, and the first grain structure; and
one or more discontinuities characterized by an inward deformation of the first and second identifiable layers toward a substrate surface.

170. The article according to any of embodiment 169, further comprising an additional, identifiable layer having a thickness ranging from about 150 nanometers to about 20,000 nanometers at one or more locations on the article, the additional, identifiable layer comprising at least one of the first and second components and the additional, identifiable layer having at least one feature selected from the group consisting of composition, grain size and grain structure (e.g., microstructure or morphology) is different from at least one of the features in the immediately preceding layer.

171. The article according to embodiments 169 or 170, wherein the first identifiable layer has a thickness ranging from about 225 to about 500 nm at one or more locations on the article.

172. The article according to any of embodiments 169-171, wherein the second identifiable layer has a thickness ranging from about 400 to about 1000 nm at one or more locations on the article.

173. The article according to any of embodiments 169-172, wherein the article comprises at least 6 layers at one or more locations on the article.

174. The article according to any of embodiments 169-173, wherein the combined thickness of the layers is from 6 to 14 microns at one or more locations on the article.

175. The article according to any of embodiments 169-174, wherein the first and second components comprise Ni, Zn, Fe, Cu, Au, Ag, Pd, Sn, Mn, Co, Pb, Al, Ti, Mg, W, Rh, or Cr.

176. The article according to any of embodiments 169-175, wherein the first identifiable layer, second identifiable layer, or both, comprise Ni and Zn, Ni and Co, Ni and Cr, or Zn and Fe.

177. The article according to any of embodiments 169-176, wherein the first identifiable layer, second identifiable layer, or both, comprise from about 13 wt. % to about 17 wt. % Ni at one or more locations on the article; or
wherein the first identifiable layer, second identifiable layer, or both, comprise from about 83 wt. % to about 87 wt. % Zn at one or more locations on the article.

178. The article according to any of embodiments 169-177, wherein at one or more locations on the article the nanolaminate coating resists corrosion and provides at least 1000 hours to first red rust when tested according to the ASTM-B117-11 salt fog test.

179. The article according to any of embodiments 169-178, wherein the one or more locations include a non-threaded surface.

180. The article according to any of embodiments 169-179, wherein the one or more locations include a threaded surface.

181. The article according to any of embodiments 169-180, wherein the first and second components are electrodeposited.

182. A plurality of articles according to any of embodiments 169-181, wherein the weight percent of the first electrodeposited component in the coating on any one article in the plurality does not differ by more than six weight percent from the weight percent of that same component in the coating on another article in the plurality; or
wherein the weight percent of the second electrodeposited component in the coating on any one article in the plurality does not differ by more than six weight percent from the weight percent of that same component in the coating on another article in the plurality.

183. A plurality of articles according to any of embodiments 169-182, wherein any one article in the plurality has a total nanolaminate coating thickness at a first location on the article that is within a thickness of 6 microns of the average thickness of the nanolaminate coating at the same location on the other articles in the plurality.

184. The plurality of articles according to any of embodiments 169-183, wherein any one article in the plurality has a total nanolaminate coating thickness at a second location on the article that is within a thickness of 6 microns of the average thickness of the nanolaminate coating at the same location on the other articles in the plurality.

185. The plurality of articles according to any of embodiments 169-184, wherein the one or more locations include a non-threaded surface.

186. The plurality of articles according to embodiment 184, wherein the first or second locations include a non-threaded surface.

The above descriptions of exemplary embodiments of methods for forming nanolaminate coatings are merely illustrative, and thus the disclosure herein is not intended to be limited to the particular embodiments described above. Modifications and variations that are apparent to those of ordinary skill in the art from reading the above disclosure are intended to be encompassed by this disclosure. Moreover, those skilled in the art will recognize, or be able to ascertain using no more than routine experimentation, many equivalents to the specific embodiments described herein. Such equivalents are intended to be encompassed by the following claims.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet, including U.S. Patent Application No. 62/385,071, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for producing a plurality of articles by electroplating a batch of workpieces, the method comprising:
loading the batch of workpieces into a containment apparatus, a loading fraction of the batch of workpieces in the containment apparatus ranging between 0.6 and 0.7 and a length fraction of the batch of workpieces in the containment apparatus ranging between 0.1 and 1.5, the loading fraction and the length fraction being controlled so that a measured chatter percent is less than 6.25% to obtain a uniform plating among the workpieces in the batch;
contacting at least a portion of the batch of workpieces with an electrodeposition bath in contact with at least a portion of the containment apparatus, the electrodeposition bath comprising at least first and second metal ions;
moving the portion of the batch of workpieces by moving the containment apparatus in a predetermined motion; and
electrodepositing a plurality of identifiable layers in an alternating pattern of first and second layers onto at least a portion of the workpieces in the batch, the electrodepositing comprising repeatedly applying a first electric current for a first amount of time via at least two cathode contacts that make at least intermittent electrical contact with the portion of the batch of workpieces and applying a second electric current for a second amount of time via the at least two cathode contacts, the first layers comprising a first alloy of the first and second metals, the second layers comprising a second alloy of the first and second metals, the second alloy being different from the first alloy, wherein the loading fraction is defined as a ratio of a volume of the batch of workpieces to a volume of the containment apparatus, wherein the length fraction is defined as a ratio of a longest dimension of each workpiece of the batch of workpieces to a radius of the containment apparatus, wherein the measured chatter percent is defined by the following formula: chatter percent=((|applied current signal−mean of the measured current signal|)/applied current signal)×100, and wherein a weight percent of the first or second metal in a first layer on a first workpiece does not differ by more than six weight percent from the weight percent of the same metal in a first layer on a second workpiece, and a weight percent of the first or second metal in a second layer on the first workpiece does not differ by more than six weight percent from the weight percent of the same metal in a second layer on the second workpiece.

2. The method according to claim 1, wherein the containment apparatus is a barrel-plating apparatus, a vibratory basket plating apparatus, or a rocker plating apparatus.

3. The method according to claim 1, wherein each of the first and second amounts of time ranges from about 2 to about 10 minutes.

4. The method according to claim 1, wherein the first electric current is between 20 and 70 amps; or
wherein the second electric current ranges from about 40 to about 140 amps.

5. The method according to claim 1, wherein a voltage associated with the first electric current, the second electric current, or both range from about 3 to about 8 volts.

6. The method according to claim 1, wherein the at least two cathode contacts make at least continuous contact with the portion of the batch of workpieces.

7. A method for forming a plurality of articles by forming a nanolaminate coating on a plurality of workpieces, the method comprising:
loading the plurality of workpieces into a plating barrel, a loading fraction the plurality of workpieces in the plating barrel ranging between 0.6 and 0.7 and a length fraction of the plurality of workpieces in the plating barrel ranging between 0.1 and 1.5, the loading fraction and length fraction being controlled so that a measured chatter percent is less than 6.25% to obtain a uniform plating among the workpieces in the plurality of workpieces;
contacting at least a portion of the plurality of workpieces with an electrodeposition bath in contact with an interior volume of the plating barrel, wherein the electrodeposition bath comprises at least first and second metal ions, wherein the workpieces each independently have a longest dimension and the plating barrel has a length and a radius;
rotating the plating barrel; and
electrodepositing a plurality of identifiable layers in an alternating pattern of first and second layers onto at least the portion of the plurality of workpieces, the electrodepositing comprising repeatedly applying a first electric current for a first amount of time via at least two cathodes and applying a second electric current for a second amount of time via the at least two cathodes, the first layers comprising a first alloy of the first and second metals, the second layers comprising a second alloy of the first and second metals, the second alloy being different from the first alloy, the at least two cathodes having ends positioned within the interior volume of the plating barrel, the ends being separated by a distance, wherein the loading fraction is defined as a ratio of a volume of the plurality of workpieces to a volume of the plating barrel, wherein the length fraction is defined as a ratio of a longest dimension of each of the plurality of workpieces to a radius of the plating barrel, wherein the measured chatter percent is defined by the following formula: chatter percent=((|applied current signal−mean of the measured current signal|)/applied current signal)×100, and wherein a weight percent of the first or second metal in a first layer on a first workpiece does not differ by more than six weight percent from the weight percent of the same electrodepositable material in a first layer on a second workpiece, and a weight percent of the first or second metal in a second layer on the first workpiece does not differ by more than six weight percent from the weight percent of the same electrodepositable material in a second layer on the second workpiece.

8. The method according to claim 7, wherein the first electric current is a first time varying waveform; or
wherein the second electric current is a second time varying waveform.

9. The method according to claim 7, wherein the plating barrel is rotated during the application of the first and second electric currents at a rate of from 4 RPM to 10 RPM.

10. The method according to claim 1, wherein moving the containment apparatus in the predetermined motion comprises rotating the containment apparatus around an axis.

11. The method according to claim 10, wherein the at least two cathode contacts are positioned to be centered along the axis.

12. The method according to claim 1, wherein the at least two cathode contacts, when fully extended, are separated by a distance that is greater than the longest dimension of any workpiece in the batch of workpieces.

13. The method according to claim 1, further comprising adjusting at least one parameter selected from the group consisting of workpiece length fraction, loading fraction, and mean mixing fraction to minimize variation of the first electric current and the second electric current.

14. The method according to claim 1, wherein the first metal is zinc.

15. The method according to claim 14, wherein the second metal is nickel.

16. The method according to claim 14, wherein the second metal is iron.

17. The method according to claim 7, wherein the first metal is zinc, and the second metal is nickel or iron.

18. The method according to claim 1, wherein the length fraction ranges from 0.6 to 1.0.

19. The method according to claim 1, wherein the containment apparatus is a barrel-plating apparatus, and the barrel-plating apparatus is rotated during the application of the first and second electric currents at a rate of from 4 RPM to 10 RPM.

* * * * *